Oct. 4, 1938.　　F. M. CARROLL ET AL　　2,131,914
TYPEWRITER PUNCH
Filed May 16, 1936　　31 Sheets-Sheet 1

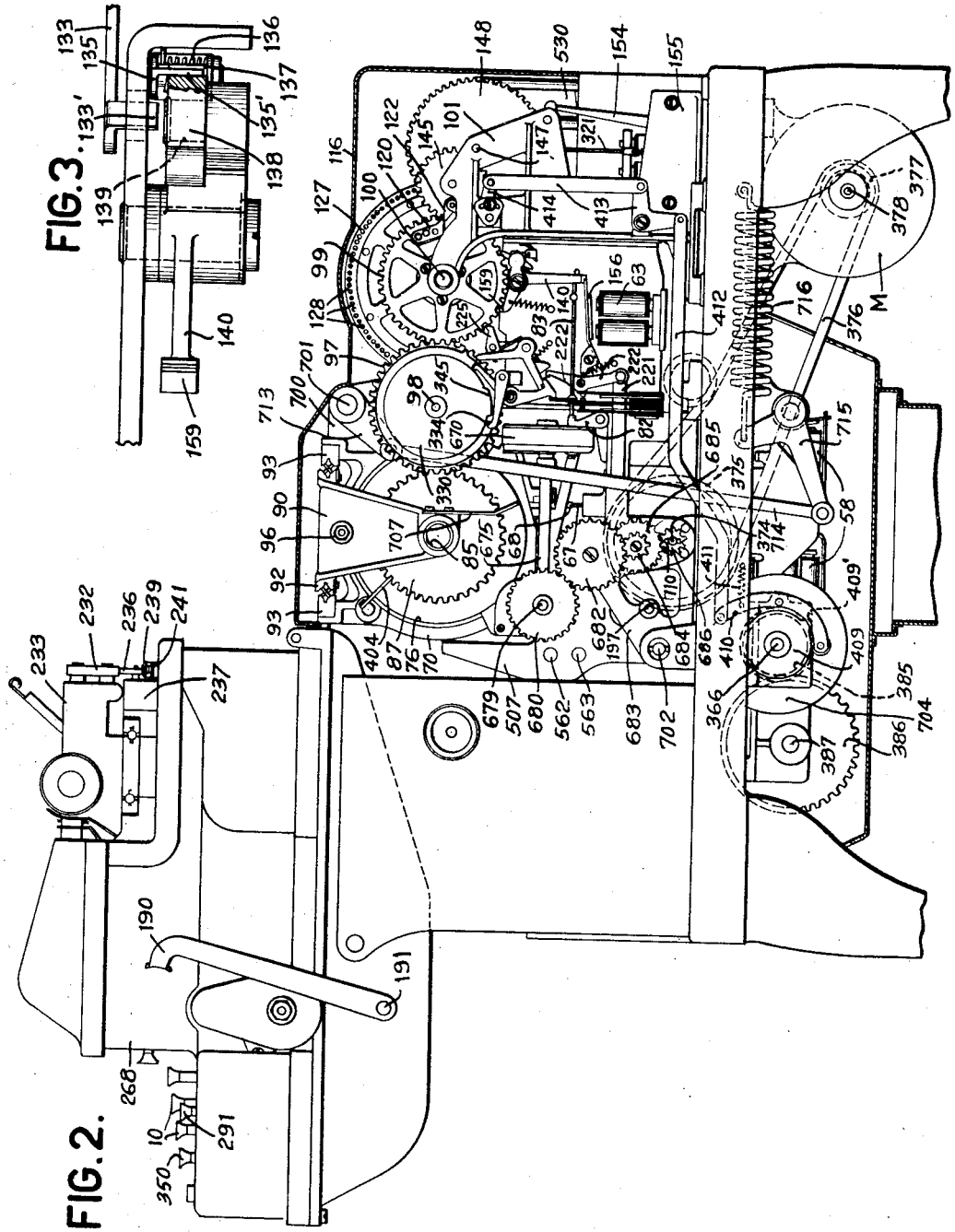

Oct. 4, 1938.　　　F. M. CARROLL ET AL　　　2,131,914
TYPEWRITER PUNCH
Filed May 16, 1936　　　31 Sheets-Sheet 3

INVENTORS
Fred M. Carroll
John H. Bakelaar
BY
ATTORNEY

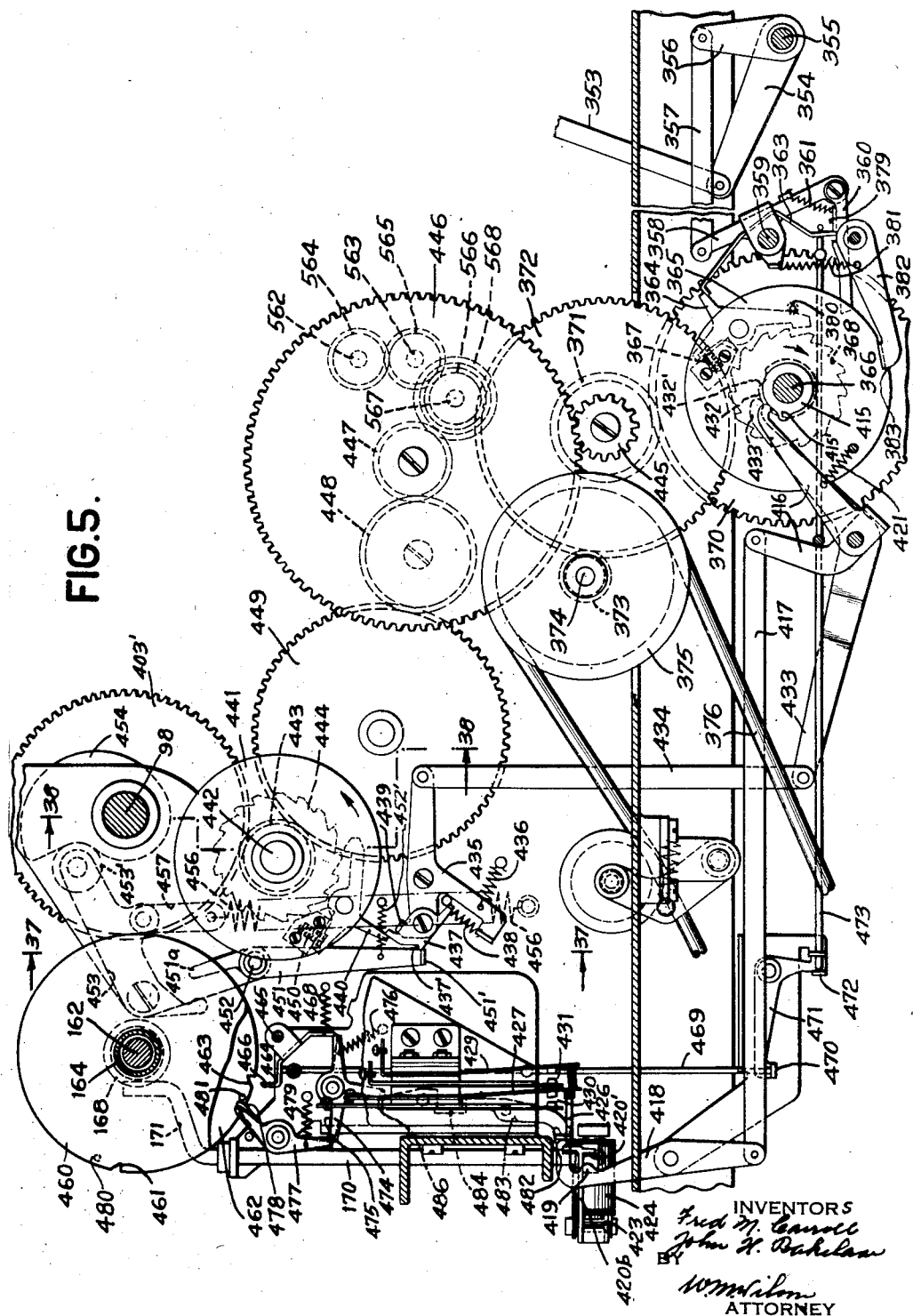

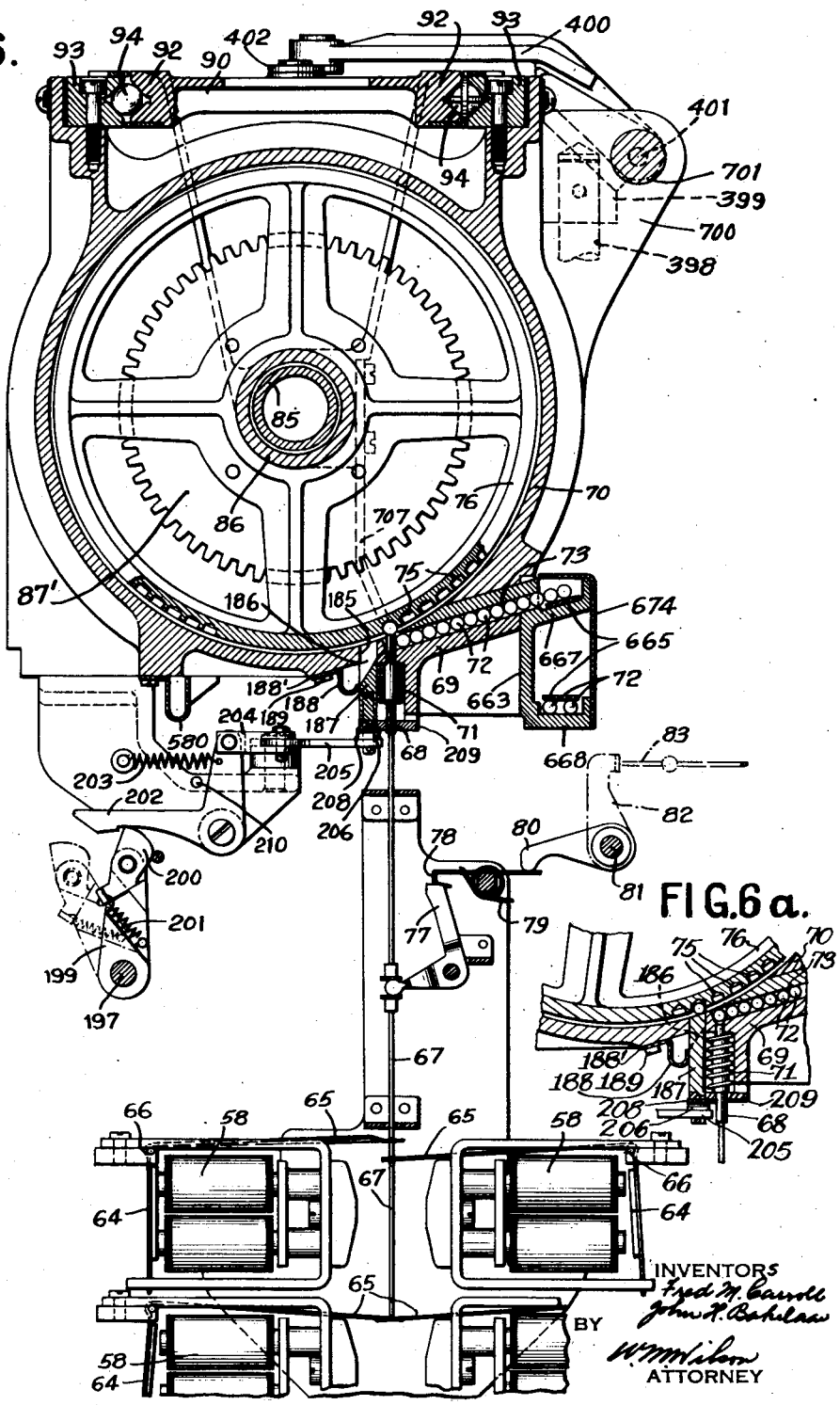

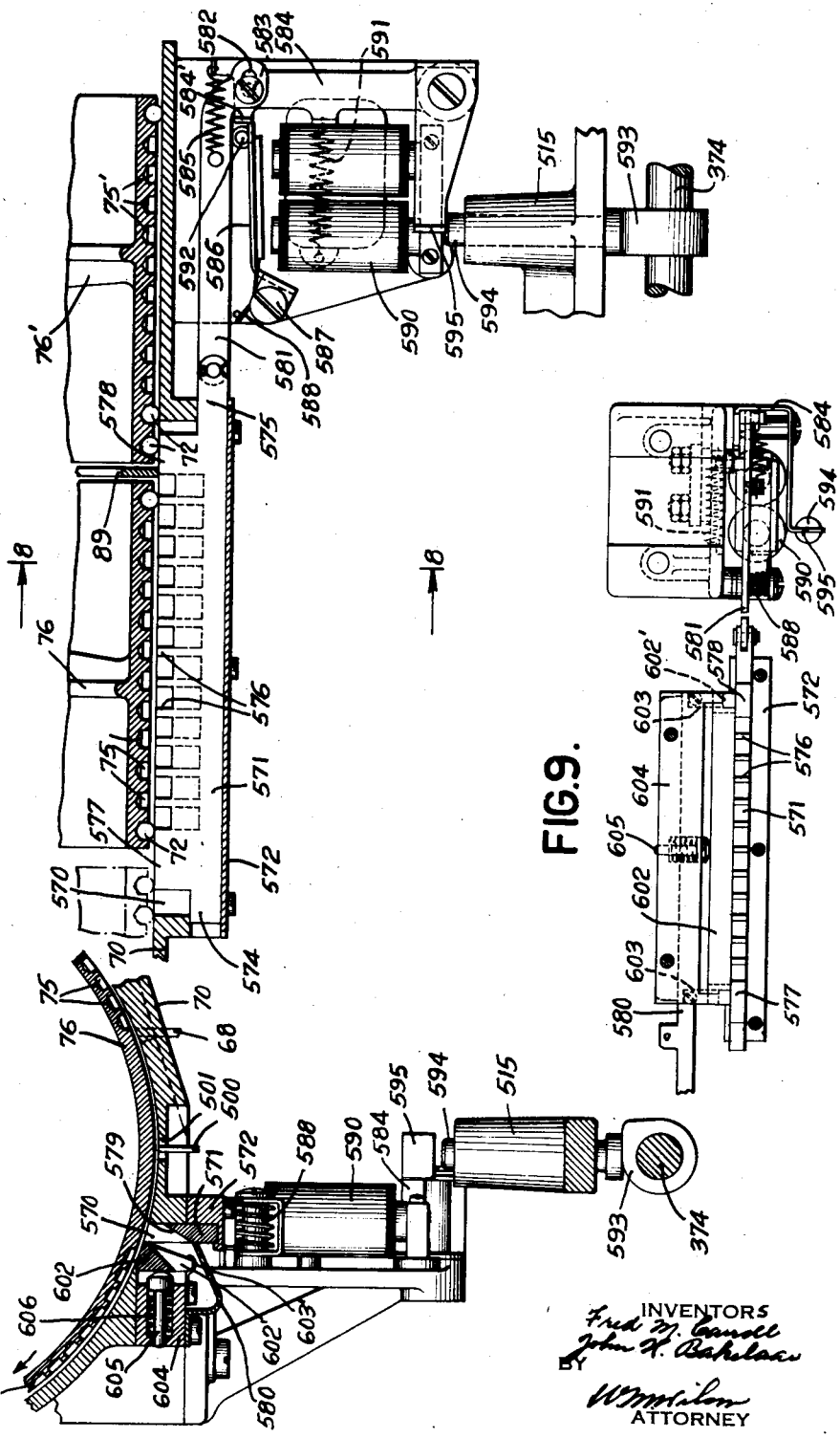

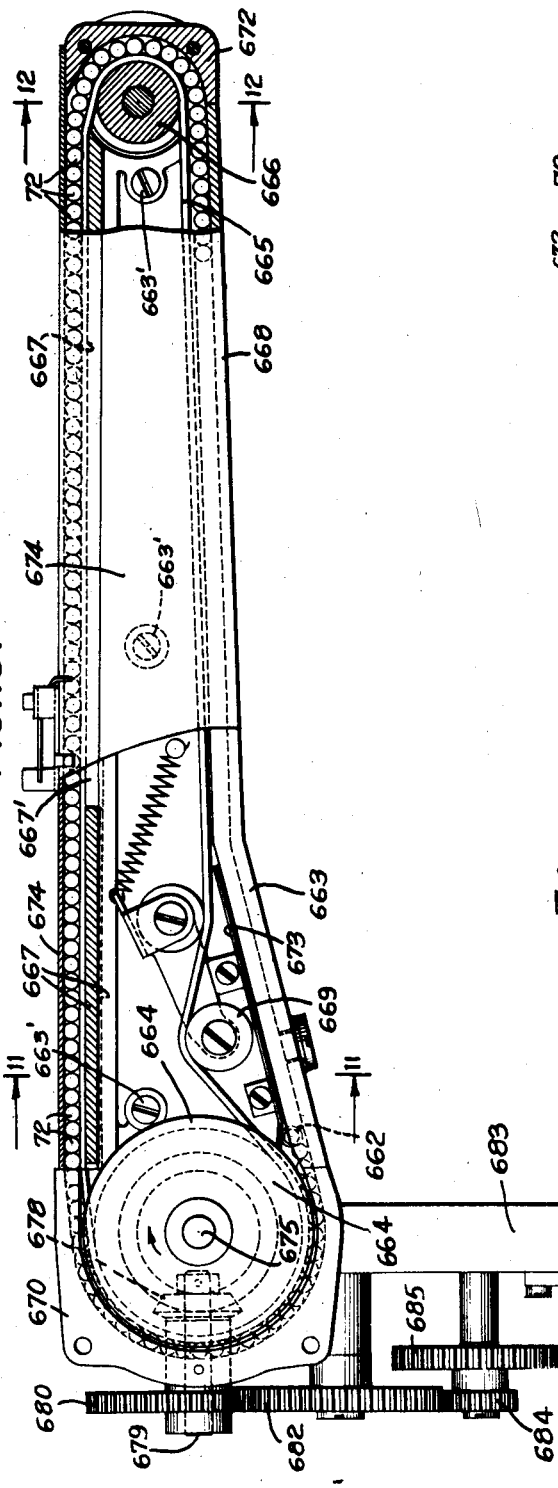

Oct. 4, 1938.   F. M. CARROLL ET AL   2,131,914
TYPEWRITER PUNCH
Filed May 16, 1936   31 Sheets-Sheet 10

INVENTORS
Fred M. Carroll
John H. Bakelaar
ATTORNEY

Oct. 4, 1938.   F. M. CARROLL ET AL   2,131,914
TYPEWRITER PUNCH
Filed May 16, 1936   31 Sheets-Sheet 13

INVENTORS
Fred M. Carroll
John H. Bachelor
BY W. M. Wilson
ATTORNEY

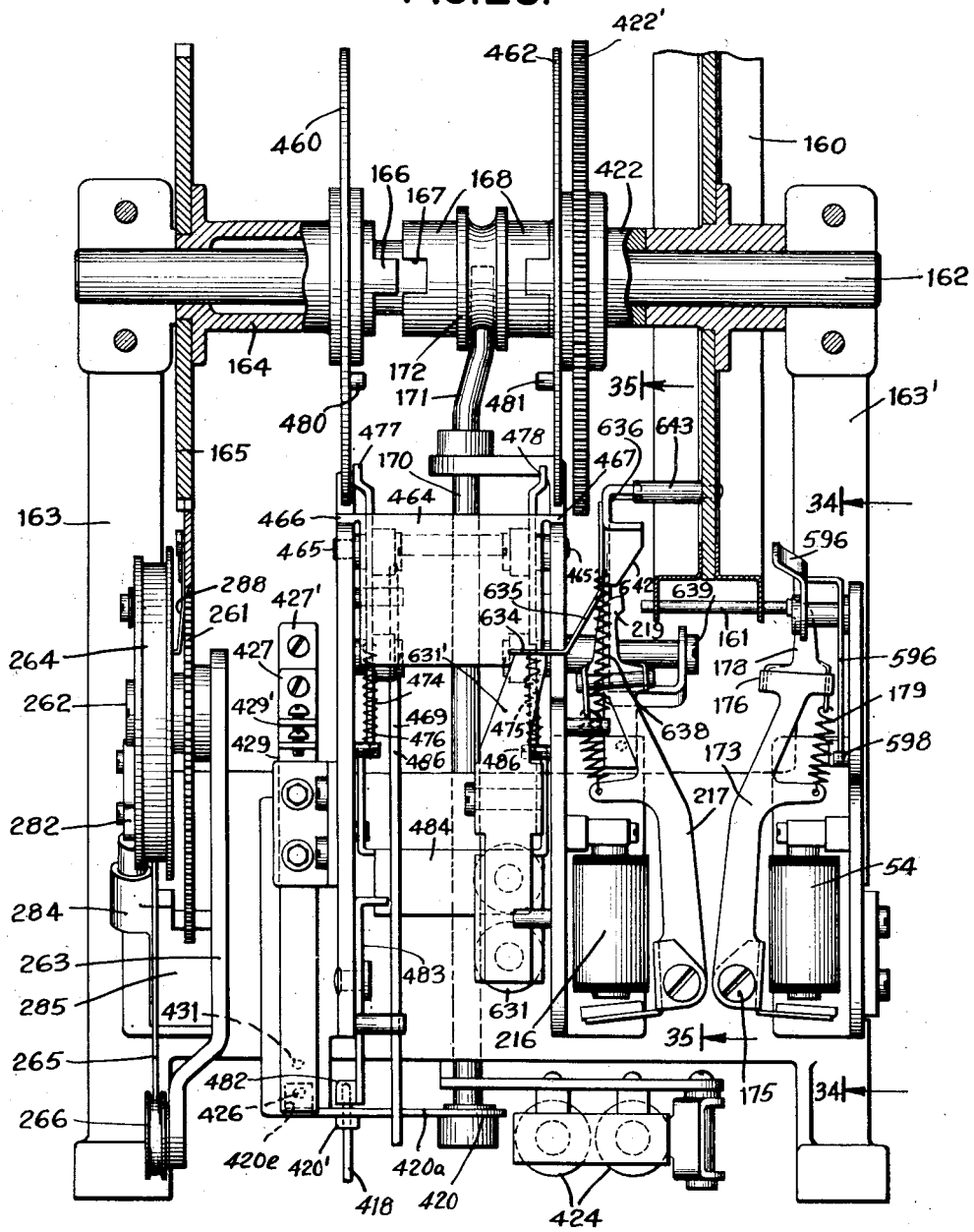

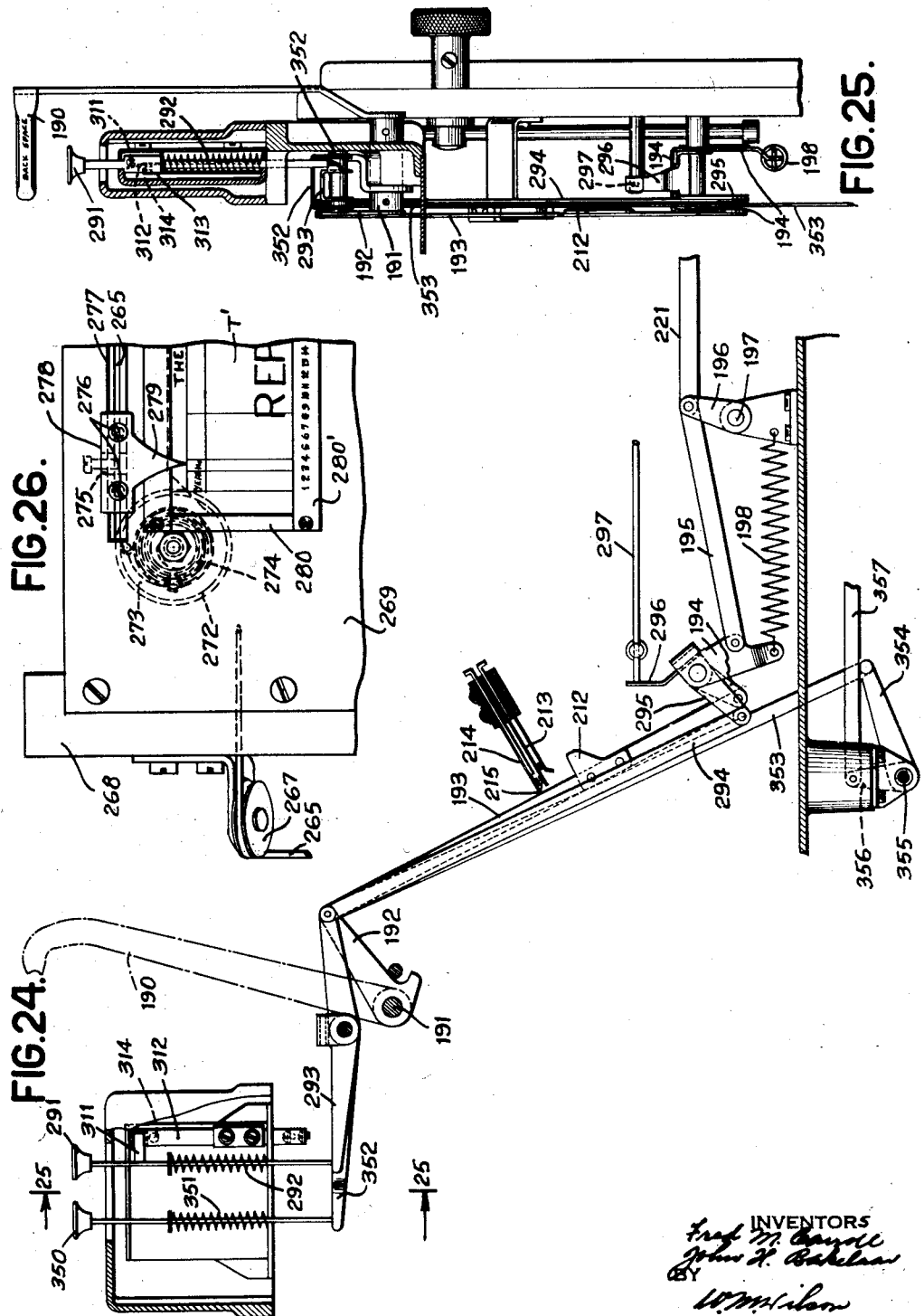

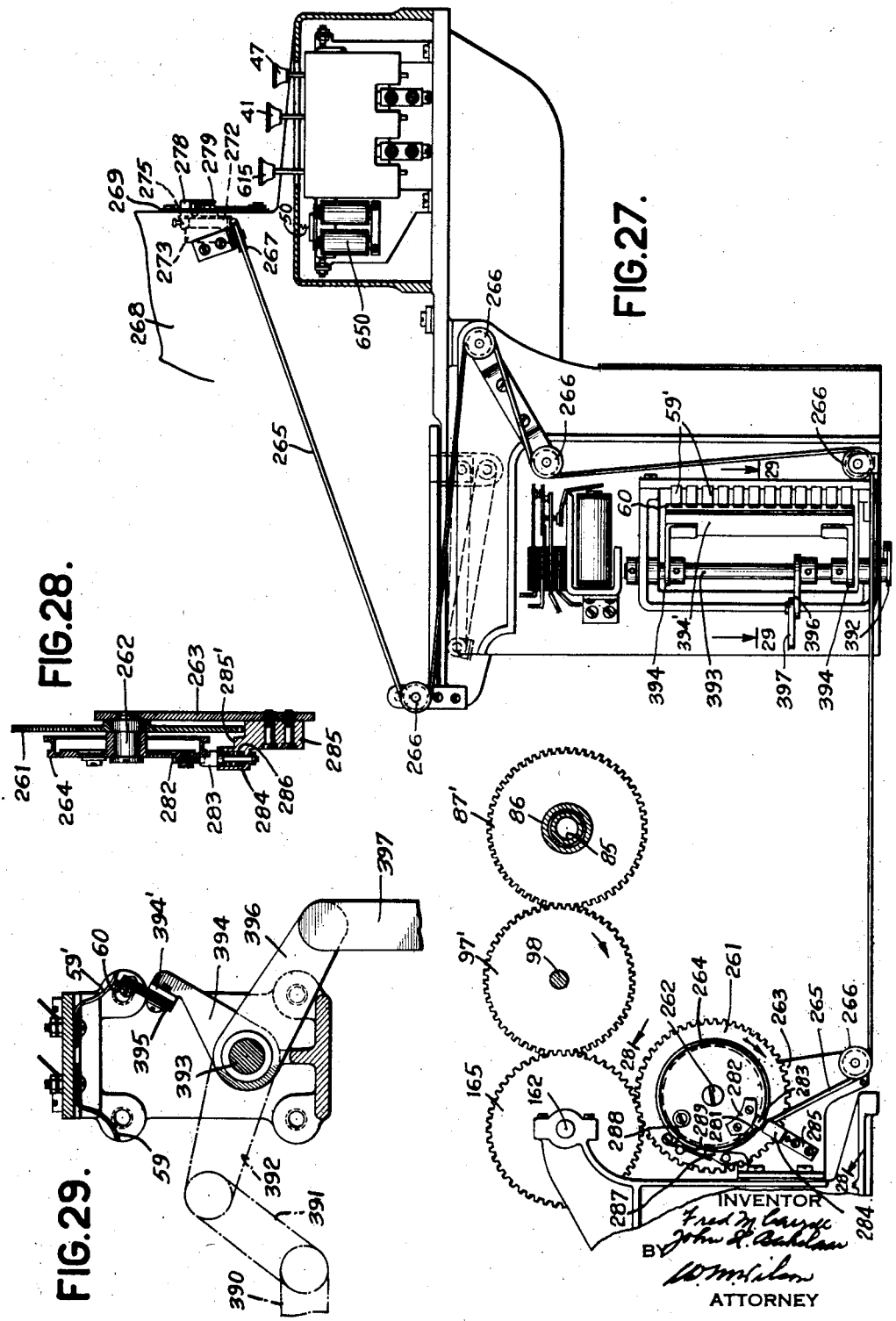

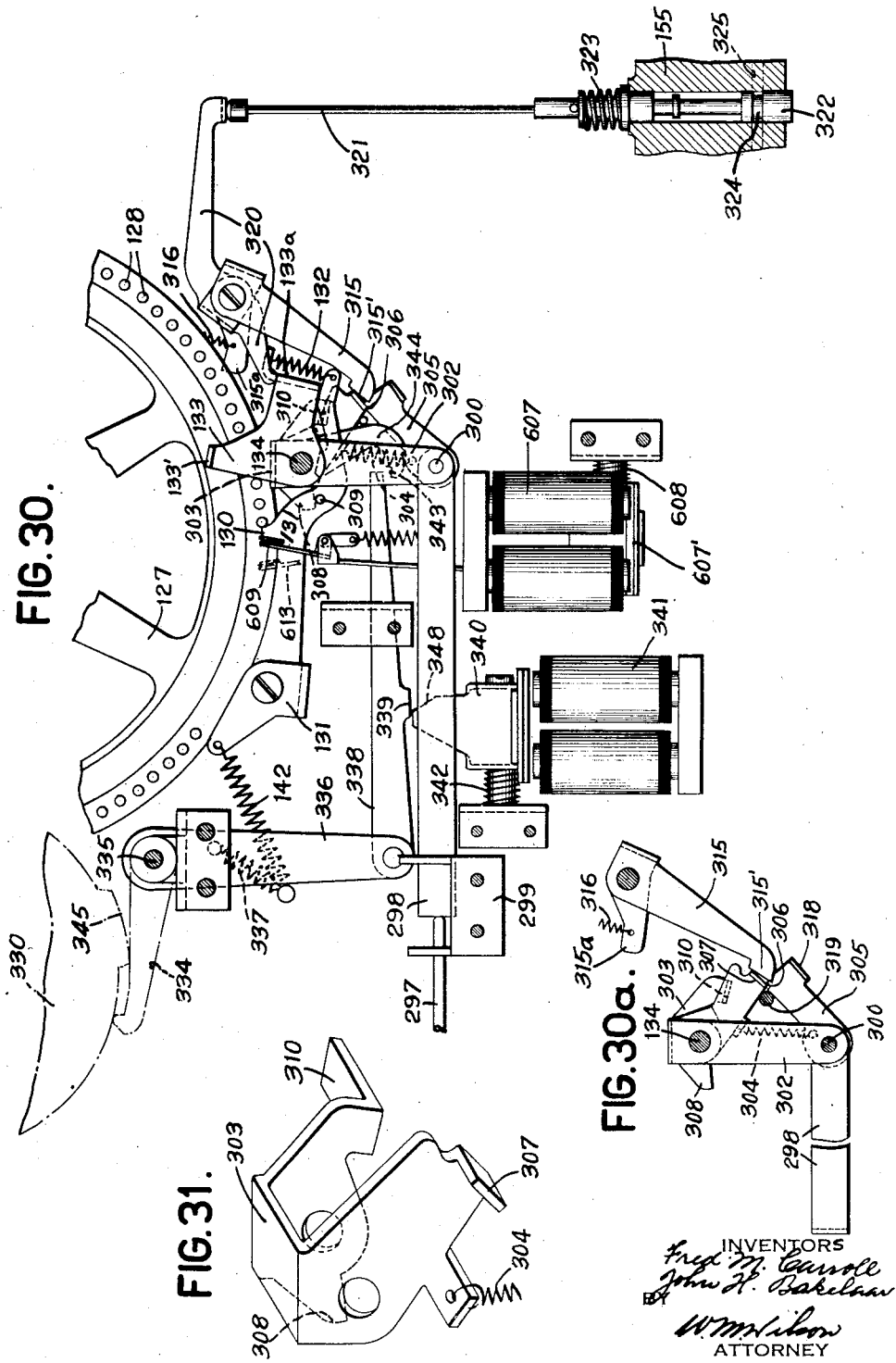

Oct. 4, 1938.  F. M. CARROLL ET AL  2,131,914

TYPEWRITER PUNCH

Filed May 16, 1936  31 Sheets-Sheet 18

INVENTORS
Fred M. Carroll
John L. Dickelman
W. M. Wilson
ATTORNEY

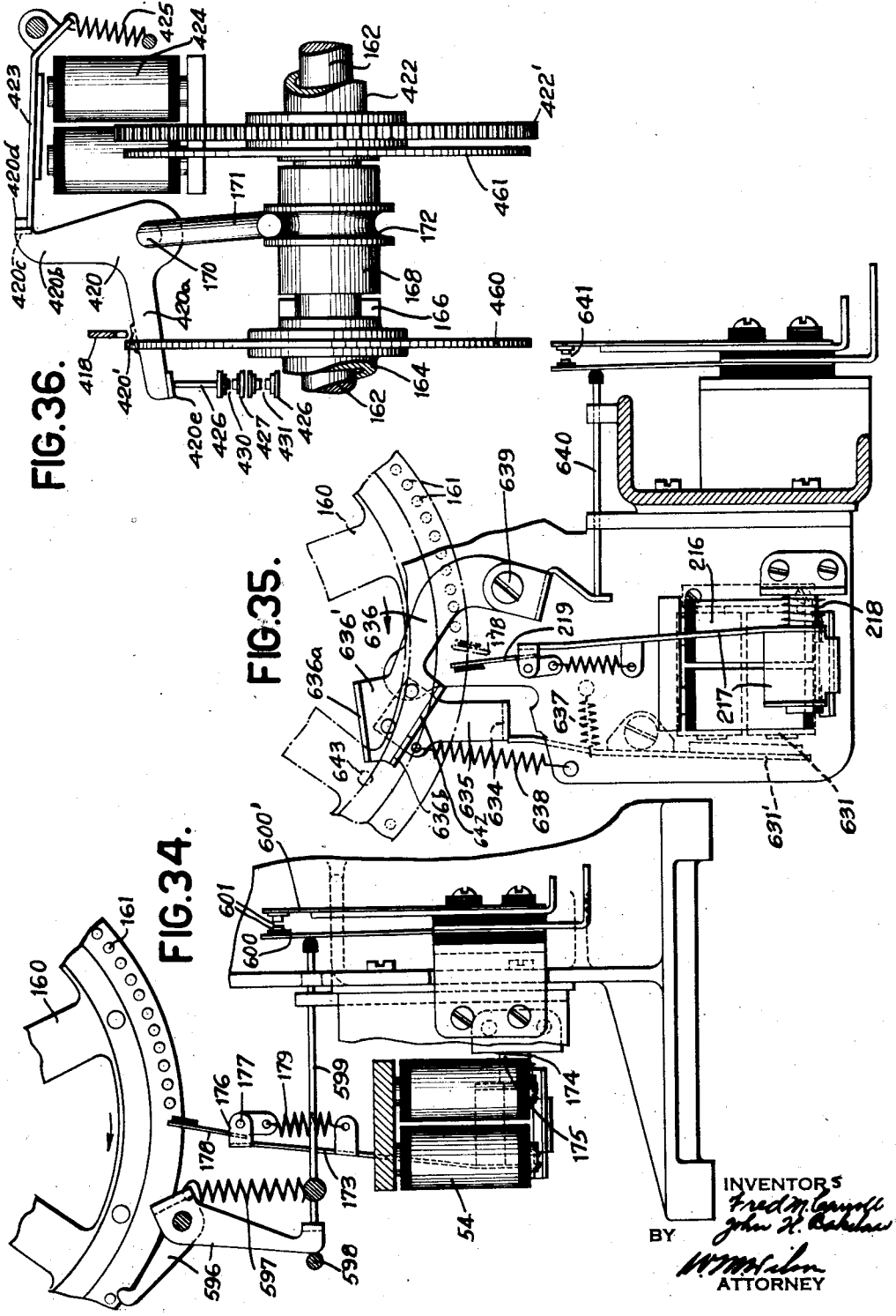

Oct. 4, 1938.  F. M. CARROLL ET AL  2,131,914
TYPEWRITER PUNCH
Filed May 16, 1936   31 Sheets-Sheet 20

INVENTORS
Fred M. Carroll
John H. Bichelan
ATTORNEY

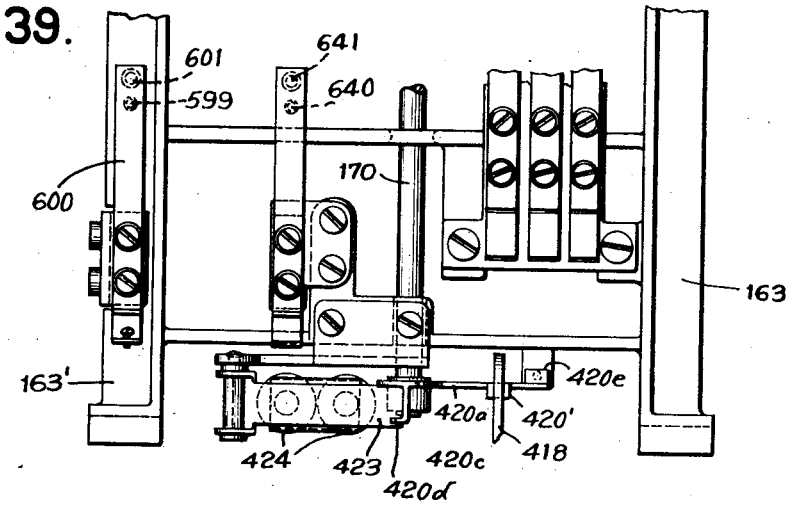
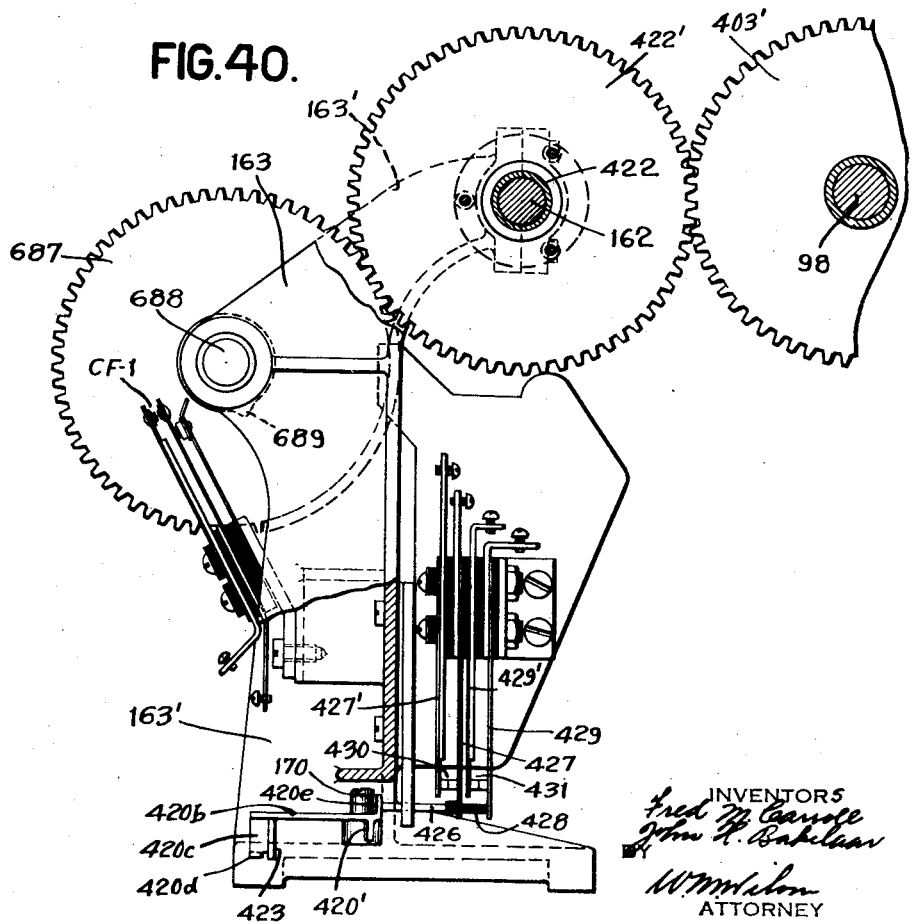

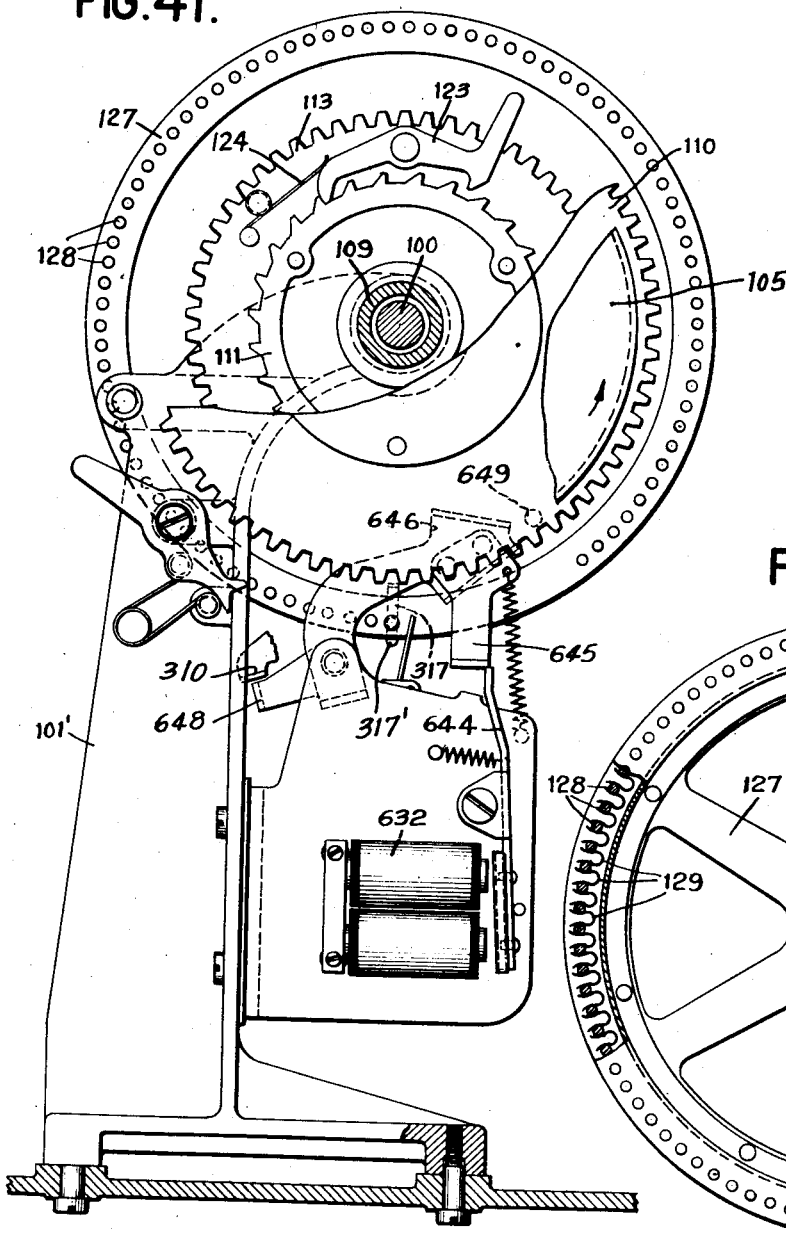
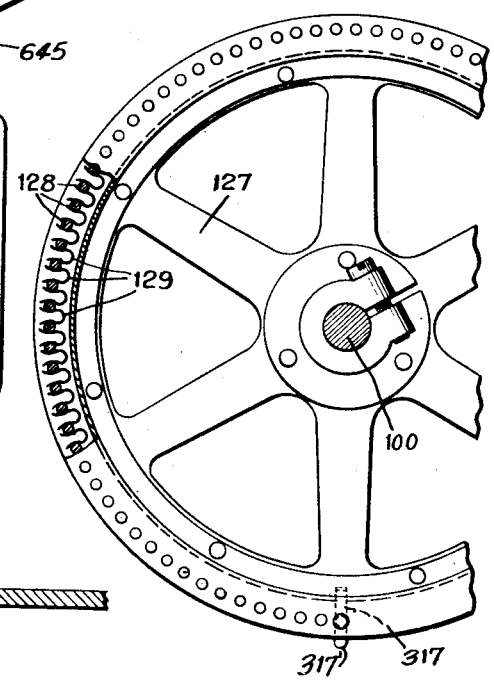

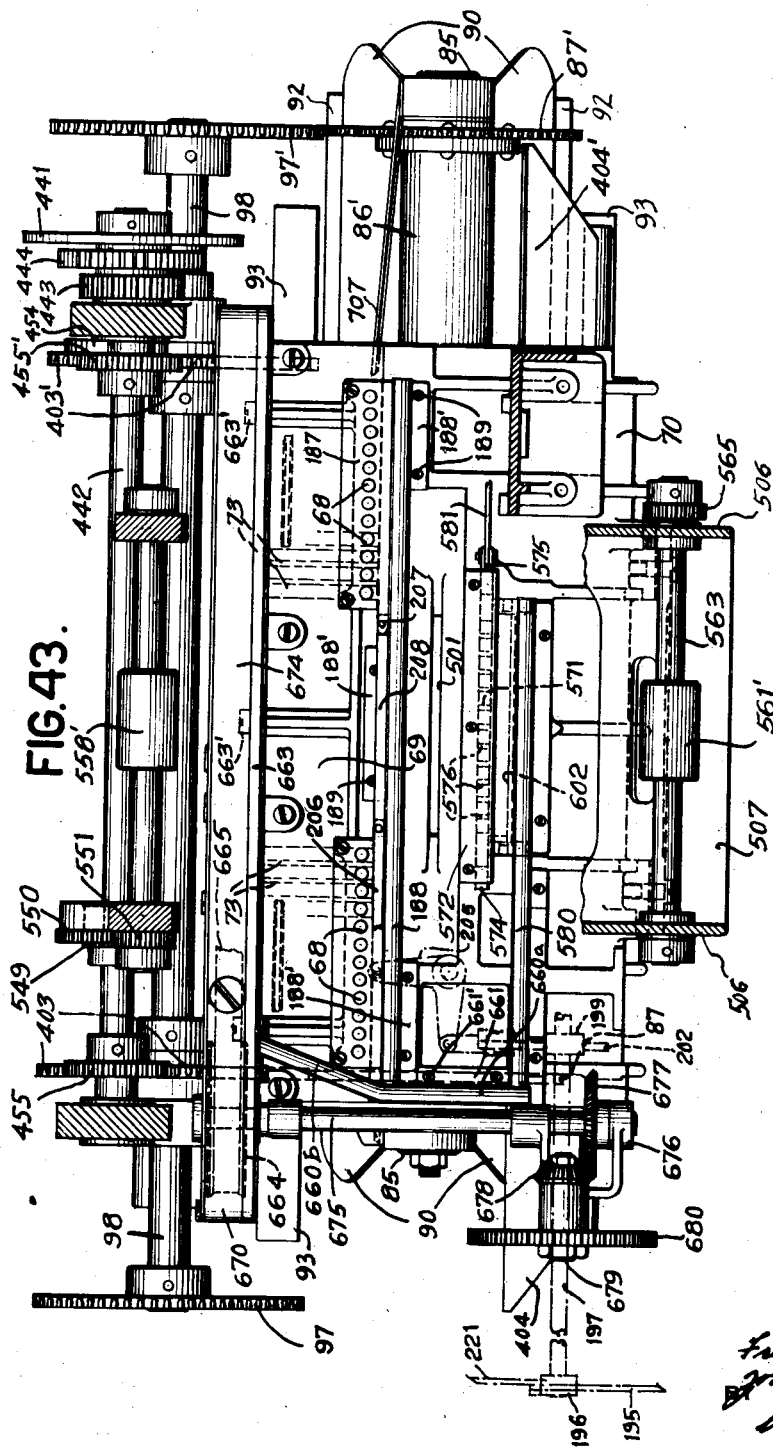

Oct. 4, 1938.　　F. M. CARROLL ET AL　　2,131,914
TYPEWRITER PUNCH
Filed May 16, 1936　　31 Sheets-Sheet 24

INVENTORS
Fred M. Carroll
John L. Bakelaar
BY
ATTORNEY

Oct. 4, 1938.   F. M. CARROLL ET AL   2,131,914
TYPEWRITER PUNCH
Filed May 16, 1936   31 Sheets-Sheet 25
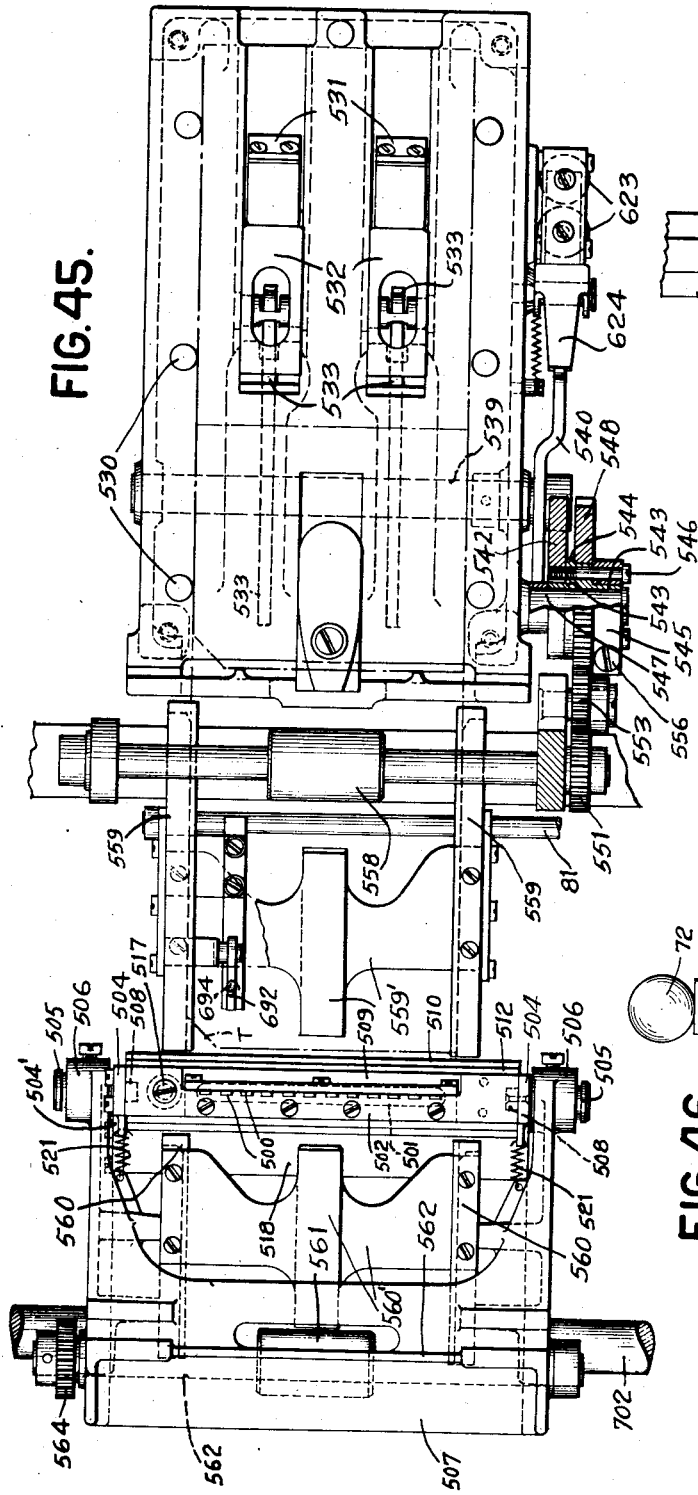
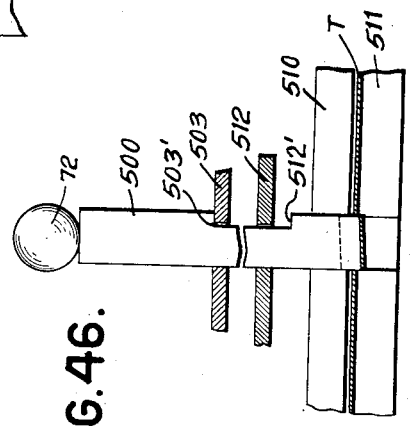
INVENTORS
Fred M. Carroll
John H. Aakelaar
ATTORNEY Oct. 4, 1938.  F. M. CARROLL ET AL  2,131,914
TYPEWRITER PUNCH
Filed May 16, 1936  31 Sheets-Sheet 26

INVENTORS
ATTORNEY

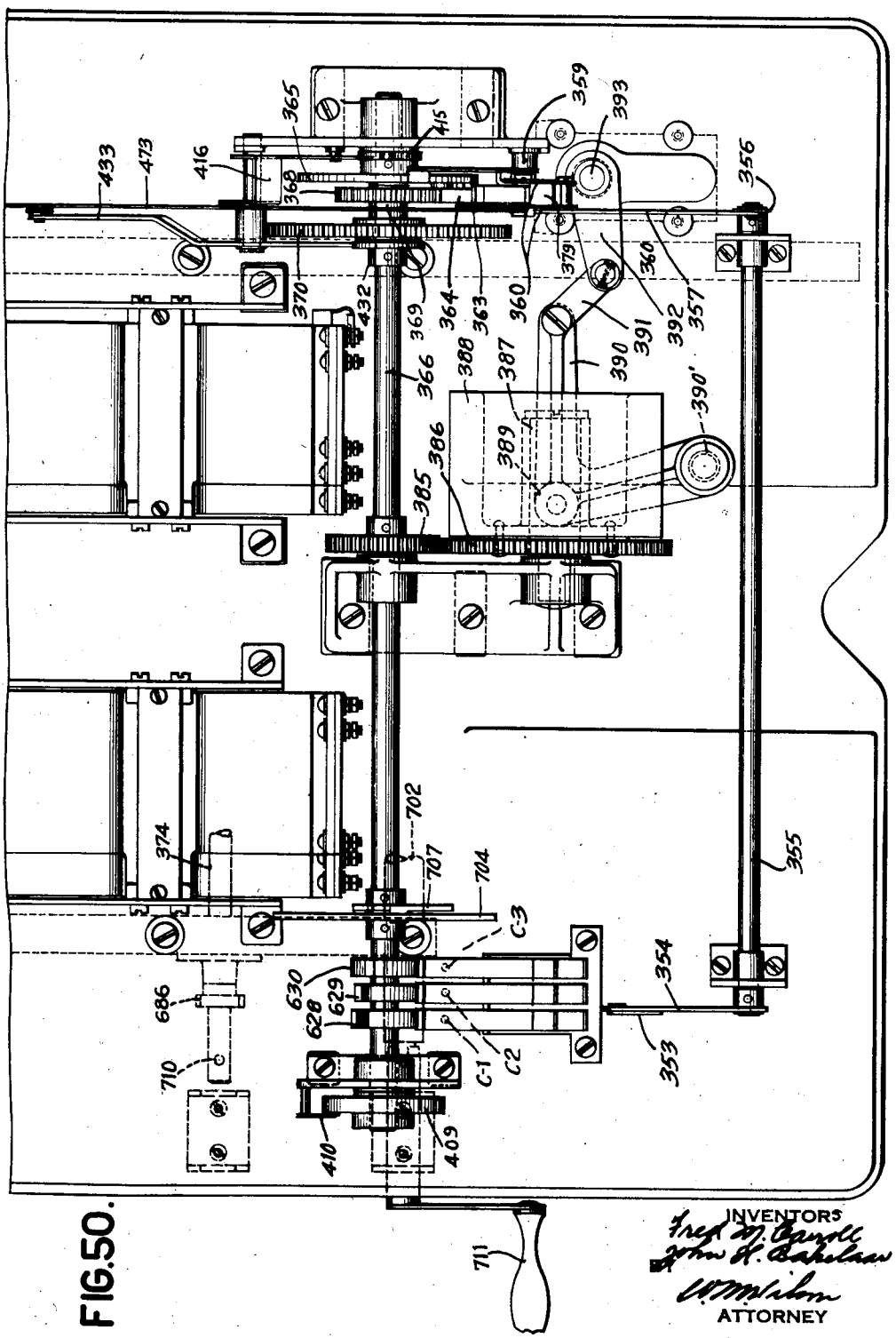

Oct. 4, 1938.　　F. M. CARROLL ET AL　　2,131,914
TYPEWRITER PUNCH
Filed May 16, 1936　　31 Sheets-Sheet 28
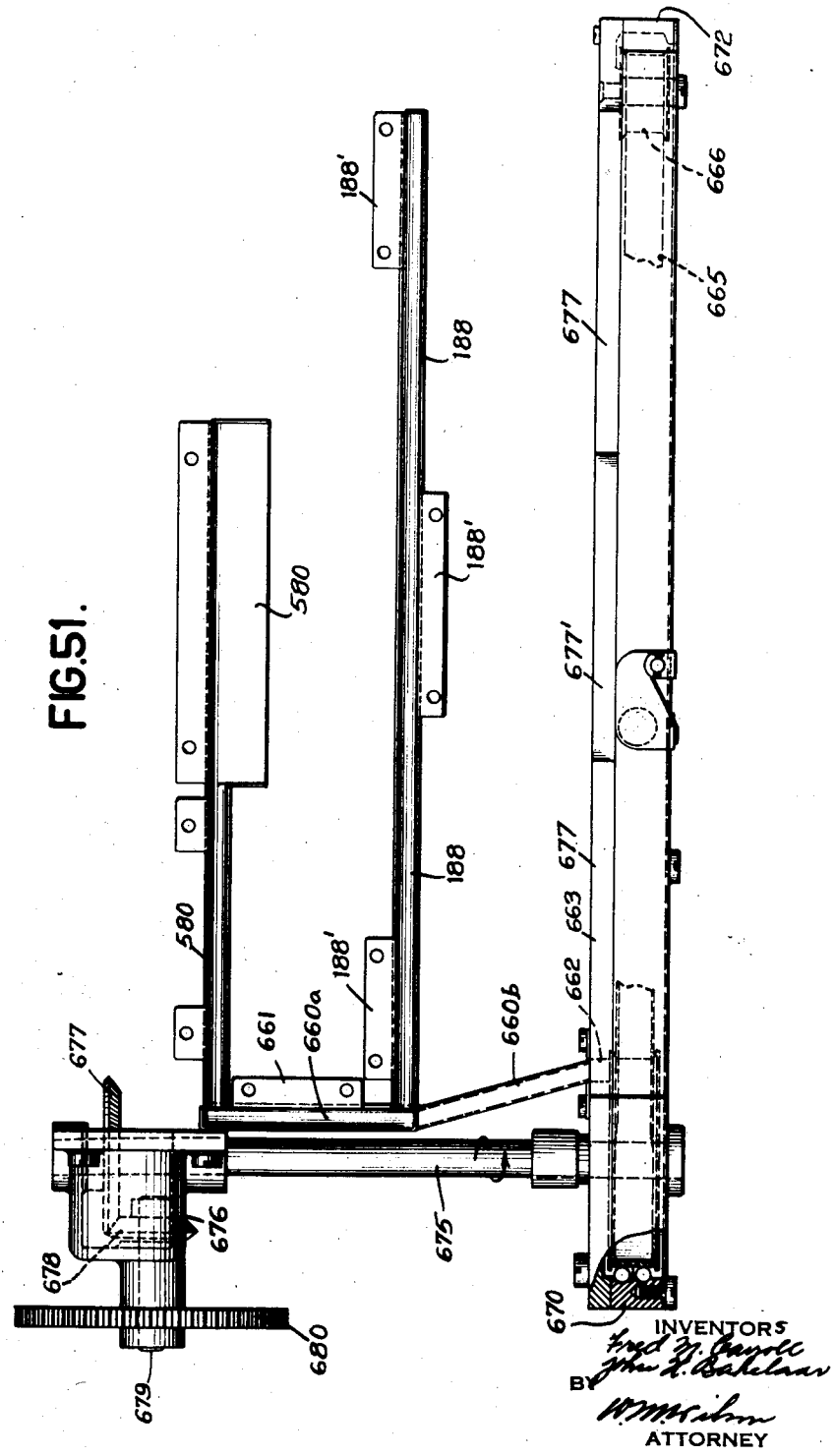

Oct. 4, 1938.  F. M. CARROLL ET AL  2,131,914
TYPEWRITER PUNCH
Filed May 16, 1936  31 Sheets-Sheet 29

FIG.52.

THE NATIONAL MANUFACTURING CO.

| | |
|---|---|
| CUSTOMER'S ORDER NO. | E 789 |
| REQUISITION No. | |
| CONTRACT No. | |

REFER TO INVOICE NO. 2418
INVOICE DATE OCTOBER 5, 1929.
VENDOR'S NOS.

| CODE | |
|---|---|
| CUSTOMER | 1 0 7 |
| TOWN | 0 5 2 |
| STATE | 1 3 |
| CLASS | 4 |
| BRANCH | 2 1 |
| SALESMAN | 7 1 4 |
| REMARKS | |

SOLD TO
E. C. HALL
24 COMMERCIAL STREET
SOUTHBRIDGE, MASS.

SHIPPED TO AND DESTINATION: ABOVE
DATE SHIPPED
CAR INITIALS AND NO.
HOW SHIPPED AND ROUTE
FROM F.O.B. NEW YORK CITY  PREPAID OR COLLECT
EXPRESS COLLECT
TERMS: NET CASH 30 DAYS

| QUANTITY | DESCRIPTION | | COMM. NO. | UNIT | PRICE | AMOUNT |
|---|---|---|---|---|---|---|
| 1 3 4 | #10-B | GASKETS | 1 2 | 1 6 | 1 2 | 48 | 64.32 |
| 2 | #XL | 13 HEADS | 6 | 6 | 1 5 | 50.50 | 1 0 1.0 0 |
| 1 0 1 | #5-N | VALVES | 1 0 | 9 | 1 1 | .50 | 50.50 |
| 1 2 3 | #M | BOLTS | 8 | 6 | 9 | .03 | 3.69 |
| 4 5 | #D | COUPLINGS | 6 | 3 | 8 | .30 | 13.50 |
| 2 0 | #C | UNIONS | 1 3 | 1 3 | 3 | .25 | 5.00 |
| 7 8 | #8-D | GEARS | 5 | 4 | 2 | 2.25 | 1 75.50 |
| 8 0 | #9-A | UNIVERSAL | 2 0 | 1 9 | 5 | 1.00 | 80.00 |
| 6 | #B | DRIVE SHAFTS | 1 6 | 1 0 | 2 0 | 3.50 | 21.00 |
| 5 0 | #A | ELBOWS | 9 | 1 2 | 1 3 | 1.25 | 62.50 |
| | | | | | | | 577.01 |

INVENTORS
Fred M. Carroll
John H. Bakelaar
BY
W. M. Colson
ATTORNEY

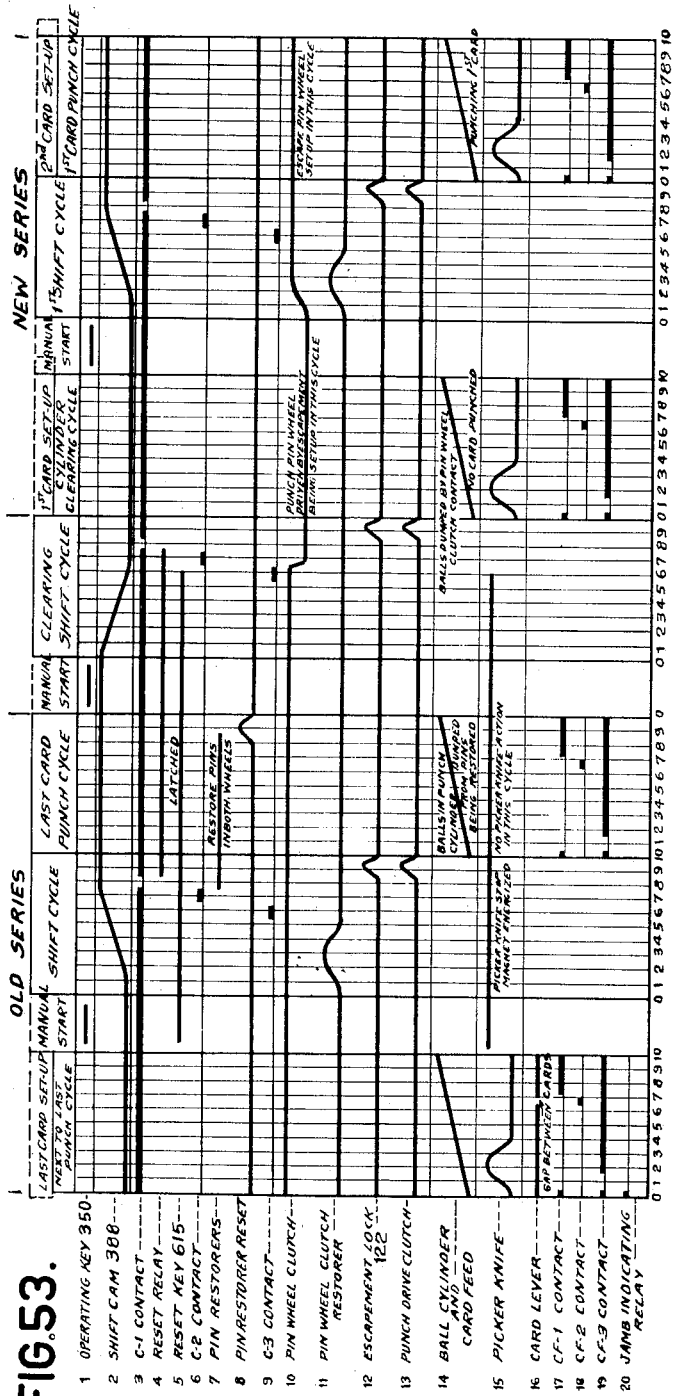

Patented Oct. 4, 1938

2,131,914

UNITED STATES PATENT OFFICE 2,131,914

TYPEWRITER PUNCH

Fred M. Carroll and John H. Bakelaar, Binghamton, N. Y., assignors to International Business Machines Corporation, New York, N. Y., a corporation of New York Application May 16, 1936, Serial No. 80,044

124 Claims. (Cl. 164—113)

This case relates to recording machines, particularly to a combination typewriter and punch.

An object of the invention is to provide improved means for controlling a punching mechanism by the operation of a printing or typing mechanism.

The above object contemplates the operation of typewriter keys to effect typing of characters and simultaneous momentary formation of circuits to control punching means to punch record cards with perforations representing such characters.

Further the above object contemplates the selection by the typewriter of those fields of the typed matter to be perforated by the punching machine.

More specifically, the latter object is to control, in accordance with the movement of the typewriter carriage, certain vertical columns of the typed matter to be simultaneously selected for punching.

Still more specifically, this latter object is to provide live fields of the typewriter carriage range of travel in which the punching selection is rendered effective.

Another object is to provide means for operating the typewriter keys to effect punch control and selection without corresponding typing.

Still another object is to provide an indicator on the typewriter for indicating to the operator the progress of the punching selection.

The latter object further provides for indicating to the operator which of the card columns of a record card have been selected to be punched and the order in which different data is to be typed in order to properly select the punches for successive card columns.

A further object is to control punching means to effect repeat punching with but a single punch selecting operation.

Still another object is to control a single set of punch elements by a plurality of punch selecting mechanisms, operable one at a time.

The above object is, more specifically, to control a single set of punch elements alternately by a pair of punch selecting mechanisms.

Further, the above object contemplates the setting up of one punch selecting mechanism according to the data to be punched, while the other punch selecting mechanism is cooperating with the punch elements to punch a record card with previously selected data.

Still further, the above object provides for alternately shifting a pair of punch selecting mechanisms to punch operating and data selecting positions and to prevent such shifting before a punch operating or data selecting cycle has been completed; i. e., to prevent shifting intermediate a punch selecting or punch operating cycle.

Another object is to provide novel means for punching a record card while the card is continuously moving.

The above object includes means for continuously moving the punch selecting mechanism in synchronism with the feed of the card.

Still another object is to provide means for moving the punch selecting mechanism step by step, intermittently, and under manual control to select data to be punched.

The above object is combined with the object of providing means for moving the same punch selecting means continuously during a punching cycle; thus one means is provided to intermittently move the punch selecting mechanism step by step during data selection and another means to move the punch selecting mechanism continuously during punch operation.

Another object is to provide a novel form of punch selecting mechanism in which punch selection is effected by removable, interchangeable, interposing elements.

The above object, more specifically, includes provision of a punch selecting mechanism having interposer receiving elements any of which may receive any of a plurality of interposer elements.

Still more specifically, the latter object is to provide interposers in the form of balls or the like which may be set or loaded interchangeably into ball receiving pockets of a punch selecting mechanism.

A further object is to provide means for correcting an erroneous punch selection; i. e., as by back-spacing the punch selecting mechanism; nullifying the previous punch selection, and making another punch selection.

Still another object is to provide means for, at will, releasing the punch selecting mechanism to a final punch selecting position, without requiring intermediate steps of punch selecting operation.

Another object is to provide a punch selecting mechanism which may be moved from an operative position in the machine to an inoperative position in which it may be inspected and parts removed or changed.

Other objects will appear from the following portions of the specification and from the drawings, in which:

Fig. 2 is a side view of the machine with the side cover plate of the punching section removed to show interior mechanism.

Fig. 3 is a detail of the esecapement mechanism which feeds the punch selecting mechanism step by step.

Fig. 5 is a left side view of driving gear of the machine.

Fig. 6 is a sectional, side, view of punch selecting mechanism, particularly the loading means for such mechanism.

Fig. 6a is a detail view showing how a tooth of the back space release shutter blocks release of a ball.

Fig. 7 is a rear sectional view through the lower portion of the punch selecting mechanism showing the interposer (ball) dumping means.

Fig. 8 is a section along lines 8—8 of Fig. 7.

Fig. 9 is a top view of the ball dumping mechanism.

Fig. 10 is a rear view, partly sectioned, of the ball (interposer) feeding means.

Fig. 11 is a section along lines 11—11 of Fig. 10.

Fig. 12 is a section along lines 12—12 of Fig. 10.

Fig. 23 is a section along lines 23—23 of Fig. 1.

Fig. 24 is a section along lines 24—24 of Fig. 1.

Fig. 25 is a section along lines 25—25 of Fig. 24.

Fig. 26 is a front, fragmentary, view of the typewriter frame showing the means for indicating the progress of the punch selection.

Fig. 27 is a fragmentary view of the left side of the machine, particularly showing the operating means for the punch selection progress indicating means.

Fig. 28 is a section along lines 28—28 of Fig. 27.

Fig. 29 is a section along lines 29—29 of Fig. 27 on an enlarged scale.

Fig. 30 is a section along lines 30—30 of Fig. 13.

Fig. 30a is a detail view of part of the release means also shown in Fig. 30.

Fig. 31 is a detail view of an escapement control element.

Fig. 34 is a section along lines 34—34 of Fig. 23.

Fig. 35 is a section along lines 35—35 of Fig. 23.

Fig. 36 is a top view of parts shown in Fig. 23.

Fig. 39 is a rear view of a fragment of the punch repeat control mechanism.

Fig. 40 is a side view of the rear portion of the punch repeat control means.

Fig. 41 is a view of the left side of the escapement mechanism, with parts broken away to show interior mechanism.

Fig. 42 is a detail view, partly in section of the escapement control pin wheel.

Fig. 43 is a bottom view of the ball cylinder housing and of parts carried thereby.

Fig. 45 is a plan view of the card feeding and punching mechanism.

Fig. 45a is a detail sectional view of a part of the punch assembly.

Fig. 46 is a vertical sectional view through the punching mechanism, showing a single punch.

Fig. 50 is a bottom view of the intermediate portion of the machine.

Fig. 51 is a top view of the ball return trough and ball feeding means looking from the rear.

Fig. 52 is a view showing a typical invoice and card prepared by the machine.

Fig. 53 is a timing diagram, and

Briefly, the machine has a typewriter unit, operation of the keys of which simultaneously effects printing on an invoice blank and selection of punches. The selection of the punches is effected by placing interposers in receivers. The receivers are cylinders with pockets and the interposers are balls loaded into the pockets. After a cylinder is loaded, it is shifted under manual control to a punch operating station. There it cooperates with punch pins to punch a card in accordance with the set-up of the balls in the ball cylinder. While the one ball cylinder is at operating station effecting punch operation in accordance with a previous set-up, another ball cylinder is being loaded by operation of the typewriter keys to select a different set-up. Thus, it is not necessary to wait for one card to be punched before effecting another punch selection.

After a punching operation under control of a ball cylinder, those balls corresponding to data varying with each card are released or dumped from the cylinder, while the remaining balls set up according to data common to several cards to be punched are retained in the cylinder. This is done under control of punch repeat mechanism.

It is to be understood that the punching mechanism may be operated independently of a typewriter, by using a keyboard or the like character selecting devices without connected typing or printing mechanism. It is further to be understood that instead of using a pair of punch control cylinders only one may be used when it is satisfactory to effect punching and punch selecting in succession instead of in overlapping time relationship.

*The invoice and the tabulating card*

Figure 33:
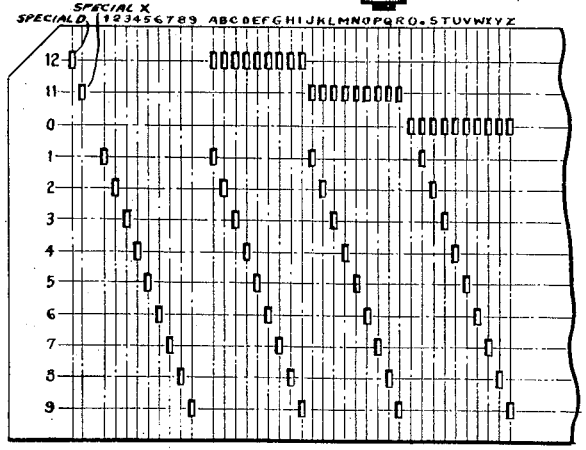
Fig. 33 shows a portion of the tabulating card indicating the punch code.

The card T is known in the art as a tabulating or record card. As shown in Fig. 52, the card has eighty vertical columns of index point or perforation receiving positions. There are twelve positions in each column, arranged as indicated in Figs. 33 and 52. The punch code used herein is illustrated in Fig. 33. Numbers 0 to 9 are represented by punching a single hole in the corresponding 0 to 9 index point positions of the card columns. The letters of the alphabet and the period (punctuation mark) are represented by two hole combinations of perforations in the card columns. In addition, the "11" and "12" positions, respectively known as the X and D positions may be perforated to control tabulating operations.

As indicated in Fig. 52, the left hand section of the card contains repeat data; i. e., such data as is common to a single transaction of several separate items. This repeat data is punched on a plurality of cards, each card relating to a different item of the single transaction. The right hand section of the card contains individual data; i. e., data peculiar to one particular item and punched only on one card.

The invoice B shown in Fig. 52 is merely exemplary. It contains the data of several individual items sold to one customer. The data is taken from sales slips, or other original sources, to be typed in on the invoice. The date, October 5, 1929, is not to be punched in this form but in coded form, into card T.

As shown in Fig. 52, the first two card columns are punched in positions 2 and 9 to represent year '29; the next column is punched in position 0 to represent the tenth month, and the next two columns are punched with the day designations 05. The coded form of the date, the invoice number, the customer number, the town, State, classification, branch, salesman, and customer's name are to be punched in the Repeat data section of the card, since this data is common to the entire list of items on the bills. The quantity, commodity number, unit number, and amount of one item on the list is to be punched in the Individual data section of the card. For each separate item, a separate card will be punched containing the repeat data and the individual data pertaining only to one item. The freight data and account number card column are not to be perforated with data in this particular example. The X position of the first freight column is accordingly perforated to cause the succeeding columns to be skipped over by the punching mechanism, as will be later described.

Typewriter unit

While the typewriter used may be of any suitable design, the one selected for purposes of the invention is of the type shown in Patent No. 1,777,055, with such changes as are required by the present invention.

Figure 1:
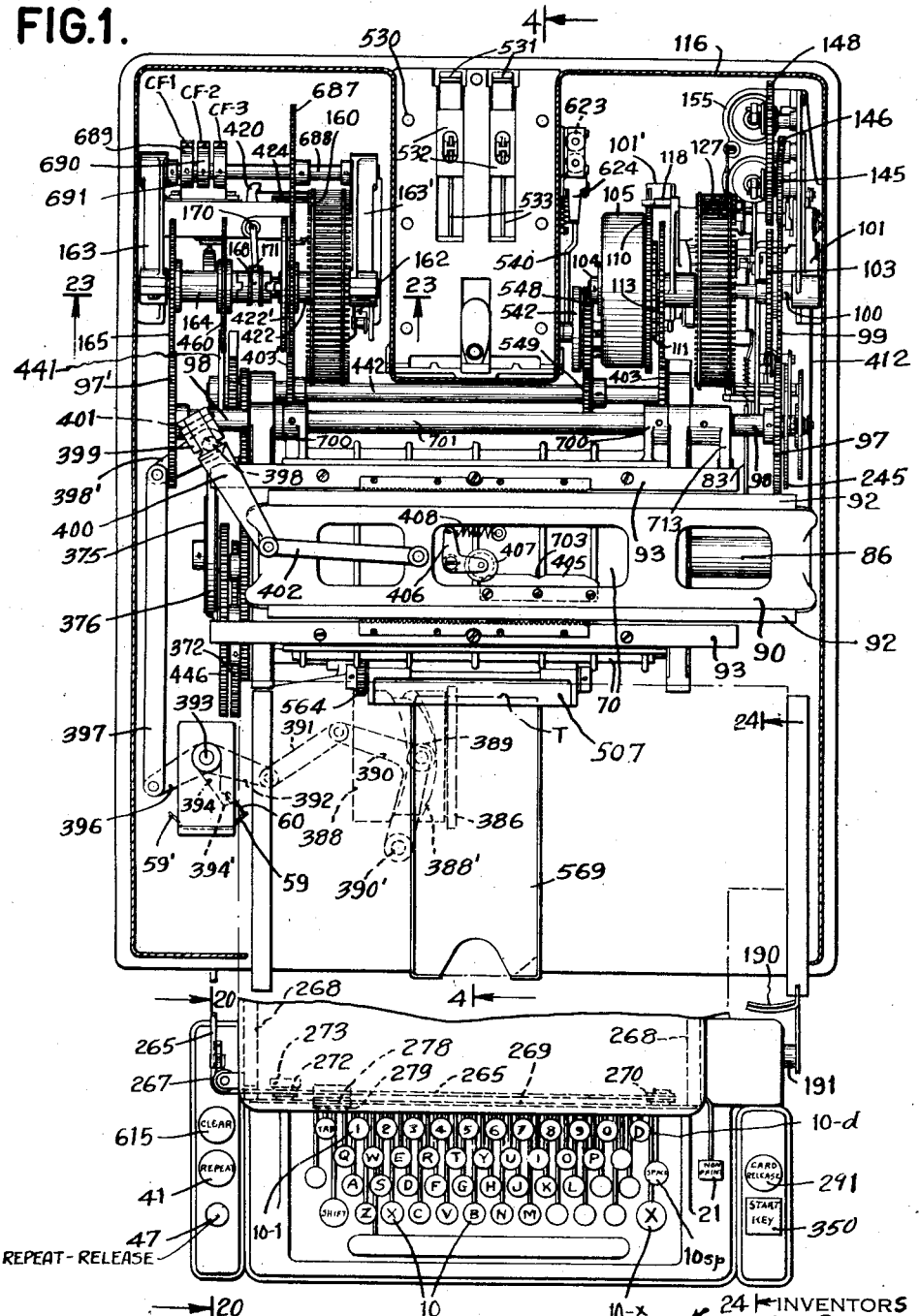
Fig. 1 is a plan view of the machine, with most of the covering removed to show the interior mechanism.
Figure 22:
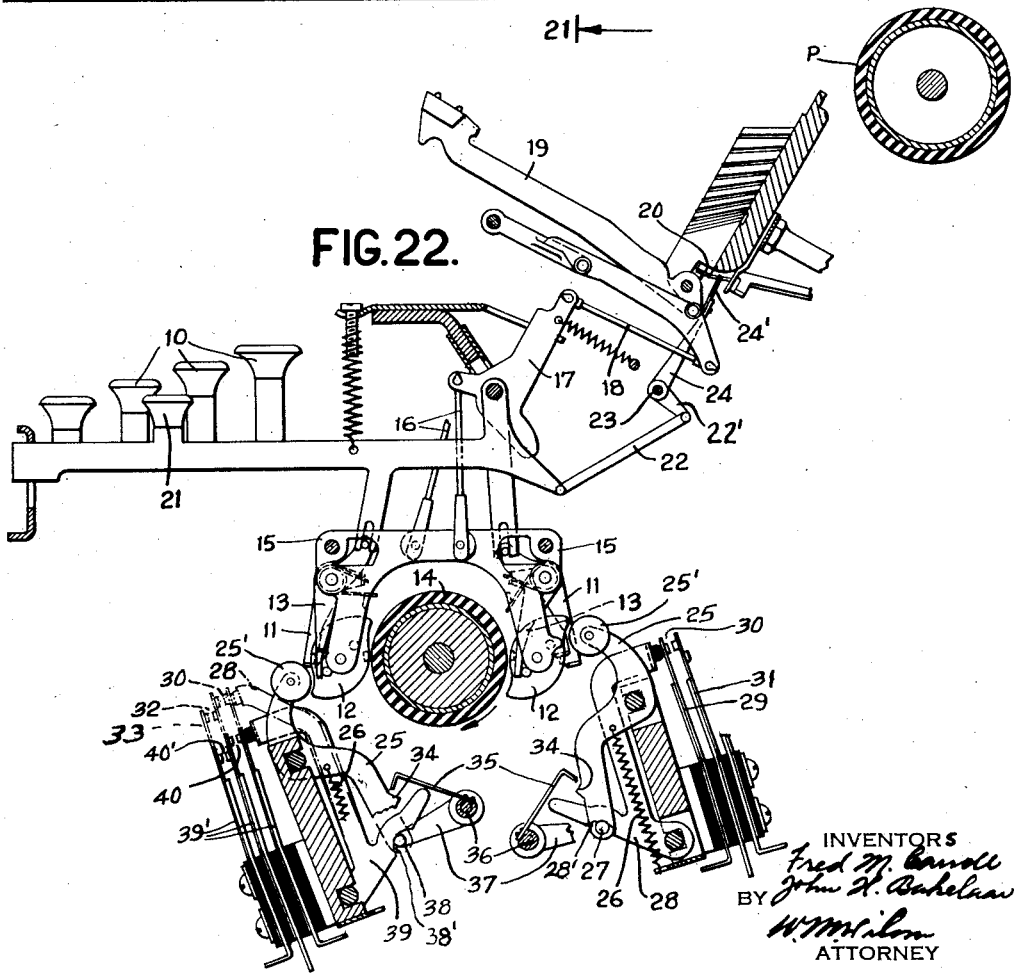
Fig. 22 is a section through the typewriter unit showing the punch and type selecting or setting up means.

Referring to Figs. 1 and 22, the typewriter keyboard has the usual numerical and alphabetical character keys 10. Depression of a key 10 releases a latch 11 from one of a pair of opposite cams 12, permitting a spring-pressed lever 13 to bring the cam against a friction roller 14 continually rotated by a motor (not shown) supplied within the typewriter unit.

When a cam 12 is brought against roller 14, the latter imparts half a turn to cam 12 and then the latch 11 again arrests the cam in a position disengaged from the roller. The cam is eccentrically carried by a pivoted frame 15, and rotation of the cam is in such a direction as to cause frame 15 to depress connected link 16 for rocking a lever 17 counterclockwise (Fig. 22). Each lever 17 is connected through linkage 18 to a type bar 19. When lever 17 is rocked counterclockwise, due to depression of the associated key 10, the lever acts through linkage 18 to propel the type bar 19 against platen P to type the character selected by the key 10.

A curved universal bar or bail 20 extends across all the type bars and is resiliently urged towards the type bars. The final increment of movement of a type bar towards the platen is effected by momentum, and during such movement and before the type bar can effect printing, it strikes bail 20 to move the latter for effecting letter spacing, escapement operation of the typewriter carriage 233 (Fig. 2). The letter spacing means connected to bail 20 is fully disclosed in Patent No. 1,873,512.

For reasons which will appear later, it is sometimes desired to operate a key 10 to cause rotation of the associated cam 12 without producing either a typing or letter spacing operation. For this purpose, a special, non-print key 21 is provided at the right side of the key-board. Key 21 is similar to the other, character, keys, and is similarly pivoted and resiliently urged upwardly. The right end of key 21 is connected through a link 22 to an arm 22' dependent from and rigidly secured to a shaft 23. Shaft 23 carries an arm 24 which rigidly supports a curved spring metal plate 24' located behind universal space bail 20.

When key 21 is in initial position, plate 24' is remote from bail 20, permitting normal operation of the bail. Whenever key 21 is depressed, through link 22 and arm 22', it rocks shaft 23 counterclockwise (Fig. 22), causing spring plate 24' to move upwardly and against the rear edge of universal bail 20. As a result, when a key 10 is subsequently depressed and the associated type bar during its final increment of free, momentum-actuated movement strikes bail 20, then the latter being restrained by spring plate 24' is unable to move to the rear. Since bail 20 cannot move to the rear, then the type bar cannot move to complete its stroke and, therefore, does not print. Also, since bail 20 does not move, no letter spacing operation of carriage 233 takes place. Due to the arrest of the type bar 19 and space bail 20 taking place during the momentum-propelled, final increment of movement of bar 19, the associated cam 12 is able to complete its rotational step. Thus, depression of non-print key prevents typing and letter spacing but does not interfere with rotation of the cam 12.

Supplementing the key mechanism is contact-closing means comprising levers 25, one for each of the opposite cams 12. When a cam 12 rotates, it engages roller 25' of lever 25 to rock the latter against resistance of a spring 26. The lower end of each lever 25 has a stud 27 seated in a cam recess 28' in the bottom of a horizontally extending arm of a bell crank 28. The bell cranks 28 are engaged at their upper ends with spring blades 29, each carrying one of the points of a switch 30, the other point of which is on a companion blade 31. Some of the bell cranks 28 are also associated with an additional switch 32, the points of which are carried between spring blade 31 and a companion blade 33, as indicated at the left in Fig. 22.

When a key 10 is depressed, it causes rotation of a cam 12 to rock a lever 25 which, in turn, through coaction of its pin 27 with cam recess 28' of a bell crank 28 moves the latter in a direction to close either switch 30 or switches 30 and 32 depending on whether the one or both switches are associated with the key 10 and the corresponding bell crank 28.

According to the punch code illustrated in Fig. 33, the numbers are represented by single hole punchings in a card column while the letters of the alphabet are represented by combinations of two hole punchings in a card column. As will be brought out later, switches 30 and 32 each select means to make a single punched hole in a card column. Thus the numerical character keys 10 are correlated with the single switches 30 to cause selection of single hole punchings while the alphabetical character keys are correlated with the two switches 30 and 32 to cause selection of two hole punchings.

It may also be noted from the code in Fig. 33 that the 11 index point position may be perforated to designate a special X while the 12 index point position is perforated to represent a special D designation. Also, an 11 index position perforation may represent number 11, as numerically symbolizing the 11th month, November; and likewise the 12 index position perforation may represent value 12. Further, it may be noted that the representation of numerical "1" is distinct from the representation of letter l. To take care of the selection of the special X and special D punchings, which are not accompanied by printing operations, the keyboard (Fig. 1) is provided with special X key 10—x and with special D key 10—d. The special X key is also used to initiate skipping of punch selections of selected columns, and may be referred to as a skip key. Neither of keys 10—x or 10—d has a type linkage associated therewith so that their depression will not cause either a printing or a typewriter carriage feed.

The L key 10 is ordinarily used to cause typing of both the "1" and the "L" characters. Here, however, since the "L" punched representation is different from the "1" punched representation, a special numerical "1" key 10—1 is provided for selecting the "1" punching and printing, while the L key is used only to select "L" punching and typing.

Each lever 25 has a shoulder 34. Each of the two rows of levers 25, one at each side of the shaft 14, has its shoulders 34 underlying the tip of one of a pair of similar common bails 35, each bail fixed to a separate shaft 36. Fast to each shaft 36 is an arm 37 provided with a stud 38 coacting with a cam recess 38' in the lower arm of a bell crank 39. The upper end of bell crank 39 is opposite spring blades 39' carrying between them contacts 40 and 40'. Whenever a key 10 is depressed to cause rocking of a lever 25 to close switches 30 and 32, shoulder 34 of the lever 25 acts on the tip of the associated bail 35 to rock shaft 36 in a direction to move its arm 37 upwardly. The upward movement of arm 37 causes its stud 38 to coact with cam recess 38' of lever 39 to rock the latter in a direction to close contacts 40 and 40'. The two pairs of contacts 40 and 40', one pair associated with the left hand row of levers 25 and the other pair with the right row of levers 25 (Fig. 22) have a similar function and only one pair of contacts 40 and 40' will be shown in the circuit diagram, Fig. 54. It is clear that depression of any key 10 causes typing of the selected character, letter spacing operation, the closing of a pair of contacts 30, with or without accompanying closure of a pair of contacts 32, and also closure of a pair of common contacts 40 and 40'. When non-print key 21 is depressed, the subsequent depression of a key 10 effects all of above results except the typing and letter spacing operations.

The several contacts 30, 32, 40, and 40' are closed only momentarily by operation of keys 10, due to the quick return of the cams 12 to initial, latched positions.

As stated before, invoice B to be typed in the machine may have a plurality of individual items billed to a single customer. The machine is intended to prepare a separate tabulating card T for each individual item. A card T is not only to contain the data of the individual item but also the repeat data common to several cards. In order to avoid repeating the punch selections for the common data—which is typed in only once—a repeat key 41 (Figs. 1, 20 and 21) is depressed.

Figure 20:
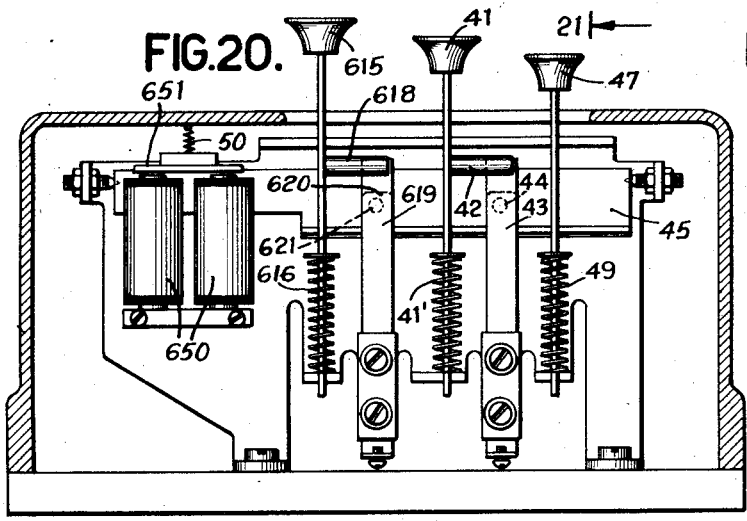
Fig. 20 is a section along lines 20—20 of Fig. 1.
Figure 21:
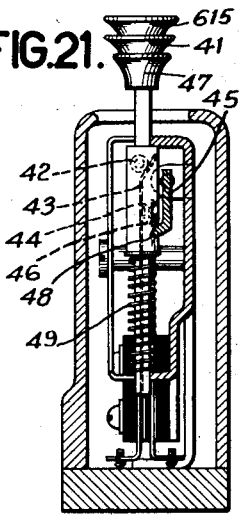
Fig. 21 is a section along lines 21—21 of Fig. 20.

Referring to Figs. 20 and 21, depression of key 41 against resistance of its spring 41' causes a pin 42 extending from the stem of the key to engage the inclined upper end of a spring blade 43 to close normally open constant data contacts 44. Key 41 is retained in depressed position by a pivoted lock bar 45 which enters a notch 46 in the key when the latter is depressed. In front of key 41 is a release key 47 therefor which in normal position has a notch 48 engaged by lock bar 45. When key 47 is depressed against resistance of its spring 49, the upper inclined side of notch 48 cams bar 45 counterclockwise (Fig. 21) against resistance of a spring 50 connected to the lock bar (see Fig. 20) thereby releasing the lock bar from notch 46 of key 41. Spring 41' then returns key 41 to its normal, inactive position. When release key 47 is relieved of the pressure of the operator's finger, spring 49 returns the release key to the normal position shown in Fig. 21.

As will be clear from subsequent portions of the description, the punch selecting operations cannot begin until repeat key 41 is depressed. Accordingly, before depressing repeat key 41, the operator types in preliminary data on the invoice which is not to be selected for punching while being typed. In the example shown in Fig. 52, the order designation (E789) and the conventional form of the date (October 5, 1929) are first typed in; then following this typing operation, the repeat key is depressed.

The first five columns of the card T (Fig. 52) are to be punched with coded representations of the numerical symbolic form of the date. In the illustrated example, positions 2 and 9 are to be punched in the year columns, 0 (representing the tenth month) in the month column, and 0, 5 in the day columns. The keys 10 for setting up these date designations are operated while holding down non-print key 21 to avoid printing this matter on the invoice.

When a number key 10 is depressed to set up a numerical item, it causes the associated switch 30 to close and, at the same time, causes closure of contacts 40 and 40', as already explained. Also, constant data contacts 44 are now closed.

Figure 54:
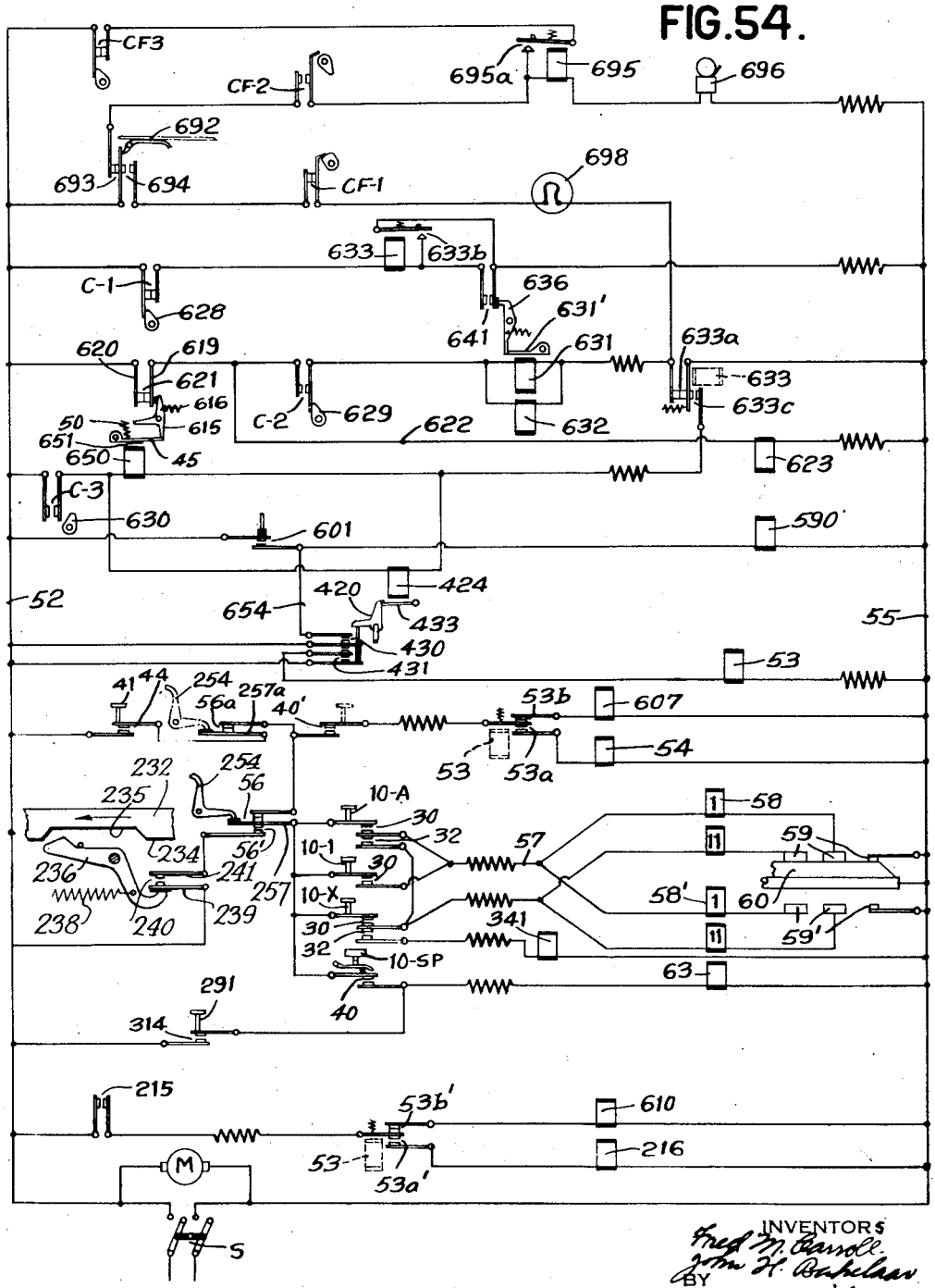
Fig. 54 is a circuit diagram.

With constant data contacts 44 closed, the closure of contacts 40' forms the following constant data circuit, referring to Fig. 54.

*Circuit A.*—From line 52, through contacts 44, normally closed contacts 56a, contacts 40', lower relay contacts 53a (closed during the first punch selecting operation, as will be further explained), magnet 54, and to line 55.

Simultaneously the following loading circuit is formed:

*Circuit B.*—From line 52, through contacts 44, contacts 56a, contacts 56 (now closed), switch 30, a loading magnet 58 or 58', contact stud 59 or 59', switch bar 60 (which by its position determines whether magnets 58 or 58' will be in the circuit), and to line 55.

If the key 10 is an alphabet key, then its depression closes a switch 32 in addition to a switch 30, and another circuit B is formed through switch 32 to energize a second loading magnet.

In addition to circuits A and B, the following punch escapement circuit is formed:

*Circuit C.*—From line 52, through contacts 44, contacts 56a, contacts 56, contacts 40, escape magnet 63, and to line 55.

*Loading mechanism*

Figure 47:
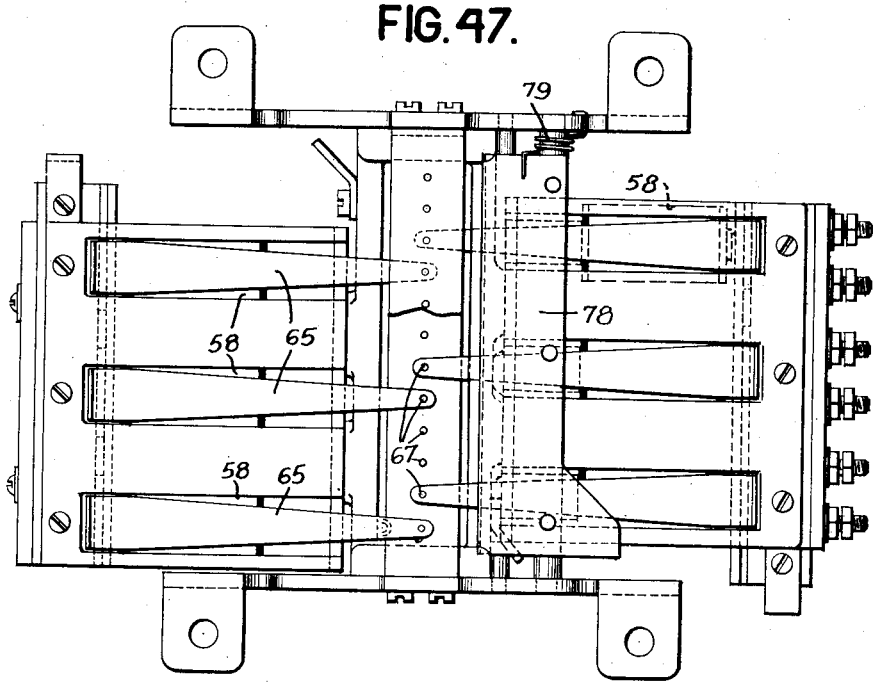
Fig. 47 is a plan view of the upper layer of six loading magnets and their related elements.
Figure 48:
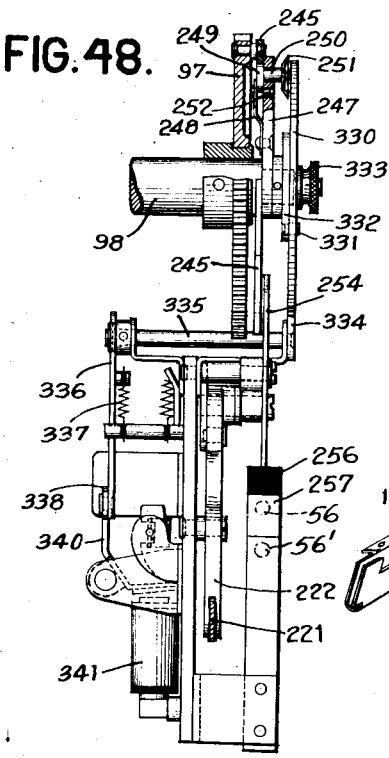
Fig. 48 is a section along lines 48—48 of Fig. 32.
Figure 49:
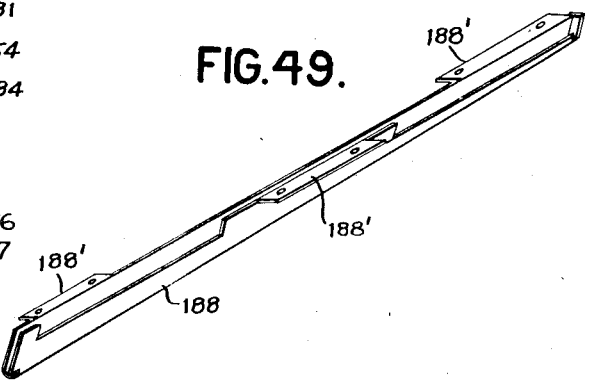
Fig. 49 is a detail, perspective, view of the back space ball return trough.

The operation of loading magnets 58 and 58' will be explained first. As viewed from the front of the machine and indicated in Fig. 14, a set of magnets 58 is at the right side of the machine and a set of magnets 58' at the left. There are twelve magnets in each set, arranged in two layers of six each (see also Figs. 4, 6, and 47). Each magnet coacts with an armature 64 fixed to the vertical arm of an L-lever 65 pivoted at 66. The horizontal arm of each lever 65 supports a different one of the vertical slide wires 67 which in turn engage at their upper ends with plungers 68, slidably mounted in a bracket 69 fixed to a cylinder housing 70 (see also Figs. 43 and 44). The slide wires 67 and plungers 68 are arranged in two sets of twelve each, each set being alined in a direction parallel to the axis of the cylinder housing, and spaced in said direction from the other set similarly to the spacing of the set of magnets 58 from the set of magnets 58', as particularly indicated in Figs. 14, 43, 44, and 47.

Plungers 68 are normally depressed by springs 71 encircling the plungers. When in lower, normal position, the plungers 68 are directly underneath the row of balls 72 at the lower ends of inclined ball ducts, channels, or chutes 73 (see particularly Figs. 6, 43 and 44) formed in bracket 69. There is a duct 73 for each plunger, and the duct opens at the lower end above the plunger and into the interior of cylinder housing 70. The ducts are continually supplied with balls 72 by means which will be described later. The balls feed down the duct by gravity so that when a ball is removed from the lower end of a duct, the next ball moves down into the vacated space.

When a loading circuit B is formed, a loading magnet 58 or 58' is energized. Energization of the loading magnet attracts its armature 64 to rock the associated lever 65 in a direction to raise wire 67 and, through the latter, to lift plunger 68 against resistance of its spring 71. As the plunger rises, it elevates the ball 72 directly above it and sets or loads the ball into a pocket 75 of a right hand ball cylinder 76 (when a magnet 58 is energized) or into the pocket of a left hand ball cylinder 76' (when a magnet 58' is energized). This may be called the loading operation.

When a wire 67 is elevated by energization of a loading magnet, it rocks a bell crank lever 77 clockwise (Fig. 6) placing the upper end of the latter behind the nose of a pivoted latch bar 78, there being one such bar for each set of twelve wires 67. Each wire 78 is urged counterclockwise by a spring 79 (see also Fig. 47).

The rear arm of each latch bar 78 is engaged with the free end of one of a pair of arms 80 fast to and spaced apart along a shaft 81, which at the right hand end (Fig. 14) rigidly carries an arm 82, the upper end of which abuts a horizontal push or slide wire 83. This push wire is under control of the escapement mechanism, which will be later described, and controls release by latches 78 of levers 77 in a manner to prevent wires 67 from returning, downwardly, until the escapement has operated to rotate cylinder 76 or 76' clockwise (Fig. 6) to move the pocket last loaded with a ball away from loading position.

Figure 14:
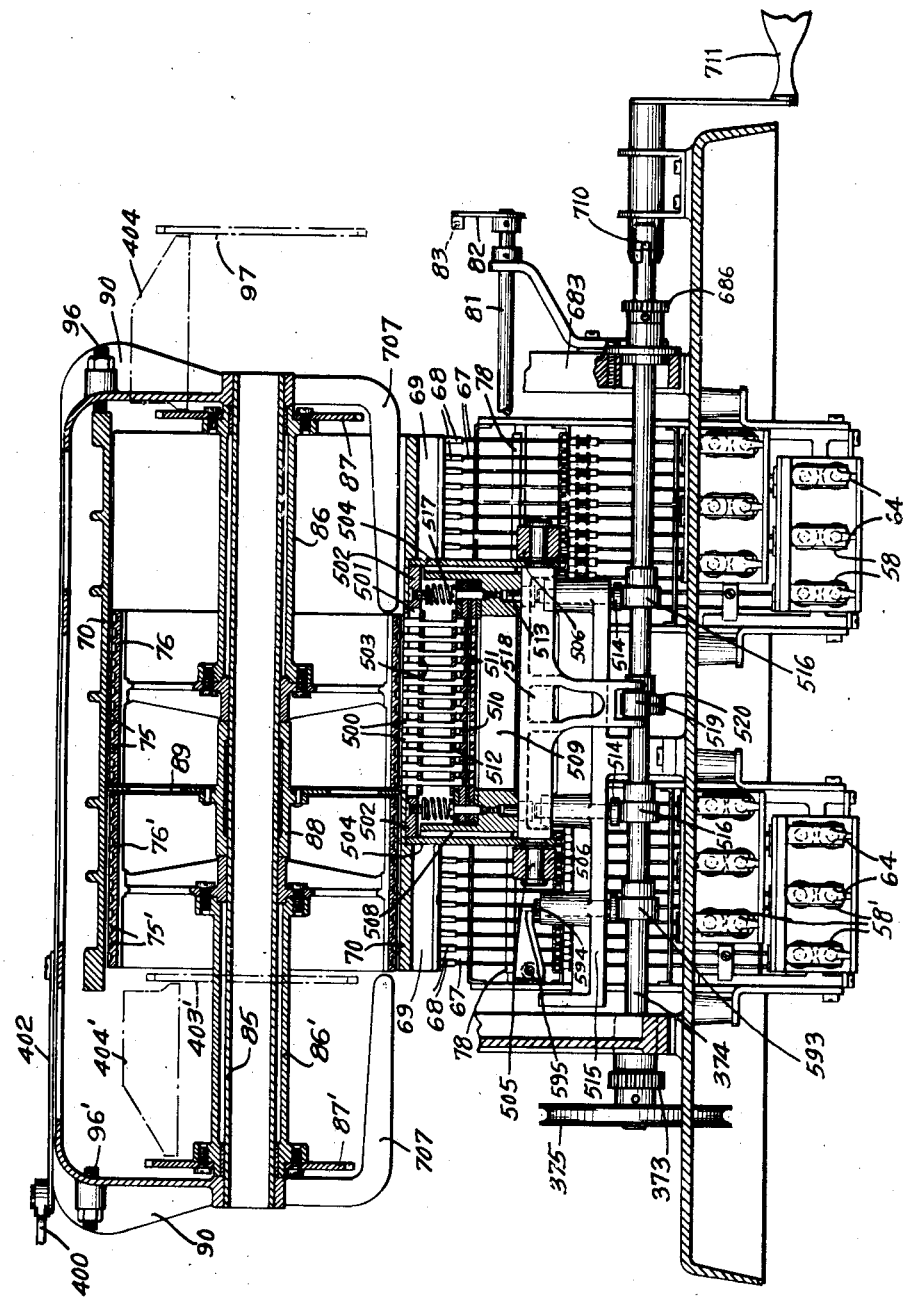
Fig. 14 is a front section along lines 14—14 of Fig. 4.

As indicated in Fig. 14, ball cylinder 76 is at the right of ball cylinder 76'. The ball cylinders are identical in construction. For punching any of the twelve index points 9, 8 . . . 0, 1, 11, and 12 of each of the eighty columns of a card T, each cylinder is provided with eighty horizontal rows of pockets 75, each horizontal row including twelve pockets. Thus, each horizontal row corresponds to a different one of the eighty card columns, and, for convenience, may be referred to as the cylinder column, corresponding to a particular card column. The twelve pockets of each cylinder column are in circumferential alinement with the twelve pockets of all the other cylinder columns. Thus, a development drawing of the cylinder would show eighty columns of pockets 75 arranged in twelve rows, corresponding to the arrangement of the index point positions of the eighty column card. It follows that for each index point position of the card, there is a corresponding pocket 75 on each cylinder. If it is desired to perforate this index point position, then a ball 72 is loaded into the corresponding pocket 75 by energization of magnet 58 or 58', in the manner already described.

Cylinders 76 and 76' are rotatably carried by a non-rotatable tube 85 (see Figs. 2, 4, 6, 14, 17, 43, 44). Also rotatably mounted on tube 85 are independent sleeves 86 and 86' (Fig. 14). Sleeve 86 has fast to its right end a gear 87 while sleeve 86' is provided at its left end with a similar gear 87'. At the ends opposite these gears, sleeves 86 and 86', respectively, are fastened to cylinders 76 and 76'. The cylinders are spaced apart by a collar 88 (Fig. 14) which carries a disk 89 between the cylinders to form a support for the central part of tube shaft 85.

Shaft 85 is fixed at opposite ends to the vertical sides of an inverted U-shaped carriage 90. Sleeves 86 and 86' abut the sides of carriage 90 so that the entire assembly of cylinders 76 and 76', sleeves 86 and 86', and the collar 88 are restrained from movement relative to each other along tube shaft 85. Longitudinal shifting of the carriage will move shaft 85 and all the parts thereon to an equal extent in a direction axial of the shaft.

Referring to Figs. 1, 2, 4, 6, and 17, the top of carriage 90 is formed along its longitudinal sides with tracks 92 having V-cut edges opposite similar edges of tracks 93 secured to the top of cylinder housing 70. The carriage rides on balls 94 located between the V-edges of the tracks 92 and 93. Carriage 90 and the parts carried thereby—shaft 85, cylinders 76 and 76', etc.—are thus mounted for horizontal movement along cylinder housing 70 in a manner similar to that in which a typewriter carriage is mounted on its frame.

The interior of the cylinder housing closely circumscribes the cylinders 76 and 76' to retain the balls in the pockets of the cylinders and prevent their escape except through certain passages formed in the cylinder housing walls, as will be later described.

Figure 17:
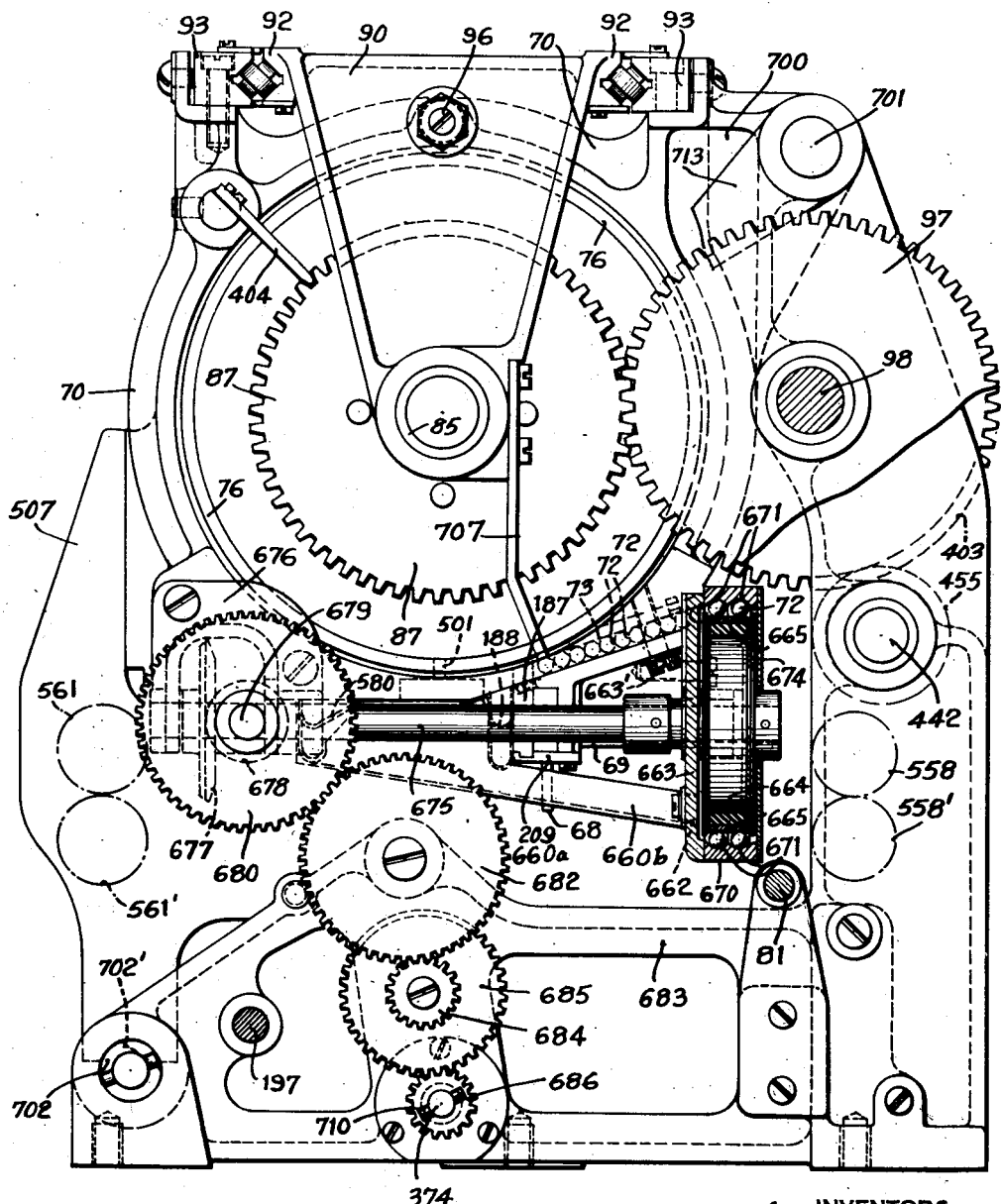
Fig. 17 is an enlarged side view of the punch selecting or loading mechanism, partly sectioned.

Each ball cylinder has two, alternative, stations or positions, one a loading station and the other a punching station. The punching station is central of the cylinder housing 70 and is the same for each cylinder, while the loading stations of the two cylinders are at opposite sides of the punching station. In Figs. 1 and 17, the right hand cylinder 76 is at loading position while left hand cylinder 76' is at punching position. By shifting carriage 90 to the left (Fig. 1) cylinder 76 is brought to the punching position and cylinder 76' to its loading position. In Figs. 7, 14, 43, and 44, cylinder 76' is at the loading position while cylinder 76 is at the punching station. The correct extent of movement of the carriage 90 is accurately determined by adjustment of screws 96 and 96' (see Fig. 14) carried by the sides of the carriage. Screw 96 engages the right end (as viewed in Fig. 14) of housing 70 to limit adjustment of carriage 90 to the left while screw 96' engages the opposite end of housing 70 to limit movement of carriage 90 to the right.

When cylinder 76 is in loading position, its associated gear 87 is meshing with a gear 97 fast to the right hand end (as viewed from the front of the machine and in Fig. 1) of an escapement-driven shaft 98, and the cylinder 76 is thereby conditioned for step-by-step rotation by operation of escapement mechanism.

When carriage 90 is shifted to the left to position the parts as in Fig. 14, gear 87 is demeshed from gear 97, while gear 87' is meshed with a gear 97' on the left end of shaft 98 (as viewed in Fig. 1) to connect cylinder 76' on the escapement mechanism. The bottom view, Fig. 43, shows the meshing of gears 87' and 97' when cylinder 76' is in loading position.

Escapement mechanism

Figure 13:
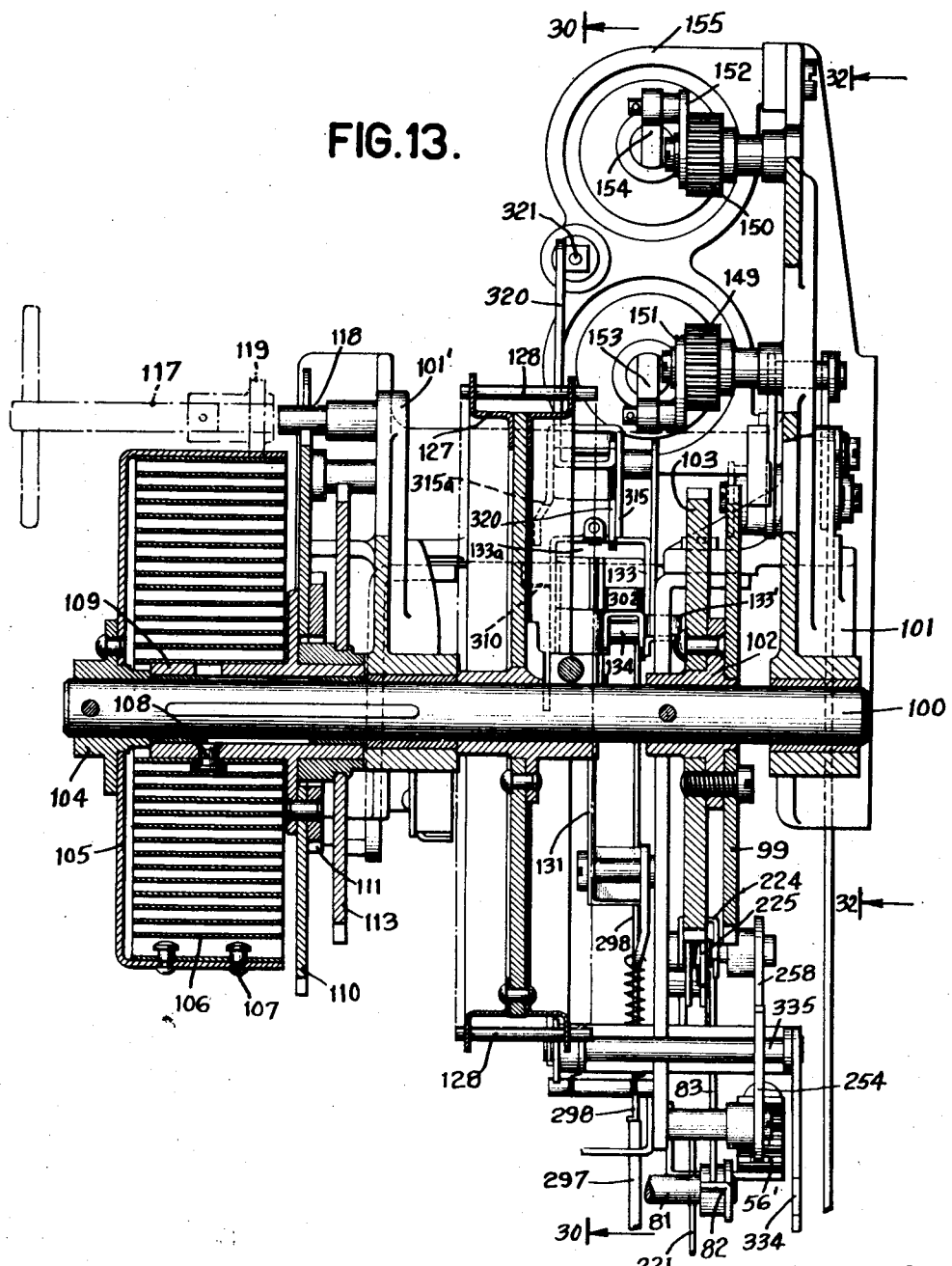
Fig. 13 is a plan section through the escapement drive.

As shown in Figs. 1 and 2, gear 97 is driven by a gear 99. Referring particularly to Fig. 13, gear 99 is rigidly carried by escapement shaft 100 journaled in frame brackets 101 and 101'. Gear 99 is mounted on shaft 100 through a collar 102 pinned to the shaft and to which is riveted an escapement ratchet wheel 103 (see also Fig. 32). Shaft 100 has fixed to its left end a collar 104 to which is riveted the casing 105 of a clock spring 106, which may be referred to hereafter as the motor spring.

The outer end of spring 106 is fixed to casing 105 by rivet pins 107 while the inner end is secured to stud 108 of a bushing 109 having a flange to which are riveted a manual winding gear 110 and a ratchet gear 111 (see also Fig. 41). Bushing 109 is rotatably mounted about escapement shaft 100 and, in turn, rotatably mounts a gear 113.

Initially, spring 106 is wound up by the operator who removes the rear casing 116 (Fig. 2) and slips a key 117 on a journal 118 carried by frame 101'. Key 117 is formed with a pinion 119 to mesh with gear 110 and rotate the latter, when the key is turned, so as to wind up spring 106. Spring shell 105, as well as shaft 100 to which the shell is fixed, is meanwhile held stationary by engagement of a home position stop 120 (see Figs. 2 and 32) carried by gear 99 with a stop 122, the operation of which will be later explained.

After the spring is wound up, the operator removes winding key 117. Gear 110 is prevented from rotating reversely under the power of the spring by means of a pawl 123 (see Fig. 41) pivotally carried by gear 113 and forced into engagement with the teeth of ratchet wheel 111 by a spring 124.

Gear 113 is stationary while gear 110 is being manually operated to wind up the spring. During subsequent operations, gear 113 is automatically rotated counterclockwise (Fig. 41), by means which will be described later, and acts through pawl 123 and ratchet wheel 111 to rotate gear 110 for automatically rewinding spring 106.

Referring particularly to Fig. 13, mounted rigidly on an intermediate part of shaft 100 is an escapement control pin wheel 127. As indicated in Fig. 41, wheel 127 has eighty pins 128 around its periphery, one pin corresponding to each card column and each of the eighty pockets 75 in a circumferential row of the ball cylinders. Pins 128 are slidably seated in transverse holes in the rim of wheel 127, and frictionally retained by U-shaped spring clips 129 (see Fig. 42) in any position to which they are moved along their seats. Initially, the pins project further to the right of the wheel, as viewed in Figs. 13 and 18, and when in such position are engageable during rotation of wheel 127 with the projection 130 of a lever 131 (see also Fig. 30). This lever is connected, at its right end, by a spring 132 to the cross web or base 133a of an escapement control yoke 133 (shown in detail in Fig. 19) rotatably mounted on a fixed pivot 134.

At its upper end yoke 133 is formed with a transversely projecting lug 133' which lies in back of a latch 135 (see Figs. 3 and 32) formed at its upper end with a transversely bent lug 135'. Latch 135 is urged counterclockwise (Fig. 32) by a spring 136 to maintain the latch lug 135' above a lug 137 of an escapement pawl 138. Pawl 138 is pivoted at 139 to an escapement lever 140, and is urged counterclockwise (Fig. 32) by a compression spring 141 to engage its nose 138' with a tooth 103' of ratchet wheel 103. When latch lug 135' is above lug 137 of the pawl, the latch prevents the pawl from engaging its nose with ratchet teeth 103'.

Figure 32:
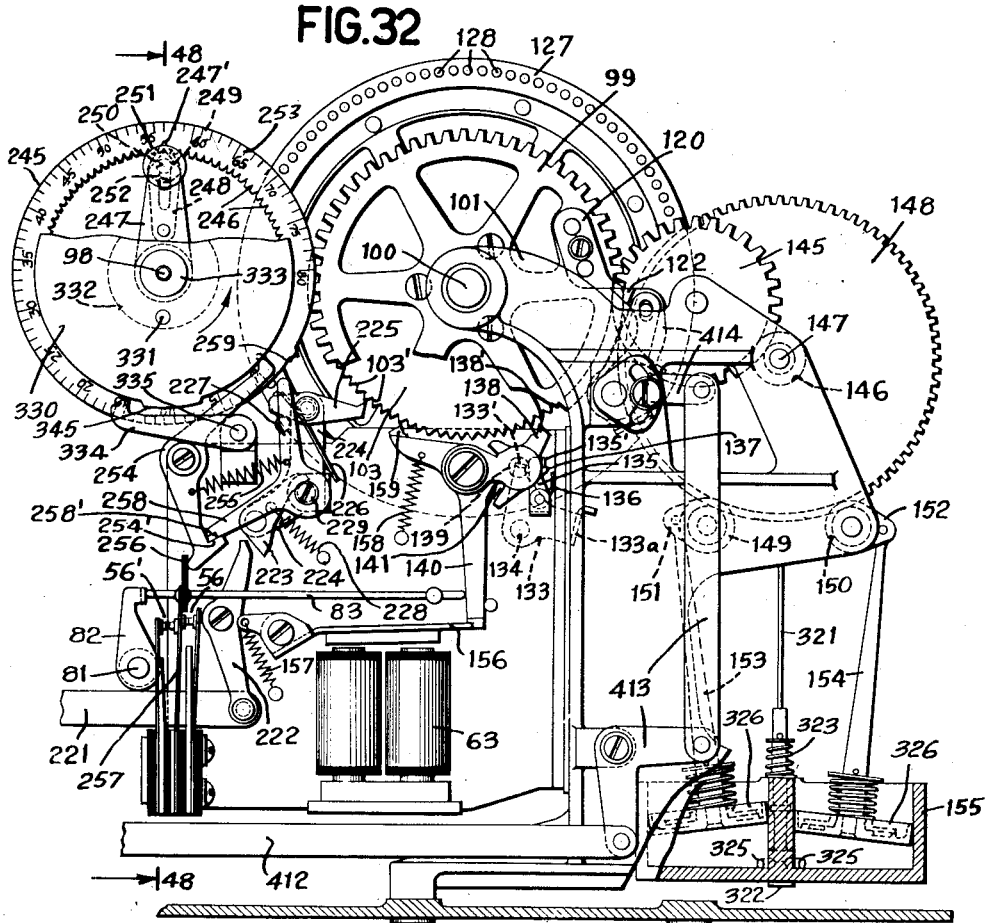
Fig. 32 is a section along lines 32—32 of Fig. 13.

As indicated in Fig. 41, the eighty pins 128 of pin wheel 127 do not extend fully around the circumference of the wheel, leaving a gap between the two pins corresponding to the eightieth and to the first card column. At the start, lug 130 of lever 131 is within said gap, just in advance of the first column pin 128, and this permits a spring 142 connected to the lever to hold it in counterclokwise position (Fig. 30). Through engagement of the right end of lever 131 with the bottom of the web 133a of yoke 133, the latter is also set in counterclockwise position (see also Fig. 32). In this position of the yoke 133, its projection 133' is remote from the back of latch 135, permitting spring 136 to hold latch lug 135' above lug 137 of pawl 138. The pawl is thus intially disengaged from escapement wheel 103, as indicated in Fig. 32.

When stop 122 is withdrawn from coacting stop 120 of wheel 103, in a manner which will be later explained, then shaft 100 is released for rotation, clockwise (Fig. 32) by motor spring 106. Pin wheel 127, which is fastened to shaft 100, thereupon also rotates clockwise (Fig. 29) and the first column pin 128 cammingly coacts with lug 130 of lever 131 to depress the latter until the pin 128 lies on top of lug 130. As lever 131 is depressed, through spring 132, it rocks yoke 133 clockwise, as viewed in Figs. 30 and 32. Projection 133' of yoke 133 thus moves to engage latch 135 and rock the latter clockwise, against resistance of spring 136, thereby displacing latch lug 135' to the right of (see also Fig. 3) and to a position clear of lug 137 of pawl 138. Spring 141 thereupon rocks the pawl counterclockwise to engage its nose 138' with a tooth of escapement wheel 103. This engagement arrests wheel 103, its shaft 100, and pin wheel 127 when the first column pin 128 has moved onto the top of projection 130 of lever 131. Shaft 100 and its parts are now in first column position.

Either ball cylinder 76 or 76' may be at their respective loading stations. Assuming that the right hand ball cylinder 76 is now at its loading station, then its gear 87 is meshing with gear 97. Therefore, as shaft 100 moved to first column position, through gears 99, 97, and 87, it rotated ball cylinder 76 clockwise (Fig. 6) to locate its first horizontal row of twelve pockets 75 corresponding to the first card column vertically above the set of twelve loading pins 68 (Fig. 6).

Gear 99 of escapement shaft 100 is also meshed with a pinion 145 which in turn meshes with a pinion 146 on a shaft 147 carrying a gear 148. Gear 148 drives a pair of spaced pinions 149 and 150 (see Figs. 13 and 32), the shafts of which carry crank arms 151 and 152 connected to plungers 153 and 154, each coacting with one of the cylinders of an air dash pot governor 155.

When the escapement shaft 100 moves one escapement step, or equivalent to the distance between successive teeth 103', then pinions 149 and 150 are each partially rotated to cause plungers 153 and 154 to move in opposite directions so as to dampen the escapement movement of shaft 100 and the parts driven thereby.

As explained before, when a key 10 is depressed, it causes a circuit C to be formed for energizing escape magnet 63. Armature 156 of magnet 63 (see Fig. 32) is urged counterclockwise by a spring 157 into latching engagement with the lower notched end of lever 140. When the parts of the escapement mechanism on shaft 100 are moved to first column position, as already described, then spring 141 seats the nose 138' of escapement pawl 138 between two teeth 103' of ratchet wheel 103. As wheel 103 is urged clockwise (Fig. 32) by motor spring 106, the tooth 103' engaged with the right side of pawl nose 138' tends to cam the latter downwardly and to the left.

The pawl 138 is so pivoted to lever 140 that this pressure of wheel 103 on the pawl tends to rock lever 140 clockwise. But lever 140 is unable to rock clockwise while latched up by armature 156.

When magnet 63 is energized by circuit C, armature 156 is depressed and unlatches lever 140. Spring 106 now is free to turn wheel 103 clockwise, and during this movement of the wheel, the tooth 103', engaged with the right side of pawl nose 138', cams against the latter to rock the pawl 138 and its carrying lever 140 clockwise against resistance of a spring 158. The nose 159 of lever 140 is initially opposite the point of a tooth 103'. As wheel 103 is rotating and lever 140 moving clockwise, the space between two teeth 103' is brought opposite nose 159 and the latter enters this interdental space.

The proportions of the parts are such that the nose 138' will fully clear teeth 103' at the same time as nose 159 fully seats between two teeth 103'. At this point, one half the escapement step has been completed. As wheel 103 continues to turn clockwise, the tooth 103' engaged with the right side of nose 159 cams against the latter to rock lever 140 counterclockwise. Pawl 138 moves bodily with lever 140 and the nose 138' again moves between two teeth 103'. When the nose 138' is fully seated between the teeth 103', the counterclockwise, return movement of lever 140 is arrested and nose 159 is opposite the point of a tooth 103' to the right of the one which it faced at the beginning of the escapement operation. The parts carried by lever 140 are now in initial position and a full escapement step has been completed.

By the time lever 140 has been returned to its initial position, contacts 40' have reopened to break circuit C; magnet 63 is deenergized; and spring 157 restores armature 156 into latching position with respect to lever 140. Escapement wheel 103, its shaft 100, and the other parts rigid with the shaft are thereby normally prevented from continuing their rotation after the completion of a single escapement step.

If during the escapement movement of shaft 100, cylinder 76 is in loading position, then through gears 99, 97, and 87, cylinder 76 is moved correspondingly in a clockwise direction (Fig. 6), a distance equal to that between successive horizontal rows of pockets 75. If, instead, cylinder 76' is in loading position, it is similarly moved by gearing 99, 97, 97' and 87'. This step movement of a cylinder 76 or 76' brings the next horizontal row of twelve pockets 75 to loadnig position.

Thus, when a key 10 is depressed, it causes energization of a loading magnet to load one or two pockets 75 of a horizontal row of a ball cylinder, and simultaneously causes energization of the escape magnet 63 to release the escapement mechanism for one step of movement. The escape magnet is slower acting than a loading magnet and, consequently, armature 156 does not release lever 140 and the escapement drive for operation until after the balls 72 have been lifted into pockets 75 of the cylinder at loading station. As previously explained when loading wires 67 rise, they rock levers 77 which thereby move behind the tip of a latch plate 78 to latch the raised wires 67 in upper position. The wires 67 are thus latched up and the balls 72 lifted thereby are maintained in pockets 75 until the first half of the escapement step is completed.

This portion of the escapement step moves the ball cylinder a sufficient distance clockwise (Fig. 6) to bring the center of the ball off the top of plunger 68 and above a solid portion of the cylinder housing 70. The ball will thereby be held in the pocket 75 and plunger 68 and its operating wire 67 may return downwardly without the ball following. To time the return of the plungers 68 and wires 67, they are unlatched by the operation of the escapement mechanism, as follows:

Referring to Figs. 1, 2, 6, and 32, the previously mentioned slide rod 83 is engaged at one end with the arm 82 on shaft 81, and at the opposite end engages the front of lever 140. When lever 140 is rocked clockwise to effect the initial half of the escapement operation, it pushes rod 83 to the left (Figs. 6 and 32), causing the rod to rock arm 82 and its shaft 81 counterclockwise (Fig. 6).

Arms 80 on the shaft 81 thereupon act on latch plates 78 to rock the latter clockwise, thereby releasing them from levers 72. Those loading wires 67 which had been raised, are thus unlatched and springs 71 move the associated plungers and said loading wires downwardly to their lower positions. In this manner, the escapement mechanism acts to unlatch the raised loading wires 67 while rotating the ball cylinder, and the timing is such that the balls just loaded are moved above a solid part of cylinder housing 70 before the plungers 68 and wires 67 are restored.

*Punch pin wheel*

The punch pin wheel 160 (Figs. 1, 4, 23, 34, and 35) controls the punching mechanism to repeat data on successive cards T without requiring a new selection of such data by keys 10. The punching mechanism perforates holes in the card under control of the loaded pockets of the ball cylinders as will be explained further on.

Certain of these pockets have been loaded with balls by operation of keys 10 to set up the repeat data and others of the pockets loaded by operation of keys 10 to set up the individual data. The punch pin wheel 160 controls mechanism to retain the balls in the pockets corresponding to the repeat data after a card has been punched under control of these balls, while the other balls in the pockets corresponding to the individual data are released from the pockets or dumped. The punch pin wheel 160 is set up to control punch repetition by means including magnet 54 which was energized by circuit A, previously traced, when constant data contacts 44 and key-controlled contacts 40 were closed.

Punch pin wheel 160 is of the same construction as escapement control pin wheel 127 and has eighty pins 161 mounted and arranged in the same manner as pins 128 of wheel 127. As indicated in Fig. 23, pinwheel 160 is fast to a shaft 162 journaled at opposite ends in frame standards 163 and 163'. Rotatably mounted on the left hand portion of shaft 162 (as viewed in Fig. 23) is a sleeve shaft 164 fast to a gear 165 which is in mesh with gear 97' on escapement-driven shaft 98, as indicated in Fig. 1. Sleeve shaft 164 has clutch teeth 166 adapted to engage in slots 167 of a shiftable clutch sleeve 168 keyed to shaft 162 for rotation therewith, but also slidable longitudinally of the shaft.

Clutch sleeve 168 is shifted by means of a shaft 170 (see Figs. 1, 23, and 36), the upper end of which is bent to provide a crank arm 171 engaging the groove of collar 172 of the clutch sleeve. Previous to the first set-up cycle, shaft 170 is rotated clockwise (as viewed in Figs. 1 and 36) by means which will be described later, to couple clutch sleeve 168 with sleeve shaft 164. Thus, during the first set-up cycle, shaft 162 and pin wheel 160 are driven by sleeve 168, its gear 165, and gear 97' from the escapement mechanism.

Pin wheel 160 has its pins 161 projecting further to the right, as indicated in Fig. 23. When circuit A is formed, magnet 54 is energized and rocks armature lever 173 counterclockwise against resistance of a spring 174 surrounding the shaft 175 of the lever (see Fig. 34).

Lever 173 is formed at its upper end with a U-shaped yoke 176 carrying a pivot 177 for a striking lever 178. The lever 178 is constrained by the sides of yoke 176 to partake of the rocking movement of armature lever 173, but may move against resistance of a spring 179 in a direction at right angles thereto, for a reason which will be brought out later. When lever 173 is rocked counterclockwise (Fig. 23) by energization of magnet 54, the hammer tip of lever 178 strikes the right hand end of a pin 161 and moves the pin to a position projecting further to the left of the side of pin wheel 160.

In the initial position of wheel 160, its first column pin 161 is one step to the right of the striking tip of lever 178 (as viewed in Fig. 34). When the escapement mechanism moves to first column position, through gears 99, 97, 97', and 165, and clutch parts 164, 168, it rotates shaft 162 and pin wheel 160 to bring the first column pin 161 opposite the tip of lever 178. The first operation of a key 10 to set up constant data establishes circuit A to energize magnet 54, causing lever 178 to strike the first column pin 161 and project the pin to the left of the pin wheel (Fig. 23). Magnet 54 is faster acting than escape magnet 63 so that the escapement step attendant upon this first operation of a key 10 does not occur until lever 178 has been operated by magnet 54.

While the lever 178 is still acting on pin 161, the escapement mechanism operates and, being geared now to the pin wheel 160, rotates the latter a distance equal to that between two consecutive pins 161, thus bringing the next pin 161 to a position in front of the tip of lever 178.

Key-controlled contacts 40 are closed only momentarily by the action of a cam 12, and therefore circuit A opens, magnet 54 is deenergized, and spring 174 restores armature 173 and the lever 178 which is carried by the armature.

In the manner described above, each time a key 10 is operated to set up a constant data character, the magnet 54 is energized to cause lever 178 to push a pin 161 further to the left of pin wheel 160, and the escapement mechanism moves the pin wheel 160 one step. Each of the eighty pins 161 corresponds to a different one of the eighty card columns and each operation of a key selects a character to be punched in code in a single card column. Thus, when keys 10 have completed their punch selection for the constant data card columns, then a number of successive pins 161 equal to the number of such columns has been projected further to the left of pin wheel 160. The pins 161 so set up cause the balls in the ball cylinder pockets 75 corresponding to the constant data columns to be retained after a punching operation, in a manner which will be subsequently described.

*Back-spacing mechanism*

Back-spacing mechanism is provided to enable an incorrect punch selection to be canceled. When a typewriter key 10 is depressed, it causes a pocket or pockets 75 of a ball cylinder to be loaded, and the loading is followed by clockwise, escapement-driven movement of the cylinder for a step equal to the distance between successive horizontal rows of pockets.

If the wrong key has been operated, then the wrong pockets have been loaded, and an incorrect punch selection has been made. The purpose of the back-spacing mechanism is to cause the incorrectly loaded pockets to be unloaded and to then return the cylinder one step to the rear, or in a counterclockwise direction, thereby returning the row of pockets 75 last loaded to the loading line.

When a ball cylinder is moved, after a loading operation, one step clockwise (Fig. 6), the last loaded horizontal row of pockets 75 moves from above the loading line to a position above an elongated passage 185 in the cylinder housing. There are two such passages, one at each loading station. The passage 185 at the loading station of ball cylinder 76 is normally closed along the lines of travel of the twelve circular columns of pockets 75 by means of twelve upright, comb teeth 186 of a comb shutter 187 (see Figs. 6 and 44), while a similar shutter 187' is disposed in the passage 185 of the loading station for cylinder 76'. The tops of teeth 186 of each shutter are shaped concavely to conform to the inside, circular, ball-retaining surface of cylinder housing 70 and to form, in effect, a part of the interior, ball-retaining wall of the cylinder housing; hence when the shutter is closed, the balls will ride smoothly from teeth 186 to the interior surface of the cylinder housing (see Fig. 6a).

The bases of the interdental spaces of shutters 187 and 187' are inclined so that when a shutter is moved longitudinally to dispose the interdental spaces below the row of pockets 75 last loaded, the balls will fall from these pockets into said interdental spaces and roll down the inclined bases into a back-space dumping trough 188.

This trough is U-shaped in cross-section and formed with spaced, opposite flanges 188' secured by screws 189 to the bottom of the cylinder housing (see Figs. 6, 43, 49, and 51). Shutter 187 is moved longitudinally from ball retaining to ball dumping position by means including a manually operated back space lever 190 (Figs. 1, 2, 24, and 25).

Figure 44:
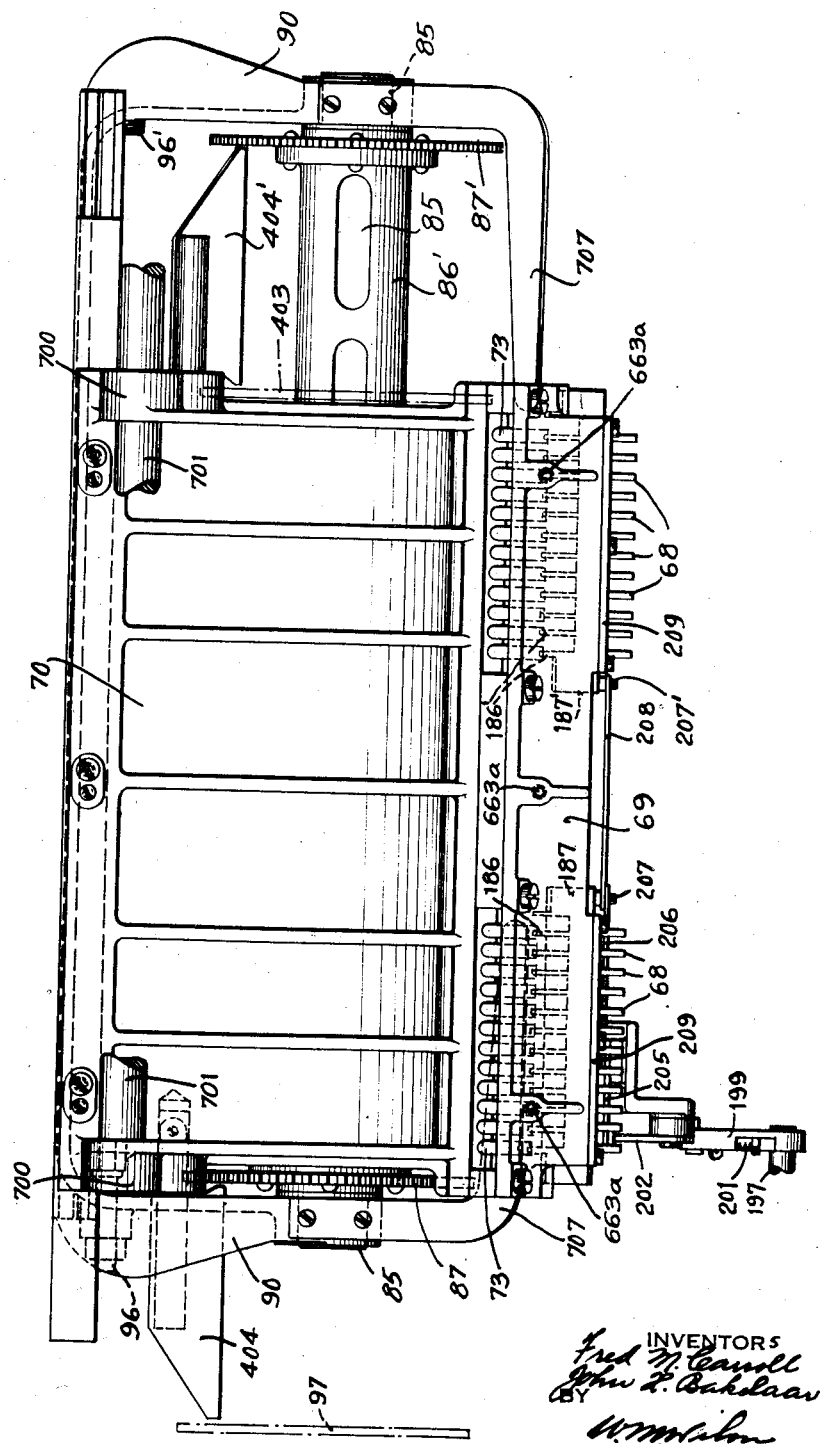
Fig. 44 is a rear view of the ball cylinder housing.

Lever 190 is fast to shaft 191 which carries an arm 192 connected by link 193 to one arm of a bell crank lever 194, the other arm of which has a link connection 195 to a crank arm 196 fast to one end of a shaft 197 journaled in the frame (see Figs. 43 and 44). The latter arm of lever 194 is also connected to a spring 198. As indicated in Figs. 6, 43, and 44, shaft 197 carries at the end opposite to arm 196, another crank arm 199 to which is pivoted a dog 200. A spring 201 holds dog 200 with its lower flat edge against a flat surface cut in arm 199. Dog 200 is behind the latch end of a bell crank latch lever 202 which is biased counterclockwise (Fig. 6) by a spring 203. The vertical arm of latch lever 202 is connected by a link 204 to a horizontally disposed bell crank 205 which is, in turn, connected by a link 206 to a pin 207 carried by shutter 187. A link 208 connects pin 206 of shutter 187 to pin 207' of shutter 187'. The shutters are slidably guided along the sides by the vertical walls of opening 185 and at the bottom by the mortise-like guide channel in the top of a bar 209 fastened to the bottom of bracket 69 (see also Fig. 17).

When lever 190 is pulled towards the front of the machine to effect its forward stroke, arm 192 rocks counterclockwise (Fig. 24) causing link 193 to rise and move bell crank 194 clockwise against resistance of spring 198. As bell crank 194 moves clockwise, through link 195 and arm 196, it turns shaft 197 counterclockwise. Arm 199 is thereby moved counterclockwise (Fig. 6), causing dog 200 to pass the latch end of lever 202, spring 201 yielding to permit dog 200 to pivot clockwise as it passes the latch nose of lever 202. Arm 199 and dog 200 then take the positions indicated in dotted lines in Fig. 6, thereby releasing lever 202 for counterclockwise operation by spring 203 to an extent limited by stop pin 210. As lever 202 moves counterclockwise, through link 204, it rocks bell crank 205 (see Fig. 43) to cause common movement of shutters 187 and 187'. This movement of each shutter carries its teeth 186 out of line with the twelve pockets 75 of the horizontal row of pockets above the shutter and brings the interdental spaces into line with said pockets. The balls 72 in these pockets thereupon drop into the comb spaces and fall into trough 188. Although both shutters are moved simultaneously to dumping positions, only one cylinder 76 or 76' at a time is at its loading station, so that only the cylinder at loading station has a row of pockets above a shutter to be emptied through the latter.

In above manner, an incorrect punch selection is canceled by discharging the ball or balls from the last-loaded horizontal row of pockets 75 of the cylinder at loading station into back-space trough 188.

It may also happen that the constant data key 41 (Figs. 1 and 20) will be incorrectly retained in depressed, operative position, causing circuit A to form, and magnet 54 (Figs. 23 and 34) to project a pin 161 of punch pin wheel 160 into constant data position. This last-projected pin 161 must then be returned to normal position. As explained before, the punch pin wheel is moved clockwise (Fig. 34) during the first set-up cycle by the escapement drive in synchronism with the movement of the ball cylinder at loading station. Thus, the incorrectly projected pin 161 is now one step past the striking tip of pin-projecting lever 178. To restore this pin to its normal, initial position, the following means are provided.

Referring to Fig. 24, a plate 212 is fastened to an intermediate part of link 193. When lever 190 is moved towards the front of the machine, link 193 rises and plate 212 actuates a spring blade 213 towards a blade 214 to close the companion points of a normally open switch 215.

Referring to the circuit diagram (Fig. 54), closing of switch 215 forms the following circuit:

*Circuit D.*—From line 52, through switch 215, the bottom pair of relay contacts 53a' (closed during the first set-up cycle), and through a magnet 216, to line 55.

Referring now to Figs. 23 and 35, energization of magnet 216 rocks its armature lever 217 clockwise (Fig. 23) against resistance of a spring 218 (Fig. 35). Armature lever 217 carries a pin-striking lever 219 in exactly the same manner, previously described, as armature 173 of pin set-up magnet 54 carries lever 178.

The striking tip of lever 219 is to the left (as viewed in Fig. 35) of the striking tip of lever 178 by a distance equal to an escapement step of pin wheel 160, clockwise (Figs. 34 and 35). Thus, the last escapement step has moved the pin 161 last projected by lever 178 to a position opposite the striking tip of lever 219. When magnet 216 is energized, it rocks armature lever 217 clockwise (Fig. 23), causing the upper end of lever 219 to strike the pin 161 in front of it and return it towards the right (Fig. 23) to initial position.

In addition to returning the last-projected pin 161 to initial position and to discharging the last-loaded pockets of the ball cylinder at loading station, both the latter cylinder and the pin wheel 160 must be back-spaced one step each to return them to the positions they occupied at the time the wrong key 10 was operated. To effect this return, the escapement drive is back-spaced one step by the following means:

As indicated in Fig. 24, the left end of a link 221 (see also Fig. 43) is pivotally connected to arm 196. The right end of link 221 is pivotally connected to the lower arm of a lever 222 (see Figs. 2 and 32). The top of lever 222 is below and to the left of the tail of a dog 223 pivotally carried by a lever 224, which pivotally supports, at its upper end, a back-spacing pawl 225. A hair spring 226 normally holds the tail of pawl 226 against a fixed stud 227 while a spring 228 connected to dog 223 biases the latter clockwise (Fig. 32) to engage the pivot pin 229 of lever 224 and to maintain the lever 224 in engagement with stud 227.

When the back-spacing lever 190 is moved towards the front of the machine, it causes shaft 197 and its arm 196 to rock counterclockwise (Fig.

24) which pulls link 221 to the left to rock lever 222 clockwise (Fig. 32). As the upper end of lever 222 swings to the right, it rides by dog 223, spring 228 yielding to permit the dog to move counter-clockwise while lever 22 is riding past it. Further, the pressure exerted by lever 222 on dog 223, while riding by the dog, tends to force lever 224 more firmly against stud 227. At the end of the initial stroke of lever 190, the upper end of lever 222 thus has passed to the right of and clear of the tail of dog 223. During this same initial stroke of lever 190, the last-loaded pockets 75 have been unloaded and the last-projected pin 161 of the punch pin wheel restored, as already explained. The ball cylinder at loading position and the punch pin wheel may now be returned one step. This is done on the return stroke of lever 190.

When the operator releases lever 190, spring 198 (Fig. 24) acts to return the bell crank 194, link 195, shaft 197, arm 196, and link 221 to initial positions. Link 221 moves to the right when returning and swings lever 222 counterclockwise (Fig. 32) to press its upper end against the right side of dog 223. This pressure tends to rock the dog clockwise. However, the dog cannot yield relative to lever 224 in a clockwise direction, so that the pressure of lever 222 on dog 223 forces both the dog and lever 224 to rock clockwise. Thus, lever 224 carries the pawl 225 towards ratchet wheel 103 to engage a tooth 103' and move the ratchet wheel counterclockwise against resistance of escapement-operating spring 106 for the distance of one tooth, equal to an escapement step. During this return step of wheel 103, it ratchets past the nose of pawl 138 engaged therewith.

When the upper end of lever 222 during its movement to the left (Fig. 32) passes the tip of dog 223, spring 228 restores lever 224, dog 223, and back-spacing pawl 225 to their initial position.

In above manner, upon the forward stroke of back-spacing lever 190, the back space shutters 187 and 187' are moved to ball-releasing position and magnet 216 is energized to restore the pin 161 of dump control pin wheel 160. Upon the return stroke of lever 190 effected by spring 198, the escapement wheel 103 is moved backward one step. Through gears 99, 97, 97', and 165, pin wheel 160 is returned one step. Through gears 99, 97, 87, ball cylinder 76, when in loading position is returned one step. When cylinder 76' is in loading position, it is back-spaced through gearing 99, 97, 97', and 87'.

*Spacing operation*

In the example shown in Fig. 52, the first fifty card columns are to be punched with constant data and the remaining columns with individual data. Each time a punch selection is made for a card column, the cylinder in loading position is advanced one escapement step to bring the horizontal row of twelve pockets corresponding to the next card column to the loading line. Card columns 25 to 50 are provided for the name data. In the illustrated example, the name E. C. Hall requires only eight columns. After this name has been typed and the corresponding punch selections made, the cylinder at loading position will have the thirty-third horizontal row of pockets corresponding to the ninth column of the name field (or the thirty-third column of the card) at the loading line.

The first individual data column is the fifty-first card column to which the fifty-first row of pockets 74 corresponds. This latter row of pockets must be brought to the loading line. To do this, after the name E. C. Hall has been typed, the operator depresses a special space key 10—sp on the keyboard (see Fig. 1). This space key has no connection to a type bar, there are no contacts 30 or 32 coacting with its cam-operated lever 25, but the latter closes contacts 40 and 40' in the same manner as described in connection with the character keys 10.

Each time space key 10—sp is operated during the selection of constant data, contacts 40 and 40' will close to establish circuits A and C; the former to cause a pin on punch pin wheel 160 to be projected during the first set-up cycle, and the latter circuit to energize magnet 63 to cause the escapement drive to effect a step of movement. The punch pin wheel and the ball cylinder in loading position will thereby be advanced one step without loading the ball cylinder.

It is clear now that when the name data has been punch-selected without filling all the name columns, then the space key 10—sp is operated repeatedly until the ball cylinder row corresponding to the first individual data column has been moved to the loading line.

*Individual data selection*

When the machine is ready to select the punches for the first individual data column, this fact will be indicated to the operator by means which will be described later. The operator will then depress key 47 (Figs. 1, 20, and 21) to release constant data key 41 from latch bar 45, in the manner previously explained.

Constant data key 41 rises, causing constant data contacts 44 to open, so as to prevent formation of circuits A, B, and C through the latter contacts.

The individual data items are to be listed below the headings "Quantity", "Description", "Comm. No.", "Unit", "Price", and "Amount". The matter under "Description" is to be typed but not selected for punching. The matter under the other headings is to be selected for punching as well as typing. In order to effect punch selection independently of the constant data contacts 44 only when typing individual data in certain vertical fields of the invoice, control means are provided in the typewriter unit for selecting the desired fields for punch selection. This control means comprises a live field selector bar 232 (see Figs. 2 and 54) which moves with the typewriter carriage 233. This bar is rigidly but removably secured to the carriage to permit use of any one of such bars interchangeably. Bar 232 is formed at the bottom with projections 234 intermediate which are recesses 235 (see Fig. 54). The contour of the selector bar for the example shown in Fig. 52 is indicated by the top line L, the heavy portions of which represent projections 234, and the light portions, recesses 235 of the bar. Below bar 232 is a lever 236 pivoted to the typewriter frame 237 and urged by a spring 238 towards bar 232 and away from a spring blade 239. This blade carries one of the points of a switch 240, the other of which is on a blade 241 (see Fig. 54). When a recess 235 of bar 232 is above the lever 236, then spring 238 holds lever 236 in a position permitting contacts 240 to remain open. When a projection 234 of bar 232 rides on top of the lever 236, it rocks the lever to move blade 239 towards blade 241, to close contacts 240.

The length and distribution of the projections 234 and recesses 235 determine which of the vertical fields of typed individual data is also to be punched. Thus, referring to Fig. 52, showing a typical invoice prepared by the machine, the matter under the heading "Description" is not to be punched. While this matter is being typed, bar 232 is in such a position that a recess 235 (as indicated by a light portion of line L in Fig. 52) is opposite the upper end of lever 236 so that contacts 240 are open to prevent punch selection, in a manner which will soon be made clear. When the carriage is in such position as to permit typing, for example, of the individual data in the "Quantity" field of the invoice, then a projection 234 of bar 233 (as indicated by a heavy portion of line L in Fig. 52) is riding on the upper end of lever 236 and has rocked it counterclockwise (Fig. 54) to close contacts 240.

When the selection of constant data has been completed, it is necessary to transfer control of the punch selecting and escapement operations from constant data contacts 44 to live field selector contacts 240. This is done by opening contacts 56 and closing contacts 56' (see Fig. 54). When contacts 56 are open, neither loading circuit B nor escapement circuit C can be made through contacts 44. When contacts 56 are opened, then contacts 56' are closed and the loading and escapement control circuits may be made through contacts 240. Thus, the individual data loading circuit B' will be made as follows:

*Circuit B'.*—From line 52, through contacts 240, contacts 56', a switch 30 (or 32), a loading magnet 58 or 58', a contact stud 59 or 59', switch bar 60, and to line 55.

Simultaneously, the escapement circuit C' will be formed as follows:

*Circuit C'.*—From line 52, through contacts 240, contacts 56', contacts 40, magnet 63, and to line 55.

Since contacts 44 are open, circuit A will not be formed, and the pins 161 corresponding to the individual data columns will remain in normal position on punch pin wheel 160. However, the escapement operation, during the first set-up cycle, will continue to step the punch pin wheel along.

Although it is not essential, it is preferred to automatically open contacts 56a, in series with contacts 44, when the constant data set up during a loading cycle is completed. By opening contacts 56a at such time, failure of the operator to release repeat key 41 does not cause a constant data circuit A to form, because although repeat contacts 44 are still closed, contacts 56a have been opened.

The means for opening contacts 56 and 56a and simultaneously closing contacts 56' when the punch selection means passes from the last constant data column to the first individual data column is under control of the escapement mechanism.

Referring to Figs. 1, 2, 32, and 48, gear 97 has fastened to it a ring 245 having notches 246 spaced apart distances equivalent to a single escapement step. Rotatably mounted on shaft 98 is an arm 247 to the back of which is secured a flat spring 248 engaging the back of a latch 249 which has a pin 250 slidably passing through a hole in arm 247 and provided in front of the arm with a knob handle 251. Latch 249 is forked at the bottom to straddle a pin 252 carried by arm 247 and is by means of this pin and by pin 250 strictly constrained to slidable movement transversely of the plane of arm 247. The upper end of arm 247 is shaped as a pointer 247' to coact with graduations 253 on the front of ring 245 spaced apart similarly to notches 246.

Each graduation 253 corresponds to a card column and appropriate figures are marked on the face of ring 245 to denote the number of the card column to which the graduations correspond.

When latch 249 is in a notch 246 of disk 245, then arm 247 partakes of the movement of the disk. By pressing knob 251 in, the latch 249 is released from a notch 246 and arm 247 may then be freely rotated about shaft 98 till its pointer end 247' is opposite the graduation 253 corresponding to the first individual data column. In Fig. 32, arm 247 is shown adjusted to the column 57 graduation, but for the example shown in Fig. 52, where column 51 is the first individual data column, arm 247 is adjusted to graduation "51", corresponding to card column "51". After arm 247 is set at the desired column graduation, knob 251 is released and spring 248 moves latch 249 into the notch 246 which is in line with the selected graduation.

Thus, during rotation of the escapement mechanism, through gear 99, it rotates gear 97 with which disk 245 moves; arm 247, selectively coupled to disk 245, partakes of the movement of the disk. During rotation of arm 247, it rides past the upper, nose end of a lever 254 and in so doing rocks the latter clockwise against resistance of a spring 255. The point at which arm 247 will rock lever 254 depends on the adjustment of the arm. If arm 247 is in column "51" position, it will rock lever 254 when the escapment mechanism moves from column "50" position to column "51" position. The lower end of lever 254 is engaged with a block 256 of insulating material which is fast to a pair of spring blades 257 and 257a disposed in the same plane (only blade 257 is shown in Fig. 32, blade 257a being directly behind blade 257; both blades are diagrammatically shown in the circuit diagram, Fig. 54). Spring blade 257 carries, on the right side, one of normally closed contacts 56 and on the left side one of normally open contacts 56'.

Spring blade 257a carries one of the contacts 56a, the other contact 56a being on a companion blade (not shown in Fig. 32 but indicated in Fig. 54). When lever 254 rocks clockwise, it presses against block 256 to open contacts 56 and 56a and close contacts 56'.

Lever 254 is connected by spring 255 to a pivoted latch 258. Initially, the internal corner 254' of lever 254 is engaging the side and the left end of latch 258, thereby preventing spring 255 from rocking the latch counterclockwise and holding the upper end of the latch slightly distant from the periphery of disk 245. At the same time, latch 258 is preventing counterclockwise movement of lever 254 by spring 255.

When lever 254 is rocked clockwise, its corner 254' moves away from latch 258 until the lower wall of this corner comes opposite a notch 258' in the left end of the latch. This permits spring 255 to rock the latch counterclockwise, catching the lower wall of corner 254' in notch 258' so as to retain lever 254 in clockwise position after the arm 247 rides by the upper end of the lever. Thus, for the remainder of the escapement operation of a loading cycle, during which the individual data is selected, lever 254 will maintain contacts 56' closed and contacts 56 and 56a open.

Just before the escapement mechanism reaches home position, a projection 259 on disk 245 rides past the upper end of latch 258 and rocks the latter clockwise to unlatch lever 254, the latter parts then returning to initial position.

By thus opening contacts 56 after the constant data selection has been completed, there will be no circuit A formed with the live field selector contacts 240 closed (see Fig. 54).

Contacts 56' in series with live field selector contacts must remain open before and during constant data selection for the following reasons: The live fields of typewriter carriage travel are the fields of such travel during which contacts 240 are closed, as indicated in Fig. 52 by the heavy parts of line L. It may be seen from Fig. 52, that the date October 5, 1929, which is not to be punch-selected, is partly within a live field. This matter was typed in before closing constant data contacts 44, as previously explained, so that neither circuits A, B, or C are formed through contacts 44. Although contacts 240 are closed during the typing in of this matter, neither will loading circuits B' or escapement circuits C' be formed through the latter contacts since contacts 56' are still open.

Part of the constant data may also be within a live field; for example, as shown in Fig. 52, the constant data under heading "Code" is within a live field. It is not desirable to punch-select this constant data without first closing constant data contacts 44, as only in that case will circuit A be formed, as is desired. Since contacts 56' are open at this time, the loading and escapement circuits cannot be formed, although the live field contacts 240 are then closed and the operator in order to cause these circuits to make must first close contacts 44.

Column indicating mechanism

Means are provided to indicate to the operator the progress of the punch selection by indicating the column position of the escapement mechanism and of the ball cylinder at the loading station and of the other parts which are being driven by the escapement mechanism.

Referring to Figs. 26, 27, and 28, the column indicating means comprises a gear 261 meshed with gear 165 (see also Fig. 23), previously referred to as driving the punch pin wheel shaft 162 during the first set-up cycle. Gear 165, in addition, transmits the drive from the escapement mechanism to gear 261 for operating the column indicating means. As previously described, gear 165 is driven from the escapement shaft 100 through gearing 99, 97, and 97'. As gear 165 moves step by step with the escapement drive, it causes gear 261 meshed therewith to move similarly.

Gear 261 is rotatably mounted on a stub shaft 262 carried by a plate 263 fixed to the machine frame. Also rotatably mounted on shaft 262 is a pulley 264 to which one end of a cable 265 is made fast.

The cable is wrapped around the pulley and led and guided over several guide rollers 266 to an inclined roller 267 mounted on the left side of the typewriter housing 268 and adjacent the front plate 269 of this housing. The cable is led from pulley 267 through a hole in the side of housing 268 and horizontally across the machine to a vertical guide pulley 270 journaled on plate 269 near the right side of housing 268 (see Fig. 1). The cable is passed around pulley 270, its direction reversed, and led horizontally towards the left to be attached to a pulley 272 (Figs. 1, 26, and 27).

Rigid with pulley 272 is a drum 273 for housing a spring 274 which urges the pulley 272 to rotate counterclockwise (Fig. 26) so as to wind up the cable thereon.

A clamp 275 is fastened to the upper strand of the cable disposed between pulleys 270 and 272. Fixed to clamp 275 by screws 276 which pass through a horizontal slot 277 of front plate 269 is an index member 278 located in front of plate 269, visible to the operator, and having a pointer 279.

Fastened to the front of plate 269 is a rectangular open pocket or cage 280. A horizontal strip T' is cut off from a blank one of the cards to be punched and inserted in cage 280. When inserted in the cage, the columns of the card strip T' are in line with column indicating figures on the lower bar 280' of the cage. Pointer 279 of index member 278 extends downwardly in front of cage 280 and the card strip and points to the column identifying headings.

For each punch selecting operation to select the punches for one card column, the escapement means moves one step.

As will now be explained, this effects movement of pointer 279 along card strip T' from one column of the latter to the next column to indicate to the operator the progress of the punch selecting operation.

Initially, spring 274 (Fig. 26), acting through pulley 272 and cable 265, is holding pulley 264 (Fig. 27) at its counterclockwise limit with the tooth 281 of a lug 282, fixed to the side of pulley 264, in engagement with the side of a plunger 283, as indicated in Fig. 27. Plunger 283 is slidably seated in the socket 284 of a bracket 285 fastened to the fixed plate 263 (see Figs. 23, 27 and 28). A spring 286 inside socket 284 urges plunger 283 upwardly. With lug 282 initially engaging plunger 283, as indicated in Fig. 27, pointer 279 is opposite column 1 of the card strip T'.

Pulley 264 is driven by a pawl 287 pivoted to the face of gear 261 and urged by a spring 288 to engage its nose with the periphery of the right hand flange of pulley 264 (as viewed in Fig. 28).

This flange of pulley 264 has a ratchet tooth notch 289 (Fig. 27) to be engaged by the nose of dog 287. When the nose of the dog is in notch 289 it couples pulley 264 to gear 261 for rotation therewith clockwise (Fig. 27) by the escapement mechanism. Initially, the parts of the indicating means are in first column position with tooth 281 of lug 282 engaging plunger 283. As explained before, the escapement mechanism, when in home position, is not in first column position but is one step behind it and does not move to first column position until home position stop 120 is released by stop 122 (see Figs. 2 and 32). Accordingly, when the column indicating means is in initial position and the escapement is in home position, as is the case at the beginning of the punch selecting operations, then the nose of pawl 287 is one step behind the abrupt side of notch 289 of pulley 264. Home position stop 120 is released by the stop 122 preliminary to the punch selecting operations.

When this release occurs, the escapement mechanism moves one step to first column position. Through gearing 99, 97, 97', and 165, this movement of the escapement mechanism is transmitted to gear 261. Pawl 287 of gear 261 thereupon moves clockwise (Fig. 27) one step without affecting pulley 264 until the nose of the pawl enters notch 289 of pulley 264. Then, as the set-up operation is effected by successive depression of keys 10, in the manner explained, the escapement mechanism moves step by step, and through the aforesaid gearing, moves gear 261 clockwise step by step. Through engagement of pawl 287 with notch 289, movement of gear 261 is transmitted to pulley 264, causing the latter to wind up cable 265 and unwind it from the opposite end pulley 272, incidentally energizing drum spring 274.

As the cable unwinds from pulley 273, it moves pointer 279 to the right (Fig. 26). Each escapement step is thus transmitted to pointer 279 to move the latter the width of a card column so that after the punch selection has been made for one card column, the pointer is moved to indicate, on card strip T', the next card column for which the punch selection is to be made.

When the selection for the eightieth card column has been made, the escapement mechanism passes its eightieth column position.

Referring to Figs. 30 and 32, when the escapement mechanism escapes after the eightieth column selection, the last eightieth column pin 128 of pin wheel 127 passes lug 130 of lever 131, and the latter rocks counterclockwise (Fig. 30) to similarly rock yoke 133 and cause lug 133' of the latter to withdraw from latch 135 and permit spring 136 to rock the lug 135' of the latch to the left and onto the top of ledge 137 of pawl 138 (see also Fig. 3).

This holds pawl 138 out of engagement with ratchet wheel 103 which moves freely under the power of spring 106 to its home position determined by engagement of stop 120 with stop 122. During this final movement of the escapement mechanism, the tail of pawl 287 (Fig. 27) strikes a projection 285' of bracket 285 (see Fig. 28) and is thereby rocked to release its nose from notch 289 of pulley 264. Spring 274, acting through pulley 272, thereupon acts to return the index 279 to first column position and to rotate pulley 264 counterclockwise until tooth 281 is again engaged with the side of plunger 283. Pawl 287 continues to its home position. The parts of the column indicating mechanism are then again in their initial positions, indicated in Fig. 27.

*Release mechanism*

At any point of the punch selecting or loading operations, the entire previous selection may be canceled and the escapement mechanism and parts driven thereby released for uninterrupted movement to home position.

The release mechanism includes a key 291 at the right of the keyboard (see Fig. 1). Referring to Figs. 24 and 25, depression of release key 291 against resistance of spring 292 rocks a lever 293 counterclockwise to pull up on a link 294. The link in turn rocks a yoke 295 clockwise and the arm 296 of the yoke thereupon moves a horizontal slide wire 297 to the right (Figs. 24 and 30). The right end of wire 297 (as viewed in Fig. 30) is engaged with the bent end of bar 298 slidably resting at its left end on frame bracket 299 and pivotally connected at its right end by pivot pin 300 to the lower end of a lever 302 pivoted on shaft 134 of escapement control yoke 133 (see also Figs. 13, 18, and 30a).

Also pivoted on shaft 134 is a yoke 303 shown in detail in Fig. 31. Yoke 303 is connected by a spring 304 to an arm 305 mounted on pin 300. Spring 304 normally holds the upper notched corner 306 of arm 305 engaged with a laterally extending tab 307 formed at the right end of yoke 303. This engagement couples lever 302, yoke 303, and arm 305 for common counterclockwise movement, about shaft 134, as a rigid assembly.

The right hand side of yoke 303 has, at its left end, a projection 308 lying above a pin 309 laterally extending from lever 131 (see Fig. 30). The same side of yoke 303 also is formed, at its right end, with a transversely bent tab 310 extending beneath the left hand side of escape control yoke 133 (as viewed in Figs. 13 and 18).

Referring particularly to Figs. 30 and 30a, when wire 297 is moved to the right by operation of release key 191, the wire shifts bar 298 in the same direction. Bar 298 rocks lever 302, yoke 303, and arm 305 counterclockwise, as a unit. As yoke 303 moves counterclockwise, its tab 310 rises and engages the bottom of yoke 133 to rock the latter counterclockwise, causing its lug 133' to withdraw from latch 135 (Figs. 3 and 32). Spring 136 thereupon urges the latch counterclockwise to place its nose 135' above ledge 137 of pawl 138 when the latter is cammed down by an escape movement of wheel 103. Thus, after this escape movement of wheel 103, latch 135 will hold pawl 138 free of wheel 103, permitting spring 106 to move the escapement mechanism to home position.

As indicated above, in order for latch 135 to move above ledge 137 of pawl 138, the latter must be cammed down by an escape movement of wheel 103. To cause this escape movement to occur, release key 291 (Figs. 24 and 25) has a pin 311, which when the key is depressed cams a spring blade 312 towards a blade 313 to close contacts 314 carried by the blade.

Referring to the circuit diagram, Fig. 54, closing of contacts 314 forms the following circuit:

*Circuit E.*—From line 52, through contacts 314, escape magnet 63, and to line 55.

The circuit energizes the escape magnet which causes an escape operation to occur, in the manner previously explained. During the first part of this escape operation, wheel 103 cams pawl 138 downwardly to catch its ledge 137 beneath latch nose 135', now in pawl latching position due to the counterclockwise rocking of release yoke 303 by operation of release key 291.

When yoke 303 was rocked counterclockwise, its projection 308 engaged pin 309 of lever 131 and moved the latter clockwise (Fig. 30) to locate its lug 130 out of the path of pins 128 of escapement pin wheel 127 during return of the latter to home position.

Initially, tab 307 of yoke 303 is engaged by the front of a latch nose 315' at the lower end of a lever 315 which is urged clockwise (Figs. 30 and 30a) by a spring 316 connected to its upper arm 315a. When yoke 303 is rocked counterclockwise by the release key, its tab 307 cams aside nose 315' of latch lever 315 and moves above the nose. Spring 316 thereupon rocks the latch lever clockwise to move nose 315' below tab 307, as a result latching yoke 303 in its counterclockwise position, so that when the operator lets go of the release key 291, spring 292 returns the key but the yoke remains in its counterclockwise position to maintain the pawl 138 in release position.

Arm 315a of latch lever 315 extends between the flanges of pin wheel 127 (see Fig. 13). The pin wheel carries a plate 317 (Figs. 18, 30, and 41) formed with a depending projection 317' just in advance of the position of the first column pin 128. During release movement of the escapement mechanism, projection 317' rides past arm 315a and in so doing rocks lever 315 counterclockwise, causing nose 315' to withdraw from tab 307 of yoke 303. At the same time, the back of lever 315 engages a tab 318 of arm 305 to move the arm clockwise about pin 300. As a result, notch 306 of arm 305 also withdraws from tab 307 of yoke 303. Spring 304 thereupon rocks yoke 303 clockwise until it is stopped in normal position by engagement with a fixed stud 319.

By thus automatically unlatching arm 305 from yoke 303, the restoration of the latter will occur regardless of maintained depression of release key 291. Before a counterclockwise operation of yoke 303 can be repeated, release key 291 must first be restored to permit spring 304 to rock lever 302 and arm 305 clockwise, relative to pivot 134, to initial positions in which notch 306 is engaged with tab 307 of yoke 303.

When plate 317 carried by pin wheel 127 reaches arm 315a of latch lever 315, the eightieth column pin 128 of the pin wheel has passed lug 130 of lever 131. Thus, when projection 317' of plate 317 operates lever 315 to unlatch yoke 303, lug 130 of lever 131 is free of restraint. Accordingly, as yoke 303 returns clockwise and projection 308 withdraws from pin 309 of lever 131, the latter is simultaneously moved counterclockwise by spring 142 to maintain yoke 133 in the counterclockwise position in which it had been set by the release operation. As a result, latch 135 continues to hold pawl 138 released from escape wheel 103. The latter thus continues its movement to home position, where it is arrested by engagement of stop 120 with stop 122.

It may be noted that the counterclockwise movement of lever 131 is limited by engagement of its pin 309 with tab 308 of yoke 303 which is now normally held by stud 319 against clockwise movement.

The top of web 133a of yoke 133 engages one end of a lever 320. When escape control yoke 133 moves counterclockwise (Fig. 30) to cause release of the escapement, the web 133a moves lever 320 clockwise. The right hand end of lever 320 thereupon depresses the rod 321 of a valve 322 against the pressure of a spring 323.

Valve 322 in normal, upper position has its port 324 in line with openings 325 leading into the opposite cylinders of the governor dash pot 155 (see also Figs. 13 and 32), and thus permits escape of air from the cylinder in which the piston is moving downwardly to the cylinder in which the piston is moving up. This causes an easy, rapid, action of the pistons when the escapement mechanism is moving step by step. When the escapement is released for continuous movement by operation of escape control yoke 133, the latter rocks lever 320 to depress valve 322 and close the passage between openings 324 of the cylinder walls. Now, on the downstroke of a piston, the air in the cylinder can escape only through the piston valve 326, thus effectively damping the action of the escapement during a continuous movement thereof to a greater extent than during its step-by-step movement.

Skip mechanism

It may be desired to punch a part merely of the card columns but not all of them. In the example shown in Fig. 52, the five freight data columns are not to be punched with freight data nor are the remaining seven card columns. Thus, the last twelve columns are not to be punched with invoice data. These twelve columns, as well as any other selected columns, may be referred to as a skip field. The first column of the skip field is punched with a special X hole, the selection of which is initiated by depression of key 10—x (Fig. 1). The punch selection of the special X, when coinciding with preset conditions, as will be explained hereinafter, results in the skipping of punch selections for the remaining columns of the skip field. For effecting the skipping operation, the following mechanism is provided.

Referring to Figs. 1, 30, 32, and 48, the skip mechanism comprises a disk 330 which is secured for rotation with shaft 98 by the stud 331 of a disk 332 pinned to the right hand end of shaft 98 and passing through a hole located on the disk. The right end of shaft 98 is threaded to coact with a knurled clamping nut 333 which may be removed to permit disk 330 to be slid off stud 331 and replaced by a skip disk of different contour.

Riding on the periphery of the skip disk is the free end of an arm 334 (see also Fig. 13) which is fast to one end of a shaft 335. The other end of shaft 335 rigidly carries a dependent arm 336 connected to a spring 337 which urges shaft 335 clockwise (Fig. 30), in a direction to maintain the free end of arm 334 engaged with the periphery of skip disk 330. The lower end of dependent arm 336 is pivotally connected to a horizontal arm 338 having a lug 339 resting on top of an armature lever 340 urged counterclockwise away from its magnet 341 by a spring 342, as viewed in Fig. 48.

Figure 19:
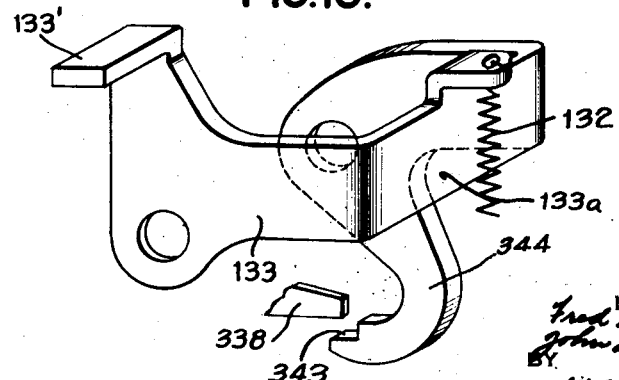
Fig. 19 is a detail view of an element of the release means of the escapement mechanism.

The free end of arm 338 when it rests on armature 340 is above corner notch 343 formed at the lower end of dependent arm 344 of yoke 133 (see Figs. 19 and 30). While in this position, if arm 338 were moved to the right (Fig. 30), before leaving the support of armature 340, the arm would pass freely to the right of and above notch 343 and would not disturb the yoke 133. When a bump 345 on skip disk 330 rides over arm 334, the latter is depressed to rock shaft 335 counterclockwise (Fig. 30) as a result of which arm 336 moves link 338 to the right (Fig. 30).

This movement has no effect, as explained above, while armature 340 is in retracted position and thereby supporting link 338. When magnet 341 is energized, it rocks armature 340 clockwise (Fig. 48) to release projection 339 of link 338.

Energization of magnet 341 takes place when the special "X" or skip key 10—x on the keyboard (Fig. 1) is depressed. When the pointer 279 of the column indicating means reaches the first column of a skip field on indicating card strip T' (see Fig. 26), the operator depresses key 10—x. Operation of this key closes a switch 30 and a switch 32 and contacts 40 and 40' in the same way as when a letter key 10 is operated. However, key 10—x does not effect a typing operation, as previously explained. The closing of switch 40' is of no effect in the example given here because the constant data key 41 is supposed to have been released and contacts 44 opened. In any event, contacts 56a being open now, the closing of contacts 40' by the operation of the "X" key is unable to form a constant data circuit A. The closing of switch 30 by key 10—x causes a circuit B to form through an "11" loading magnet 58 or 58', and the loading magnet, upon energization, causes a ball to be loaded into the "11" position pocket 75 of the horizontal row of pockets corresponding to the first column of the skip field. As a result of closing of contacts

40, escape magnet 63 is energized to cause an escapement step to occur.

As indicated in the circuit diagram, Fig. 54, skip magnet 341 is in series with switch 32 of key 10—*x* so that magnet 341 is energized momentarily when key 10—*x* is depressed. Energization of the magnet releases armature 340 from link 338 which drops into notch 343 of escape control yoke 133. The skip disk 330 is designed so that its bump 345 is just at the left of arm 334 when the first column of the skip field is indicated by pointer 279 (Fig. 26).

While the parts are in this position, key 10—*x* is operated, causing a ball 72 to be loaded in position to later effect punching in the "11" to "X" position of the first skip column. At the same time, magnet 341 has been energized to cause its armature 340 to allow link 338 to drop into notch 343 of yoke 133. The first half of the escapement step then takes place, as a result of which skip disk 330 moves counterclockwise (Fig. 30) and its bump 345 rides onto the top of arm 334. In so doing, the bump depresses arm 334 to cause shaft 335 and arm 336 to rock counterclockwise and link 338 to move to the right.

The link through its coaction with the notch 343 of yoke 133 rocks the latter counterclockwise to permit spring 136 to move lug 135' of latch 135 above ledge 137 of pawl 138 which has been moved down by the first half of the escapement step of wheel 103. The pawl 138 now remains free of ratchet wheel 103 permitting spring 106 to continue rotation of the ratchet wheel. The length of a bump 345 of the skip disk determines the number of columns skipped under its control. When the bump rides off arm 334, spring 337 causes link 338 to return to the left (Fig. 30) while spring 132 restores yoke 133 to inactive position. The energization of skip magnet 341 is momentary, so that armature 340 has been restored by its spring 342 by the time link 338 is returned to the left, to its initial position. Accordingly, as link 338 returns, its projection 339 rides up an inclined edge 348 of the armature 340 and onto the top of the armature where it rests until the next skip operation.

*Start or operating key*

After the set up of the first card is completed, the operator depresses a start or operating key 350 at the right side of the keyboard. Referring to Fig. 24, when key 350 is depressed, against resistance of a spring 351, it rocks a lever 352 to pull up on a link 353 which rocks arm 354 and its shaft 355 anticlockwise.

As shown in the bottom view (Fig. 50), shaft 355 extends across the machine and at the end opposite to arm 354 is provided with a crank arm 356 connected by link 357 to a lever 358 (see Fig. 5). Lever 358 is pivoted intermediately on a pin 359 (see also Fig. 50), and pivotally carries at its lower end an arm 360. A spring 361 between lever 358 and arm 360 urges the arm towards the lever and into engagement with the lower end of a lever 363.

Lever 363 is also pivoted on shaft 359 and its upper end is bent over to support the tail of a dog 364 pivotally mounted on clutch disk 365 which is fast to one end of a driven shaft 366 (see Figs. 5 and 50). A spring 367 urges the nose of clutch dog 364 to engage the teeth of a ratchet wheel 368 which is fast to a sleeve 369 rotatably mounted on driven shaft 366. Also fast to sleeve 369 is a gear 370 driven through gears 371, 372, and 373 from main drive shaft 374. The latter carries a pulley 375 driven by belt 376 from pulley 377 (see Fig. 4) of shaft 378 operated by motor M. As long as motor M is running, shaft 374 is in rotation and through the described train of gearing maintains ratchet wheel 368 in continuous rotation.

When operating key 350 is depressed, link 357 moves to the right (Fig. 5) rocking lever 358 clockwise which displaces arm 360 to the left. As arm 360 moves to the left, a block 379 fixed thereto presses against the lower end of lever 363 and rocks the latter clockwise to release clutch dog 364. Spring 367 thereupon moves the dog into engagement with the teeth of ratchet wheel 368 to couple clutch disk 365 and its shaft 366 to the ratchet wheel for a single revolution.

In order to prevent repeat revolutions of clutch disk 365 for a single maintained depression of operating key 350, a pin 380 extending laterally from disk 365 engages the upper edge of arm 360 shortly after the disk begins its revolution and depresses the latter against resistance of spring 361. As arm 360 is depressed, its block 379 withdraws and unlatches lever 363. A spring 381 connected at one end to lever 363 and at the other end to a pawl 382 thereupon rocks the lever counterclockwise (Fig. 5) returning it to position for intercepting dog 364 at the end of a single revolution of disk 365. This interception rocks the dog out of engagement with ratchet wheel 368, to uncouple disk 365 from the driving means.

When key 350 is released, link 357 moves to the left (Fig. 5), lever 358 rocks counterclockwise, and arm 360 moves to the right. Arm 360 moves to the right until the front of its block 379 is against the right side of lever 363. Both spring 381 and the pressure of dog 364 act on lever 363 to maintain its lower end engaged with block 379.

To prevent rebound of the driven clutch disk 365 and its connected parts when the clutch dog 364 is released from ratchet wheel 368, the disk is formed with a notch 383 which at the end of a single revolution of the disk registers with the nose of pawl 382. Engagement between the nose of the pawl and the shoulder of the notch 383 prevents rebound of the disk at the end of its single revolution.

*Cylinder shifting mechanism*

The purpose of the cylinder shifting mechanism is to shift the ball cylinders after a loading cycle to their alternative stations.

The cylinder at the loading station is shifted to the punching station and the cylinder at the punching station is shifted to its loading station.

As indicated in Figs. 2 and 50, fastened to an intermediate part of one-revolution shaft 366 is a gear 385 having a 1:2 ratio with meshing gear 386 (see also Fig. 1) on a stub shaft 387, so that shaft 387 makes half a revolution for each revolution of shaft 366. Adjacent gear 386, shaft 387 carries a box cam 388, the cam groove 388' of which coacts with a follower roller 389 carried at the corner of an L-shaped, horizontally disposed lever 390. One end of lever 390 is pivoted on a vertical stud 390' and the opposite end is connected by link 391 to a crank arm 392 fixed to the lower end of a vertical shaft 393 (see Figs. 1, 27, 29, and 50). Shaft 393 rigidly carries upper and lower arms 394 connected by a vertically disposed cross bar 394' which through an insulating bar 395 (Fig. 29) mounts the common contact bar 60 (referred to when tracing loading circuits B and B'). Bar 60 is engageable at one end of the travel of cross bar 394' with contact terminals 59 (Figs. 1, 27, 29, and 54) and engageable at the other end of the travel of bar 394' with contact terminals 59'.

When ball cylinder 76 is in its loading position, as indicated in Fig. 1, contact bar 60 is engaging terminals 59 to place loading magnets 58 in the loading circuits B and B' while when cylinder 76' is shifted to loading position, contact bar 60 is engaged with terminals 59' to place magnets 58' in the loading circuits.

Secured to vertical shaft 393 is a second crank arm 396 (Figs. 1, 27, and 29) connected by link 397 to crank arm 398' of a vertical shaft 398. To the upper end of shaft 398 (see Fig. 6) is pinned a yoke 399, seated between the sides of which is an arm 400, hinged at its rear end to the yoke by a pin 401. The sides of the yoke constrain arm 400 to rotate with the yoke and its shaft 398.

When the start key 350 is depressed, it sets shaft 366 in operation for a single revolution during which its gear 385 coacts with gear 386 to turn shaft 387 and its cam 388 through half a revolution.

When the parts are in the position shown in Fig. 1, cam 388 then turning through half a revolution will rock L-shaped cam-following lever 390 counterclockwise (Fig. 1) which through link 391 rocks shaft 393 clockwise. As a result contact or switch bar 60 carried by bar 394' moves from terminals 59 to terminals 59' of loading circuits B. At the same time, arm 396 of shaft 393, through link 397, rocks shaft 398 clockwise (Fig. 1), causing arm 400 to move link 402 to the left. The link thereby actuates carriage 90 to the left, thus shifting cylinder 76 from its loading position to the common punching station while moving cylinder 76' from the punching station to its loading position. The cylinders will then be in the position shown in Fig. 14.

When the cylinders are shifted in above manner, gear 87 of cylinder 76 slides out of mesh with escapement-driven gear 97 (see particularly Figs. 1, 14, 43, and 44) and into mesh with a punch-position gear 403, as indicated in Fig. 43. Gear 403 is rotatably mounted on shaft 98 and connects cylinder 76, now in punch position, to means, presently to be described, for driving the latter cylinder through a punching cycle.

At the same time, gear 87' of cylinder 76' is demeshed from a punch-position gear 403' rotatably carried by shaft 98 and brought into mesh with escapement-driven gear 97', thus conditioning cylinder 76' which is now in its loading position for step-by-step rotation by the escapement drive.

To facilitate the meshing of gears 87 and 87' with gears 97, 97', 403, and 403', the teeth of the latter are rounded at one end, as indicated in Fig. 43.

In order to prevent any possibility of the ball cylinders rotating while being shifted, a pair of alining rails 404 and 404' are rigidly carried by opposite ends of cylinder housing 70 (see Figs. 2, 14, 17, and 44). Normally, the rails are clear of gears 87 and 87'. As soon as the shifting of the cylinders begins, a tooth of gear 87 rides onto rail 404 and a tooth of gear 87' rides onto rail 404'. While the cylinders are being shifted, gears 87 and 87' thus slide along rails 404 and 404' which thereby prevent rotation of the gears and consequently of the ball cylinders. When the shifting operation has been completed, the gears have ridden off the rails and are again free to rotate.

Figure 4:
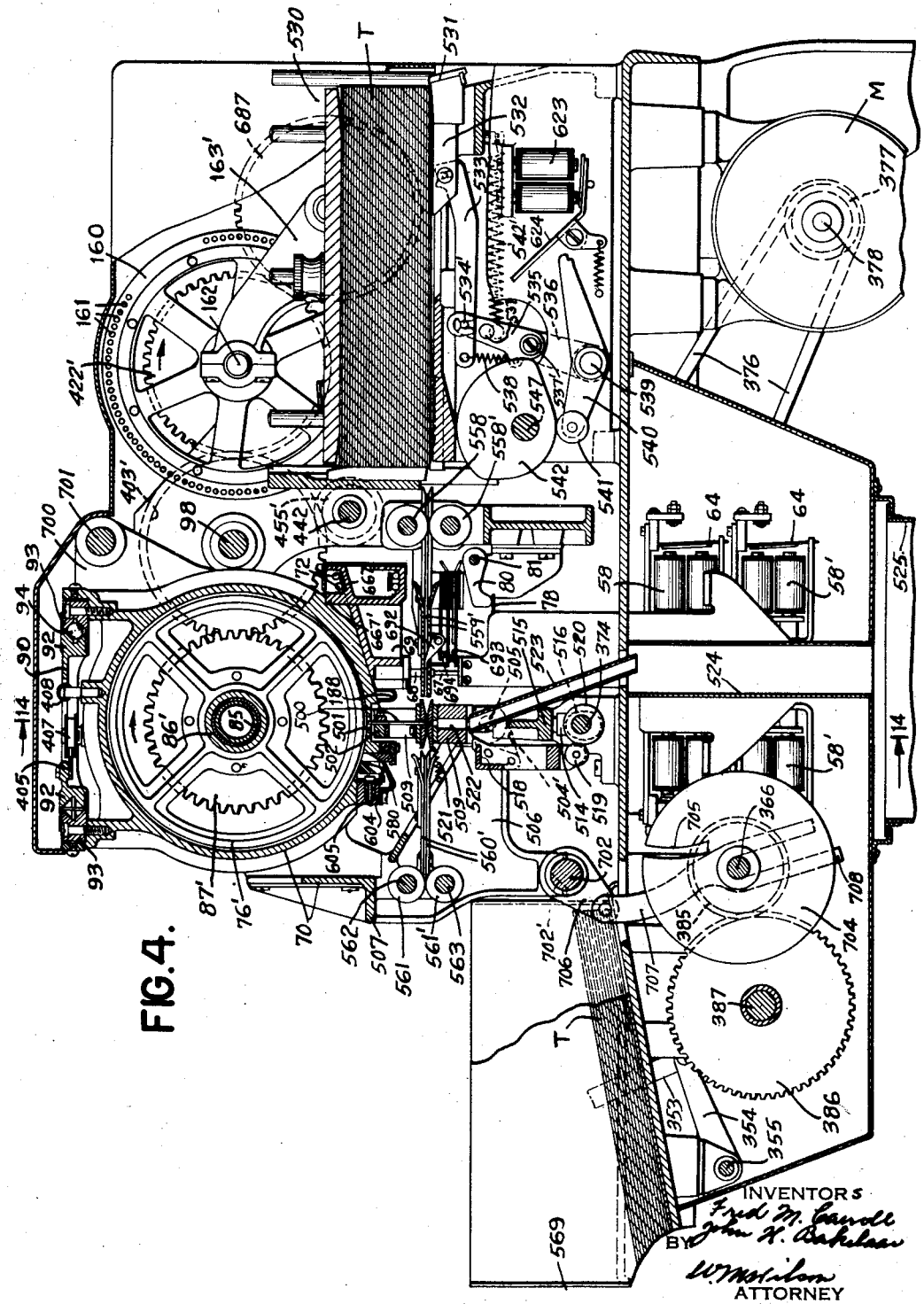
Fig. 4 is a section along lines 4—4 of Fig. 1.

The cylinders are impositively held in the positions to which they are shifted by the following means: Referring to Figs. 1 and 4, to the cylinder carriage 90 is fastened a horizontal bar 405, the opposite edges of which are inclined. Pivoted to the top of cylinder housing 70 is a bell crank 406 having at one end a roller 407. A spring 408 between bell crank 406 and cylinder housing 70 urges roller 407 towards bar 405. When the cylinder carriage is in either extreme position, the roller is engaged with an inclined end of bar 405 to impositively restrain movement of the carriage and, consequently, shifting of the ball cylinders. While the cylinders are being shifted, roller 407 rides along the front edge of bar 405. For reasons which will be brought out later, bar 405 also has a central notch 703 (Fig. 1) to coact with roller 407 for impositively holding carriage 90 in its mid-position.

*Escapement release from home position*

As explained before, the escapement mechanism is held in home position by engagement of stop 120 (see Fig. 32), fixed to gear 99, with the top of an abutment 122. To release the escapement mechanism from home position, abutment 122 must be withdrawn from stop 120. This is done during the cycle of shaft 366, under control of a cam 409 at the right end of shaft 366, as viewed from the front of the machine, or at the left end, as seen in the bottom view, Fig. 50. As shown in Fig. 2, a lever 410 is held by a spring 411 engaged at its lower end with the periphery of cam 409. Lever 410 is connected by a link 412 to linkage 413, which, as clearly indicated in Fig. 32, is connected to bell crank 414 which carries abutment or stop 122.

During the revolution of shaft 366, cam bump 409' of cam 409 rocks lever 410 counterclockwise (Fig. 2), which through linkage 412—413 rocks bell crank 414 and stop 122 carried thereby clockwise. Stop 122 thus withdraws from stop 120, permitting the escapement mechanism to move to its first column position, as previously explained. Cam bump 409' is short and rocks lever 410 counterclockwise momentarily, then releases it for restoration by spring 411. Accordingly, stop 122 returns to initial position but by that time, the escapement gear 99 has moved clockwise to first column position, and stop 120, therefore, is ahead of stop 122. When a loading cycle is completed, the escapement mechanism passes its eightieth column position, and as explained before, its ratchet wheel 103 is then released by pawl 138. Spring 106 then freely moves the escapement mechanism until stop 120 engages stop 122, which has returned to initial position, and is thereby arrested in home position.

As will be understood from the operation and timing diagram (Fig. 53) the release of the escapement mechanism from home position occurs after the ball cylinders have been completely shifted from one position to another. Following a manual start operation (an operation of key 350) shaft 366 has been set in rotation (by depression of key 350) for a one revolution cycle, which, for convenience, may be referred to as the shift cycle. Referring to line 2 of the time chart (Fig. 53), at the "8" point of the shift cycle, cam 388 has completed a shifting operation of both cylinders 76 and 76' and of switch bar 60, after which the cam dwells until the next shift cycle.

Referring now to line 12 of the timing diagram, cam bump 409' acts between the 8th and 10th points of the shift cycle to reciprocate stop 122. During the forward stroke of stop 122, it withdraws from stop 122, thereby releasing the escapement mechanism. This occurs shortly after the "9" point of the shift cycle when the cylinders 76 and 76' already have been set in their new positions. Thus, if the operator depresses a key 10 to form an escapement circuit C while the cylinders are still shifting to their new positions, the momentary energization of escape magnet 63 by circuit C cannot cause an operation of the escapement mechanism, since stop 122 is then still engaging stop 120 and preventing spring 106 from moving the escapement shaft 100.

Neither can a loading operation result during cylinder shifting, since switch bar 60 is then moving between contact terminals 59 and 59', so that circuits B or B' cannot form.

Shifting of the punch pin wheel

As previously stated, during the first punch selecting cycle, punch pin wheel 160 is driven by the escapement mechanism, clutch collar 168 being then engaged with escapement-driven sleeve 164, as indicated in Fig. 1. Also during this first punch selecting cycle, those pins 161, of the punch pin wheel, which correspond to the constant data card columns are projected to the left of the pin wheel (Fig. 23). The purpose of these pins is to cause repeat punching of constant data without requiring a new set-up after each punching cycle. In order to effect this control, the punch pin wheel is disconnected from the escapement drive after the first loading or punch selecting cycle, and is shifted into driving connection with the punch cycle drive.

The means for shifting the punch pin wheel includes a cam 415 (see Fig. 5) on the right hand end of shaft 366, as viewed in Fig. 50, or at the left end, as viewed from the front of the machine. Near the beginning of the shift cycle, cam bump 415' of cam 415 rides past the right end (Fig. 5) of a bell crank lever 416. Lever 416 is connected by a link 417 to a lever 418 which has a lug 419 facing a tab 420' of arm 420a of a bell crank lever 420 fast to the lower end of shaft 170 (Figs. 5, 23, 36, 39, and 40).

When cam bump 415' rides past lever 416, it rocks the lever counterclockwise against resistance of a spring 421. Through link 417, lever 418 is rocked clockwise, and its lug 419 thereupon engages tab 420' of bell crank 420 and rocks the latter counterclockwise (Fig. 36).

As a result, shaft 170 swings counterclockwise and crank arm 171 located at the upper end of the shaft (Fig. 23) rocks to the right and shifts collar 168 from the position shown in Fig. 1 to the position shown in Fig. 36. Collar 168 is thus declutched from escapement-driven sleeve shaft 104 and clutched to punch cycle driven sleeve shaft 422. Sleeve 422 is rotatably mounted on shaft 162 of pin wheel 160 and rigidly carries a gear 422' which is in fixed meshing relation to punch position gear 403'.

The right hand arm 420b of bell crank 420 is formed at its free end with a right-angularly bent terminal lug, having one portion 420c extending at right angles from arm 420b and the other portion 420b extending at right angles from the first side, and, consequently, parallel to the plane of arm 420b (see Figs. 36 and 40).

During the first loading cycle, with bell crank 420 in its clockwise position shown in Fig. 1, the lug portion 420c is lying on the upper surface of the armature 423 of a magnet 424. The armature thus limits clockwise movement of bell crank 420 and, in turn, the latter meanwhile, prevents a spring 425 (Fig. 36) from rocking the armature clockwise.

Arm 420a of lever 420 is formed at its free end with a transversely bent tab 420e engaging with one end of a slide pin 426 having an insulating tip at the other end engaging a spring blade 427. Blade 427 is rigidly connected by an insulating tie pin 428 to another spring blade 429. Blade 427 and its companion blade 427' carry between them contacts 430 while blade 429 and its companion blade 429' carry contacts 431.

The pressure of spring blades 427 and 429, acting through pin 426 on tab 420e of bell crank 420 urges the bell crank clockwise (Fig. 36). During the first loading cycle when the position of the bell crank 420 is such that its lug portion 420c is on top of armature 423, the pressure of spring blades 427 and 429 on the bell crank is greater than any opposite force exerted by spring 425, through armature 423, on the bell crank, and is effective during the first loading cycle to hold bell crank 420 in clockwise position (Fig. 1). With the parts in such position, blades 427 and 429 are closest to their companion blades 427' and 429', and contacts 430 and 431 are closed, as indicated in Fig. 40.

Referring now to the circuit diagram (Fig. 54) when contacts 431 are closed, the following circuit is established:

*Circuit F.*—From line 52, through contacts 431, and relay magnet 53, to line 55.

Circuit F energizes relay 53, to thereby close contacts 53a in circuit A and contacts 53a' in circuit D. For this reason, during the first loading cycle, constant data circuit A, as previously explained, is routed through the lower contacts 53a to cause energization of magnet 54 which sets pins 161 of punch pin wheel 160 in constant data position. Also, during the first loading cycle, with contacts 53a' closed, when back-spacing lever 190 is operated, the back-spacing circuit D is routed through magnet 216 which restores the pin 161, last projected, towards the right, as explained before.

After the first loading cycle, when start key 350 is depressed to set shaft 366 in operation for one revolution, cam 415 of this shaft operates lever 416, link 417, and lever 418 to strike tab 420' of bell crank 420 and forcibly rock the latter counterclockwise from the position of Fig. 1 to the position of Fig. 36. As explained above, this connects punch pin wheel 160 to the punch position gear 403'. In addition, with the bell crank in counterclockwise position, tab 420e presses on pin 426 to separate blades 427 and 429 from their companion blades 427' and 429' to thereby open contacts 430 and 431, as shown in Fig. 36.

When contacts 431 are opened, circuit F through relay 53 breaks, and by spring pressure, contacts 53a and 53a' are opened and contacts 53b and 53b' are closed.

Further, when bell crank 420 is moved to its counterclockwise position (Fig. 36), lug portion 420c slides off the free end of armature 423, and spring 425 moves the armature upwardly to engage its front, free end with the front of lug portion 420c, thereby latching the bell crank in its counterclockwise position, against the pressure of spring blades 427 and 429. The upward movement of the armature is limited by engagement with the bottom of terminal lug portion 420d (see Figs. 36 and 40) which is shorter than terminal side 420c.

Thus, after the end of the first loading cycle, when start key 350 is depressed, it causes the following to happen:

Rotation of shaft 366 for one revolution.

Shifting of ball cylinders 76 and 76' to their alternate stations.

Shifting of contact bar 60 from one set of terminals 59 or 59' to the other set of terminals.

Shifting of the punch pin wheel drive from the escapement mechanism to the punch cycle drive mechanism.

Opening of contacts 53a and 53a' and closing of contacts 53b and 53b'.

Release of stop 122 from stop 120 of the escapement drive, permitting the latter to move to first column position.

The timing diagram (Fig. 53) line 10 indicates that during the first shift cycle, the pin wheel clutch 168 is shifted before the "3" point, while line 12 indicates that the escapement release to its first column position takes place at about the "9" point. Thus, the punch pin wheel, having been disconnected from the escapement drive before the latter is released from its home position, remains at home position (indicated in Fig. 34) when the first shift cycle ends.

Punch cycle drive

Near the close of the shift cycle of shaft 366 at about the "9" point, as indicated by line 13 of the timing diagram (Fig. 53), the shaft releases the punch cycle driving means for actuation by main shaft 374. Referring to Fig. 5, engaging the periphery of a cam 432 on shaft 366 (see also Fig. 50) is the right hand end of a bell crank lever 433. The other end of lever 433 is connected by a link 434 to a three-armed lever 435, which is urged counterclockwise by a spring 436. Link 434 is thereby urged to rise and rock lever 433 clockwise, which it cannot do while riding on the circular periphery of cam 432. Lever 435 pivotally carries a latch 437 held by a spring 438 against a bent over tab 439 of lever 435, and located thereby in position to engage the tail of a clutch dog 440 pivotally carried by a disk 441.

Figure 37:
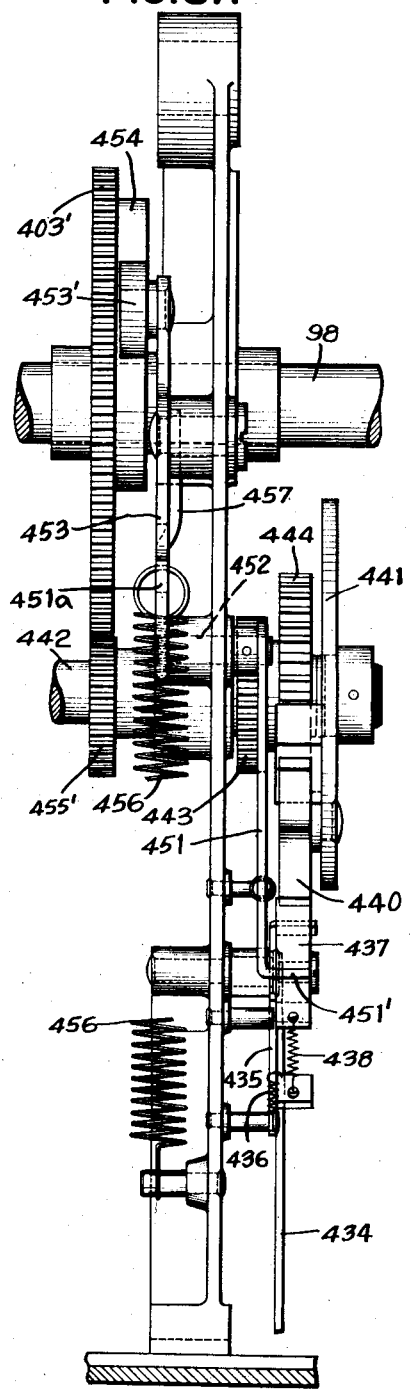
Fig. 37 is a rear view of part of the driving gear taken generally along lines 37—37 of Fig. 5.
Figure 38:
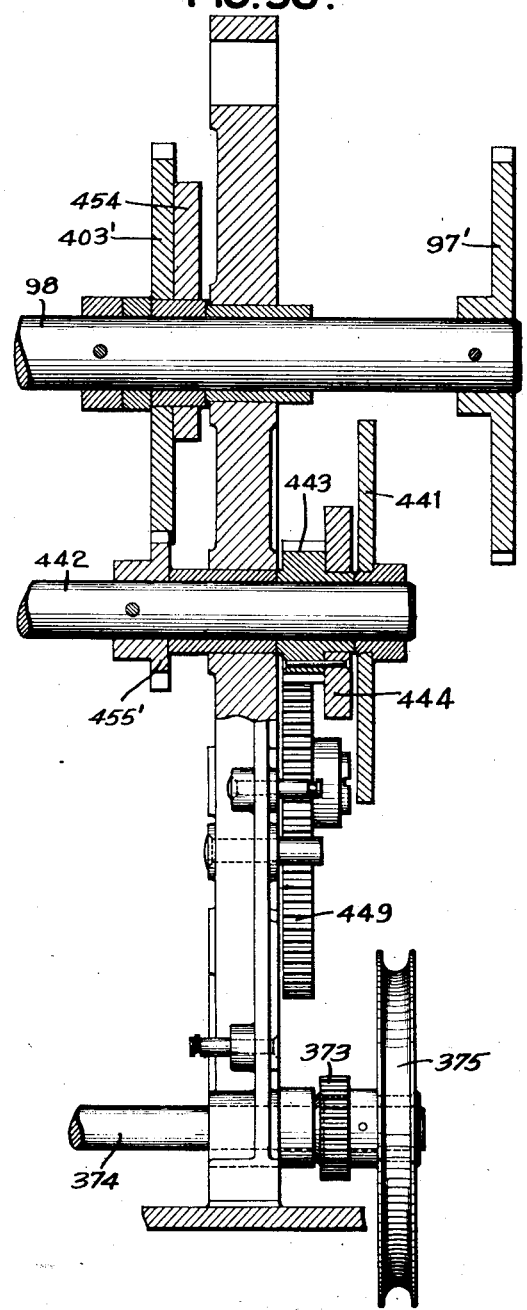
Fig. 38 is a rear, partly sectional, view taken along lines 38—38 of Fig. 5.

Disk 441 is secured to the left end of punch cycle drive shaft 442, as viewed from the front of the machine and in Fig. 1, or at the right end, as shown in the bottom view, Fig. 43, and in the rear views, Figs. 37 and 38. Adjacent disk 441, shaft 442 rotatably carries a gear 443 to which is secured a ratchet disk 444 (see also Fig. 5). Gear 443 is driven from constantly rotating main shaft 374 by the gear train comprising gears 373, 372, 445, 446, 447, 448, and 449 (see Fig. 5).

While latch 437 is in front of the tail of clutch dog 440, the latter is unable to engage the teeth of driving ratchet wheel 444. Near the end of the shift cycle, cam recess 432' of cam 432 on shaft 366 rides past lever 433, permitting spring 436 to rock lever 435 counterclockwise, and withdraw latch 437 from clutch dog 440.

A spring 450 thereupon moves the nose of the clutch dog into engagement with ratchet wheel 444, thereby coupling disk 441 to the ratchet wheel for rotation. When latch 437 moved down to release the clutch dog, a shoulder 437' on the latch came under lug 451' of an arm 451 rigidly dependent from one end of a pivot 452 (see Fig. 37), and urged counterclockwise (Fig. 5) by a spring 452'. Lug 451' thereby retains latch 437 in its lower, clutch-releasing position, after cam recess 432' rides past lever 433. When this happens, cam 432 restores lever 433, (counterclockwise, Fig. 5) which, in turn, rocks lever 435 clockwise. This movement of lever 435 will rock latch 437 counterclockwise about its pivotal mounting on lever 435 and stretch spring 438 without releasing the latch from lug 451'.

Disk 441 has now been coupled to ratchet wheel 444 for rotation and will make three revolutions before it is uncoupled. To uncouple disk 441 from wheel 444, lug 451' of arm 451 must first ride off shoulder 437' of latch 437 so as to permit spring 438 to relax and rock the latch clockwise (Fig. 5) into its normal position for intercepting the tail of clutch dog 440.

To release lug 451' from latch 437, arm 451 must be rocked clockwise (Fig. 5). For this purpose, pivot 452 of arm 451 carries an upright arm 451a (see Figs. 5 and 37) located in the path of movement of the lower, free end of a lever 453. Lever 453 has a follower roller 453' riding on a spiral cam 454 which is rigid with the side of punch position gear 403', the hub of which is rotatably mounted on shaft 98 (see Figs. 5, 37, and 38). Gear 403' is meshed with a gear 455' fast to shaft 442 and makes one revolution for three revolutions of shaft 442.

As cam 454 rotates clockwise (Fig. 5) it rocks lever 453 counterclockwise (Fig. 5) against resistance of a spring 456 connected to the lever by a link 457. Before cam 454 has finished its one revolution, lever 453 has been rocked sufficiently counterclockwise by the cam to engage its lower end with arm 451a and to thereby rock arm 451 clockwise. This releases lug 451' from shoulder 437' of latch 437, permitting spring 438 to return the latch to position for intercepting the tail of clutch dog 440. The engagement of the latch with the clutch dog occurs when cam 454 has made a single revolution, or when shaft 442 has made three revolutions, since the latter is geared 3:1 to gear. 403' of cam 454. At the end of the three revolution cycle of punch cycle drive shaft 442, clutch dog 440 will be rocked by latch 437 out of coupling engagement with ratchet wheel 444, and rotation of shaft 442 will be arrested.

Escapement spring, automatic rewinding means

Referring to the bottom view (Fig. 43) shaft 442 at its left end has a gear 455 meshed with punch position gear 403, which at one side meshes with gear 87 of cylinder 76 when the latter is in punch position, and at the opposite side meshes with automatic spring winding gear 113, as indicated in Fig. 1. During the three revolution cycle of shaft 442, through gears 455 and 403, it effects a single revolution of gear 113. Gear 113 acting through pawl 123 rotates ratchet wheel 111 and gear 110 (Figs. 13 and 41) to wind up spring 106 of the escapement mechanism.

At the end of the cycle of shaft 442, spring 106 now fully wound up, reacts on the shaft in a direction tending to reverse rotation thereof, or to move it clockwise (Fig. 5). This would cause clutch dog 440 to retreat from latch 437, permitting spring 450 to move the dog into engagement with constantly rotating ratchet wheel 444 to cause a momentary rotation of disk 441 and its shaft 442 counterclockwise before latch 437 again intercepted and uncoupled the clutch dog. The result would be a teetering back and forth of shaft 442 under the oppositely directed driving forces of spring 106 and ratchet wheel 444. This is prevented by coaction of spring-impelled lever 453 and cam 454. The primary purpose of cam 454 and lever 453 is to limit punch cycle shaft 442 to three revolutions. The secondary purpose is to prevent teetering of shaft 442. This is accomplished as follows: At the end of a single revolution of cam 454, when roller 453' drops off the peak of the cam, spring 456 rocks lever 453 clockwise (Fig. 5) and forcibly holds roller 453' seated in the crotch of the cam, thereby locking the cam effectively against counterclockwise rotation under the influence of escapement spring 106.

Since the cam is driven by gears 403' and 455' from shaft 442, locking of the cam, at the end of its single revolution, against counterclockwise movement also locks shaft 442 against clockwise motion at the completion of its cycle of three power-driven revolutions, and thereby prevents reaction of escapement spring 106 from effecting undesirable movement of shaft 442.

*Start key interlock*

It is desired to have one punch cycle for each escapement or loading or set up cycle, and start or operating key 350 should not be operative to initiate a shift cycle until the previous loading and punching cycles have been completed. Obviously, if the loading cycle of a ball cylinder at loading station is not yet completed, then shifting of this cylinder to the punching position and the punching cycle which follows the shifting will be premature. Further, premature shifting of the cylinder at the punching position, where it is effecting punching, to its loading position will interrupt the punching operation before the card is completely punched. To prevent initiation of a shifting cycle before the preceding loading and punching cycles are completed, the following means are provided:

Referring to Figs. 1, 5, 23, and 36, sleeve shaft 164 which is driven from the escapement means through gears 97' and 165, and makes one revolution each loading cycle, carriers a disk 460 with a notch 461 (see Fig. 5). Similarly, sleeve shaft 422, which is driven from the punch cycle shaft 442 through gears 455', 403', and 422' and makes one revolution for each punch cycle, carries a disk 462 with a notch 463.

Below disks 460 and 462 and spanning the distance between the disks is a wide lock plate 464 pivoted on pins 465 (Figs. 5 and 23) and formed at its upper end with horizontally spaced teeth 466 and 467 shaped to fit into notches 461 and 463 of the disks.

A spring 468 urges plate 464 counterclockwise (Fig. 5) to abut the top of a vertical slide rod 469. The lower end of this rod rests on tab 470 of a bell crank lever 471 having a tab 472 engaging the left end of a horizontal slide wire 473. The other end of wire 473 abuts the front of the lower arm of release lever 363 of the shift cycle clutch mechanism. In order to release the dog 364 of the shift cycle clutch, lever 363 is rocked clockwise and this, as explained before, is done upon depression of start key 350 which acts through lever 352, link 353, arm 354, shaft 355, arm 356, link 357, lever 358, member 360, and block 379 of the latter.

It is apparent that the start key cannot be depressed unless lever 363 is free to rock clockwise (Fig. 5), and this lever cannot rock clockwise unless wire 473 is free to move to the left and through lever 471 to move rod 469 upwardly. In order for rod 469 to move upwardly, lock plate 464 must be free to rock clockwise, which it cannot do unless its teeth 466 and 467 register with both notches 461 and 463 of disks 460 and 462. Both these notches register with the teeth only when both disks have completed their revolutions and are in home positions. If either the loading or punching cycle is incomplete, either disk 460 or 462 will not have its notch in register with a tooth of lock plate 464, and the operator will not be able to depress start key 350 to initiate a shift cycle. In this manner, a shift cycle cannot be effected before both the escapement drive and the punch cycle drive have finished their cycles.

An advantage of this interlocking mechanism, in addition to the advantages already set forth of requiring a complete punch cycle to occur for each escapement cycle, is that the tension of escapement spring 106 is maintained substantially uniform throughout the escapement or loading cycle. This is because each cycle of punch cycle shaft 442 results in winding up spring 106 through gears 455', 403', 113, pawl 123, ratchet wheel 111, and gear 110 (Figs. 1, 13, and 41). Thus, the unwinding of spring 106 during a loading cycle is compensated for by winding up the spring during the accompanying punch cycle. Because a cycle of shaft 366 cannot be initiated unless the preceding punch cycle and loading cycle have both been completed, cam 409 on shaft 366 cannot, through linkage 410, 412, 413, and 414 (Figs. 2 and 32), release stop 122 from stop 120; thus the escapement mechanism cannot leave home position for a second loading cycle unless a punch cycle has first been completed to rewind spring 106 of the escapement means.

It is undesirable to have teeth 466 and 467 of plate 464 ride on the peripheries of disks 460 and 462 during rotation of the latter, since this would cause undue wear of the teeth. Further, it is desirable to prevent premature operation of start key 350 from forcing the teeth against the peripheries of the disks during rotation of the disks since the teeth would be injured by such action. For these reasons, during the greater part of the rotation of the disks, plate 464 is also latched against operation by start key 350 by engagement with the right hand ends of a pair of T-levers 474 and 475 (see Figs. 5 and 23).

These levers are urged clockwise by springs 476 to release lock plate 464 for operation by rod 469. However, until disks 460 and 462 are near their home positions, levers 474 and 475 are prevented from rocking clockwise by engagement of the top of their left hand arms with the lower ends of a pair of latch levers 477 and 488 urged counterclockwise, into latching position, by springs 479. Just before disk 460 reaches home position, a stud 480 thereon rides past the upper end of lever 477, and, in so doing, rocks the latter clockwise to release lever 474. Similarly, a stud 481 on disk 462 releases lever 478 from T-lever 475. When a lever 474 or 475 is released, its spring 476 rocks it clockwise to unlatch it from lock plate 464. Both disks must reach home position to cause complete unlatching of lock plate 464 for operation by start key 350. If either disk has not substantially completed its cycle, then either latch lever 477 or 478 will not release its associated T-lever 474 or 475, and plate 464 will remain latched by one of the T-levers. Thus, as indicated in Fig. 5, the punch cycle has been completed and disk 462 is in home position; its stud 481 has released lever 478 from T-lever 475, which, in turn, has unlatched lock plate 464. The loading cycle has not been completed; therefore, disk 460 is not in home position, and T-lever 474 is still latching lock plate 464 against operation by start key 350.

After studs 480 and 481 of disks 460 and 462 pass levers 477 and 478, the latter are retained in clockwise position by engagement with the left ends of levers 474 and 475.

Early in the cycle of shaft 366, its cam 415 operates linkage 416, 417, 418 to shift the punch pin wheel drive from the escapement mechanism to the punch cycle shaft 442. This same linkage also serves to unlatch levers 474 and 475 from levers 477 and 478. For this purpose, lever 418 is horizontally extended at its upper end to engage a tab 482 at the lower end of a lever 483. When cam bump 415' rides past lever 416, through link 417, it rocks lever 418 clockwise. The upper end of the latter thereupon presses on tab 482 to rock lever 483 counterclockwise (Fig. 5), and lever 483 in turn rocks a bail 484 clockwise. As bail 484 rocks clockwise, lugs 486 formed at its upper end press on the depending arms of T-levers 474 and 475 to rock the latter counterclockwise, restoring them to latching position with respect to lock plate 464 and displacing their left ends from in front of levers 477 and 478. Springs 479 thereupon rock levers 477 and 478 counterclockwise to latching position above levers 474 and 475. The parts of the interlocking mechanism are then in their initial positions.

*Card punching*

Referring to Figs. 4, 14, 45, and 46, the punching means comprises a column of twelve vertically disposed punch pins 500, each for punching a different index point position of a card column. Each punch pin is of oblong cross-section to punch an elongated hole in the card. When a ball cylinder 76 or 76' is in punch position, each of its twelve circumferential rows of pockets 75 lies in the same vertical plane as one of the twelve pins 500, so that there is one punch pin corresponding to and allotted to one of the circumferential rows of pockets 75. Each punch pin is disposed below and normally in line with the vertical axis of its corresponding circumferential column of pockets 75.

Cylinder housing 70 has a horizontal slot 501 formed at the bottom and centrally of the cylinder housing (see also Figs. 8 and 43), and extending in alinement with the column of twelve punches 500 which pass loosely through the slot.

The punches are guided, at their upper ends by a comb guide 502 and a comb plate 503 secured to the bottom of guide 502. Comb plate 503 is engaged with shoulders 503' of the punches to support the latter when they are in normal lower positions (see Fig. 46). Comb guide 502 is fixed at its opposite ends to a pair of vertical side plates 504. These plates are hinged at their lower ends on pins 505 carried by arms 506 of a bifurcated bracket 507 fixed to the front of the cylinder housing (also see Figs. 1, 2, 17, and 43).

To the face of each side plate 504 is fast a vertical rail 508. Bridging the side plates is a block 509 (Figs. 4, 14, and 45), the sides of which are channeled to ride along the vertical rails 508 (see Figs. 14 and 45). Block 509 rigidly carries upper and lower dies 510 and 511 and a punch restoring plate 512 engaging shoulders 512' on the punches to positively return the latter downwardly (see Fig. 46). The dies are spaced apart to receive the card T to be punched. Normally, bar 503 supports the punches clear of and above the card in punching position.

Block 509 is bored at the bottom to receive a pair of vertical pins 513, the heads of which engage the bottom of the block and rest on top of rods 514. The latter pass through guide holes in a frame bracket 515 and are supported by a pair of cams 516 fixed to main shaft 374.

During rotation of shaft 374, cams 516, against resistance of a pair of springs 517, periodically raise rods 514, pins 513, block 509, the dies 510, 511, restoring plate 512, and the card between the dies. As the card rises, it engages and elevates freely those punches which are below empty pockets 75 but is unable to raise any punch the head of which is engaged by a ball in a loaded pocket. At the completion of the rise of the card, the latter punch will have penetrated it, as indicated in Fig. 46.

The cylinder at punching station is rotated continuously by punch cycle shaft 442. Thus, when cylinder 76' is at punching station, it is driven by shaft 442 for one revolution each cycle, through gearing 455', 403', and 87' while cylinder 76, when at punching station, is driven from shaft 442 by gearing 455, 403, and 87 (see Figs. 1, 4, 37, 38, and 43). The cylinder at punching station is thus rotating continuously clockwise (Fig. 4) during the punching operation and its eighty horizontal columns of pockets 75, each corresponding to a card column, are successively and in continuous motion traversing the punching line. In order for the column of punches to be effectively controlled according to the loading of balls in each horizontal column of pockets as the latter travel across slot 501, the heads of the punches, during the punching action, are given a motion equal to that of the passing horizontal column of pockets and in the same direction.

The card T between the dies 510 and 511 is also in continuous feeding motion, as will be further explained. In order that a punch, after penetrating the card, should not, due to continuous motion of the card, tear the card but make a clean perforation, the lower ends of the punches during the punching action are moved at the same speed and in the same direction as the card being punched.

Thus, the heads of the punches are to move at the speed and in the direction of the horizontal column of pockets 75 passing the punch column while the lower ends of the punches are to move in unison with the card.

To move the punches in above manner, the punch assembly is oscillated, about hinge pins 505, by the following means:

Side plates 504 of the punch assembly are formed at their lower ends with extensions 504' (see Figs. 4, 45, and 45a) to which are rigidly secured the opposite ends of a T-shaped bridge member 518. The plates 504 are hinged on pins 505. The upper ends of punches 500 are guided for vertical movement by comb bars 502 and 503 which are fixed to side plates 504. The upper ends of the punches, therefore, are constrained by bars 502 and 503 to oscillate with plates 504 about hinge pins 505. The lower ends of the punches are guided by restoring plate 512 and upper die 510 which are fixed to die block 509. The die block 509 is constrained by its coaction with vertical guide strips 508 of plates 504 to move sidewise with plates 504 and to oscillate with the latter plates. The lower ends of the punches, therefore, are also forced to partake of oscillation of plates 504. Thus, the entire punch assembly, which includes elements 500, 502, 503, 504, 509, 510, 512, 513, and 518 is oscillatable as a unit about pins 505. This oscillation is effected as follows: The central, depending stem of member 518 carries a roller 519 engaging the periphery of a cam 520 on main shaft 374. Springs 521 between the bracket 507 and the side plates 504 urge the punch assembly counterclockwise (Fig. 4) about hinge pins 505, thus causing roller 519 to follow cam 520.

As the cams 516 raise the punch assembly, cam 520 releases the punch assembly for counterclockwise rocking (Fig. 4) by springs 521, about pins 505. The rise of the punch assembly and the counterclockwise rocking of the punch assembly both begin as a horizontal row of pockets 75 reaches slot 501 of cylinder housing 70. As the row of pockets 75 moves across slot 501, the heads of punches 500 follow at the same rate while at the same time the punches are being elevated by the card T between the dies. If a pocket 75 is loaded, the ball 72 therein, while moving across slot 501, continuously engages the head of the punch below it to restrain rise of the latter, and the card is perforated, while in motion, by this punch. The proportion and synchronization of the parts are such that as the punch assembly rocks counterclockwise about hinge pins 505, the heads of the punches move at the same rate as the pockets of the ball cylinders while the lower ends of the punches move at the same speed as the card being punched. This movement of the punches may be termed their follow-up movement.

During the follow-up movement of the punch assembly, cams 516 of shaft 374 are acting on pins 514, 513 to raise die block 509, the dies 510, 511, the card, and through the card, all the punches except such as are restrained by engagement with balls 72. The rise of the punches and die block parts is of short duration and succeeded by descent of the die block parts under the influence of springs 517.

As part 512 descends, it acts on shoulders 512' of the punches to positively restore the latter to lower position in which their shoulders 503' rest on plate 503. While the punches and die block parts are descending, cam 520 on shaft 374 is acting on roller 519 of T-bar 518 to rock the punch assembly clockwise (Fig. 4) and restore the assembly to the rear or right hand side of slot 501. Since the oscillation and reciprocation of the punch assembly parts are both controlled by cams on the same shaft 374, these two movements may be exactly synchronized. The timing is such that the die block parts and punches rise and descend during the interval required for the ball cylinder at the punching station to move a distance equal to that between the centers of two consecutive ball pockets and the punch assembly is given one complete oscillation during this interval.

The card scraps cut out by punches 500 drop through the lower die 511, a wide slot 522 in the die block 509, a chute 523, a duct 524, and into a removable receptacle 525 (see Fig. 4).

*Card feeding*

A stack of cards T to be punched is placed in supply magazine 530 at the rear of the machine (see Figs. 1, 2, 4, 15, 16, and 45). A pair of card pickers 531 is carried by slides 532 swiveled to which are the right ends of a pair of links 533. The right hand link 533 (as viewed in Fig. 16) is pivoted by pin 534 to the upper end of the right side of a yoke 536 while the left hand link is pivoted by pin 534' to an arm 535 carried by the left side of yoke 536 on a pivot 537 and clamped in position by a screw 537' loosely passing through arm 535 and threaded into the side of the yoke.

The screw may be backed off to permit angular adjustment of arm 535 relative to yoke 536. The purpose of this adjustment is to aline the pivot 534' of left hand link 533 with the pivot pin 534' of right hand link 533 so that the two links 533 and the pickers 531 actuated thereby may be moved in exact unison.

Spring 538 between the left hand link 533 and arm 535 and a similar spring between the right hand link and the yoke 536 urge the links counterclockwise (Figs. 4 and 15) to maintain the swivel connections between the links and picker slides 532 operative.

Yoke 536 is pinned at the bottom to an intermediate portion of shaft 539 which at the left end (Fig. 16) rigidly carries a lever 540, one end of which has a roller 541 following a cam 542. A spring 542' connected to yoke 536 urges it to rock clockwise (Figs. 4 and 15) to hold roller 541 against cam 542.

Cam 542 is mounted on a collar 543 (Fig. 45) and at one side of a central circular flange 544 of the collar. A member 545 is mounted on the collar 543 at the opposite side of flange 544. Member 545, collar 543, and cam 542 are rigidly connected to each other by screws 546. Collar 543 is rotatably mounted on a fixed stud 547, and flange 544, in turn, rotatably mounts a gear 548 which is driven by punch cycle shaft 422 through intermediate gearing 549, 550, 551, 552, and 553 (see Figs. 1, 15, and 45). A pair of headed pins 554 are riveted to gear 548 to extend transversely thereof (see Fig. 15). Threaded into member 545 are screws 556 for engaging the heads of pins 554. By backing off one of these screws and advancing the other, member 545 and cam 542 fixed thereto may be rotatably adjusted about fixed stud 547, in either direction, relative to gear 548, for a purpose soon to be explained.

As gear 548 rotates counterclockwise, through engagement of the head of a pin 554 with a screw 556 of member 545, the gear likewise rotates the latter member and the cam 542 rigidly connected to the member.

Rotation of the cam rocks lever 540, its shaft 539, and yoke 536 counterclockwise (Fig. 15) causing links 533 to move to the left and picker knives 531 to feed the bottom card out of the magazine and between a pair of upper and lower feed rolls 558 and 558' (see Figs. 4 and 45). The upper and lower feed rolls are fast to the shafts of the aforementioned meshing gears 551 and 552 driven by punch cycle shaft 442. Rolls 558 and 558' advance the card along opposite guide channel strips 559, between plates 559' fixed to the strip 559, and between punch dies 510 and 511 of the punch assembly.

The cards lie lengthwise in magazine 530, with their columns extending parallel to the horizontal rows of pockets 75, and with the twelve index points of the columns in line with the twelve pockets of a horizontal row of pockets of the ball cylinder at the punch station. As the card is advanced by feed rolls 558 and 558', the card columns will be successively lined up with the column of punches 500.

The first card column should reach the lower ends of the punches at the same time as the first horizontal row of twelve pockets of the cylinder at punching station reaches the heads of the punches. At the beginning of the punch cycle, the cylinder at the punching station, as indicated in Fig. 8, has its first column pocket 75 to the right of the punch line.

At the beginning of the punch cycle, the leading edge of a card T previously fed out of magazine 530 (Fig. 45) is also to the right of the punch line. The respective distances of the first cylinder column of pockets and the first card column from the punch column are such that the punch cycle drive moves the first card column into alinement with the lower ends of the punches simultaneously with the arrival of the first cylinder column at the head of the punches.

As indicated by line 14 of the timing diagram, Fig. 53, the feed of the card and the movement of the cylinder at the punch station are effected by shaft 442 in unison, and the synchronization is such that the corresponding card columns and horizontal rows of ball pockets reach punching position simultaneously.

Figure 15:
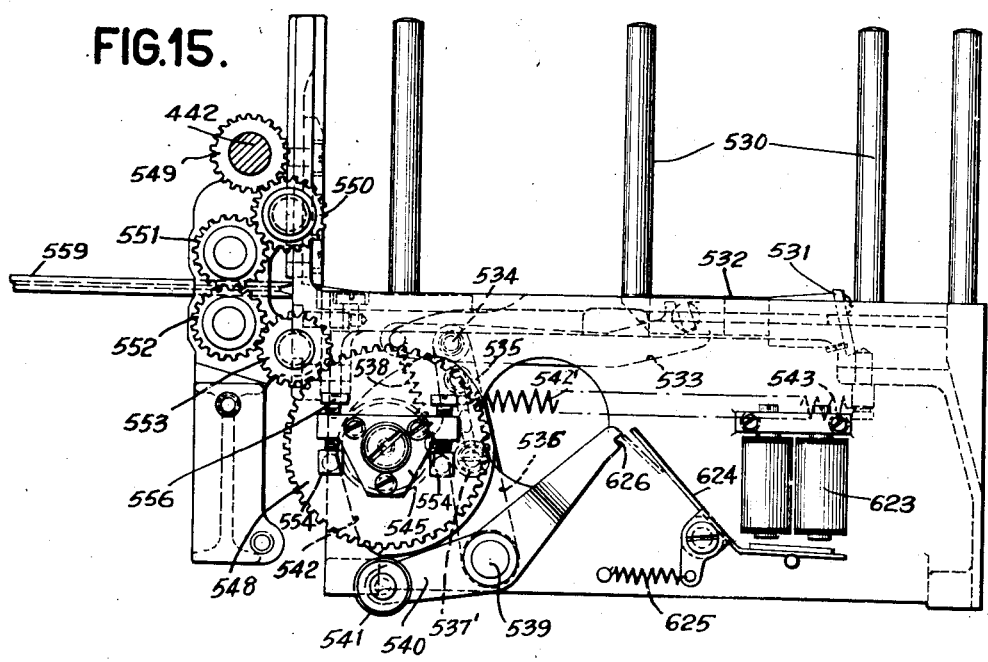
Fig. 15 is a side view of the card supply magazine and feeding means for the card.

At the beginning of the punch cycle, pickers 531 are at the end of their forward stroke, as indicated in Fig. 15, having fed a card into the grip of feed rolls 558 and 558' during the previous punch cycle. During the latter cycle, the feed rolls have advanced the card to the position shown in Fig. 45. Referring to line 15 of the timing diagram (Fig. 53) the picker knives 531 are restored by spring 543 under control of cam 542 during the first two points of the punch cycle; during the next two points of the punch cycle, cam 542 moves the picker knives through the forward stroke to feed a card into the bite of feed rolls 558 and 558'. For the rest of the punch cycle, the pickers idle.

Meanwhile, the feed rolls have been moving the preceding or advance card through the punching means and into the grip of ejecting rolls 561 and 561' (Figs. 4, 17, 43, and 45). The rolls 561 and 561' continue to feed the advance card through the punching means, and the latter card has left feed rolls 558 and 558' by the time the following card has been fed into the grip of the latter rolls by pickers 531. The feed rolls then advance the following card and at the end of the punch cycle, the latter card is in the advanced position shown in Fig. 45 in readiness for the next punch cycle.

Since the punch cycle shaft 442 rotates both the cylinder at punching station as well as the card feeding means, the rate of movement of the card and of the cylinder may be exactly synchronized so that as each successive row of twelve pockets reaches the heads of the punches, the successive corresponding card columns simultaneously reach the lower ends of the punches. In order that the feed of the card by pickers 531 begin at exactly the correct point of the punch cycle, cam 542 which controls movement of the pickers may be adjusted relative to its driving gear 548, as explained before. By adjusting member 545 relative to gear 548, the point at which the card feed by pickers 531 begins may be exactly and finely adjusted since the position of cam 542 fixed to member 545 determines this point. Thus, the card feed and the cylinder movement are not only synchronized as to speed but also adjusted to cause simultaneous arrival of the corresponding card columns and horizontal rows of pockets 75 at the column of punches 500.

The card, as it passes the punching means, is guided at the opposite sides by channel strips 560 carried by bracket 507 and moves between plates 560' secured to the strip 560. Before leaving feed rolls 558 and 558', the card enters the bite of upper and lower ejecting rolls 561 and 561', the shafts 562 and 563 of which are journaled in the bracket 507. These shafts carry meshing gears 564 and 565 at one end (see Figs. 1, 5, 43, and 45). Lower gear 565 is meshed with a gear 566 which is on a shaft 567 having a gear 568 driven by gear 447 of the train of gearing between main shaft 374 and punch cycle driving gear 442 (see Fig. 5). Feed rolls 561 and 561' eject the punched card into storage magazine 569 (Figs. 1 and 4).

*Cylinder unloading*

As a ball cylinder rotates at punch position, its eighty circumferentially spaced, horizontal rows of twelve ball pockets successively pass the punching position to effect punching control. In order to prepare the cylinder for its next loading setup, the pockets must be emptied of the balls inserted by the previous setup except where the pockets have been set up for constant or repeat data. As previously explained, it is intended to perforate certain columns of a series of cards T related to one invoice B with the same data and other columns with data individual to the card. Therefore, it is desirable in order to avoid repeated setup operations of the constant data, that the constant data setup of a ball cylinder be retained while the variable or individual data setup of the cylinder is cleared to enable a new setup of the variable data.

To effect these objects, the following cylinder unloading means and control therefor are provided:

Referring to Figs. 4, 7, and 8, cylinder housing 70 is formed with a slot 570 parallel to the axis of a ball cylinder and located, in a clockwise direction (Fig. 8), to the left of punch-receiving slot 501 of the cylinder housing. As the cylinder at punching position rotates clockwise, each horizontal row of pockets, after passing the punch column and controlling punching, reaches slot 570. Part of the width of this slot is occupied by an elongated comb shutter 571 (see also Figs. 9 and 43) slidably mounted for movement lengthwise of the slot in the channel track of a guide bar 572 secured to the bottom of the cylinder housing. Comb 571 has tongues 574 and 575 at opposite ends which project beneath the bottom surfaces of the cylinder housing to prevent upward movement of the shutter.

Comb 571 has eleven narrow teeth 576 and two wide end teeth 577 and 578 (see Fig. 7). The twelve interdental spaces are formed with inclined surfaces 579. In the normal, ball retaining position of comb 571, shown in Fig. 7, its teeth 577 and 576 are vertically below the pockets 75 of a horizontal row of the ball cylinder at the punching station, and prevent release of balls from the pockets. Wide end tooth 578 both in the normal position of the comb and in the actuated position to the left, remains under the left hand circular column of pockets (Fig. 7) of cylinder 76' when the latter is at loading station to prevent the balls in such pocket from escaping through slot 570. When cylinder 76' is at its loading position to the left of the punching position, as indicated in dotted lines in Fig. 7, then the balls in the right hand circular column of pockets of the latter cylinder are prevented from escaping through slot 570 by wide tooth 577 of comb 571.

When the comb is shifted to the left to ball releasing position, then the twelve slots between the teeth aline with the circular rows of pockets of the cylinder at the punching station, and permit the balls in such pockets to drop down between the interdental slots, and along inclined surfaces 579 into a trough 580.

The comb is moved in and out of release position by the following means. A link 581 is pivotally connected at one end to tongue 575 of the comb and at the opposite end has a horizontal slot 582 riding on pin 583 of the vertical arm of a bell crank lever 584 (see Figs. 7, 8, and 9).

A spring 585 between the link and lever holds the left end of slot 582 (as viewed in Fig. 7) against pin 583, so that movement of the vertical arm of lever 584 to the left is positively transmitted to link 581 and thereby to shutter 571 to move the latter to release position. Movement of the lever in the opposite direction is yieldingly communicated to the link and shutter through spring 585, so that in the event of jamming of the balls between the shutter and the cylinder pockets upon return movement of the shutter, neither the latter nor the cylinder will be damaged.

Lever 584 is formed near its upper end with a transverse tab 584' engaged by the end of armature 586 pivoted on pin 587 and urged by a spring 588, coiled about the pivot pin, counterclockwise (Fig. 7), into latching position. Armature 586 is moved against resistance of spring 588 by energization of its magnet 590 to release lever 584 for counterclockwise movement by a spring 591 to an extent limited by engagement of its tab 584' with a stud 592. This movement of the lever moves shutter 571 to ball release position.

In order to accurately synchronize release movement of the shutter with movement of the cylinder at the punch station, so that release by the shutter will occur just as a horizontal row of pockets of the cylinder arrives above the shutter, the movement of lever 584 by spring 591 when the lever is unlatched by energization of magnet 590 is further timed by restoring cam 593. This cam is fast to main shaft 374 (see also Fig. 14), which through the previously described transmission also rotates the ball cylinder at punch station.

Resting on cam 593 is a follower pin 594 guided for vertical movement in bracket 515. The upper end of pin 594 engages the lower edge of a transverse tab 595 formed at the free end of the horizontal arm of lever 584. When magnet 590 is energized to unlatch lever 584, then spring 591 may operate lever 584 at a time determined by cam 593, to shift comb 571 to release position.

Energization of magnet 590 is controlled by punch pin wheel 160 which is now being rotated by the punch cycle means, through gears 455', 403', and 422', as explained previously. The punch pin wheel is therefore moving in synchronism with the ball cylinder at punch position. During the constant data portion of the first loading cycle, each time a key 10 selected a repeat designation, circuit A was established to energize magnet 54. As already explained, magnet 54 when energized effected operation of a lever 173 (see Figs. 23 and 34) to cause arm 178 to shift a pin 161 to the left (Fig. 23). Each pin 161 corresponds to a different card column and to a corresponding horizontal row of pockets 75 of the ball cylinders, and when a row of pockets 75 is set up for repeat data, the corresponding pin 161 is projected to the left of the pin wheel while the pins 161 corresponding to those rows of pockets set up for variable data remain in their initial positions, further to the right of the pin wheel.

Referring to Figs. 23 and 34, at the same side of wheel 160 as its pin setting lever 173—178 is a bell crank lever 596 held by a spring 597 against stop pin 598. The lower end of the lever is bent over to engage one end of a slide rod 599.

The opposite end of rod 599 impinges a spring blade 600 carrying one of coacting contact points 601, the other of which is carried by a blade 600'. The free end of the upper, horizontal, arm of lever 596 is located in the path of travel of pins 161 of pin wheel 160 when the pins are in initial positions. When a pin has been moved to the left (Fig. 23) by a constant data setup, then that pin moves in a path clear of lever 596 and passes the latter without touching it. If a pin has not been set up by a constant data selection, then it projects towards the plane of the horizontal arm of lever 596, and as it rides past the free, upper, end of this arm of the lever, it cams the lever counterclockwise (Fig. 34). This causes rod 599 to move to the right to close contacts 601.

Referring to the circuit diagram (Fig. 54), closing of contacts 601 esablishes the following cylinder clearing circuit:

*Circuit G.*—From line 52, through contacts 601, and magnet 590, to line 55.

Energization of magnet 590 releases lever 584 (Fig. 7) for operation by spring 591 to move shutter 571 to release position, this movement being further and precisely timed by cam 592, as explained.

Punch pin wheel 160 is now being rotated in synchronism with the cylinder at the punch station, and the pins 161 pass the free end of lever 596 at the same rate as the successive horizontal rows of cylinder pockets pass release comb 571.

The parts are so disposed and correlated that the first column row of pockets 75 will reach comb 571 when the first pin 161 reaches the upper free end of lever 596. If a pin 161 is set up for constant data, then lever 596 will not be rocked and contacts 601 will remain open, so that magnet 590 will not be energized and shutter 571 will not be moved to release the balls in the corresponding row of pockets 75. The balls in the rows of pockets set up for variable data will be released by movement of shutter 571.

As stated before, part of the width of slot 570 of cylinder housing 70 is occupied by dump shutter 571. The rest of the slot is filled by a nonjam bar 602 (Figs. 4, 8, 9 and 43) having a triangular cross-section and formed at opposite ends with ears 602', rounded at the bottom to fit in the curved portions 603' of a pair of clips 603 fixed to the bottom of a block 604 secured to the bottom of the cylinder housing. Inside block 604 is a slidable plunger 605 urged by spring 606 towards bar 602. The pressure of the plunger on the bar holds the latter against the front of comb shutter 576.

The above construction is to prevent jamming of the balls as they drop through shutter 571. If the balls back up in the space between teeth 576 of the shutter and the front of bar 602, any slight pressure on the balls will rock bar 602 counterclockwise to enlarge the discharge orifice of the balls. This pressure may be exerted by a ball 72 in the cylinder rotating at the punch station or by the surface of the cylinder itself, or by the comb-shutter as the latter is reciprocated. Thus, jamming of the balls between the shutter, the ball cylinder, and the cylinder housing is prevented by making one wall of the discharge orifice movable under pressure.

The termination of the punch cycle is definitely fixed by arrest of the driven clutch disk 441 (Fig. 5) in home position. During the punch cycle, drive shaft 442 has rotated the cylinder at punching station, caused pickers 531 to operate, rotated feed rolls 558 and 558' to move a card through the column of punches, and rotated pin wheel 160 to control unloading of individual data pockets of the cylinder at punching station after these pockets pass the punch line.

While this first punch cycle is taking place, the operator may start the second loading cycle to set up the cylinder at loading station according to the second line of the list of individual items on invoice B.

Second loading cycle

If the cylinders 76 and 76' are initially in the positions indicated in Fig. 1, the first setup cycle will load cylinder 76 with individual and constant data, but if cylinders 76 and 76' are initially in the positions indicated in Fig. 14, the cylinder 76' will be so loaded. Whichever cylinder is set up in the first cycle, the escapement mechanism drives the punch pin wheel 160 during the first loading cycle, as indicated by line 10 of the timing diagram, Fig. 53. The punch pin wheel was set up to cause repeat punching during this first setup cycle. After the first setup cycle, a shifting cycle was effected. Assuming cylinder 76 to have been in loading position, the shift cycle caused the latter cylinder, now loaded, to move to punching position and cylinder 76' to move to its loading position to the left of the punching position (as viewed in Fig. 14).

In shifting the cylinders, common switch bar 60 was transferred from engagement with contact terminals 59 to terminals 59' in the circuits of loading magnets 58'; cylinder 76' was connected through gearing 87', 97', 97 and 99 to the escapement shaft 100; cam 409 on shaft 366 released stop 122 from the escapement mechanism stop 120, permitting the escapement mechanism to move to first column position; and cam 415 on shaft 366 operated bar 418 to return bell crank lever 420 to its counterclockwise position (Fig. 36) in which it is latched up by armature 423 of magnet 424. In moving to the latter position, lever 420 caused contacts 430 and 431 to open. Cam 432 on shift cycle shaft also initiated the first punch cycle to punch the first card according to the set-up of the ball cylinder 76 now at the punching station.

As a result of the opening of contacts 431, relay 53 was deenergized, in turn causing contacts 53b and 53b' to close and contacts 53a and 53a' to open.

While the punching operation of the first card is being effected under control of cylinder 76, the second loading cycle may proceed for setting up cylinder 76'. The latter cylinder is clear of any set up at the beginning of the second loading cycle, and must be loaded with the constant data as well as with the variable data to be perforated in the second card. The operator must repeat the punch-selection of constant data, and, therefore, again depresses repeat key 41, closing contacts 44.

Since the constant data has already been typed on the invoice, the setting up of the constant data during the second loading cycle must not effect printing. For this reason, the operator now depresses non-print key 21 (Figs. 1 and 22) to interpose bar 24 in the path of the linkage 19 which prevents typing, as previously explained. Depression of a key 10 then causes closing of common ball-operated contacts 40' in the constant data circuit, completing constant data circuit A', from line 52, through contacts 44, contacts 40', relay contacts 53b, a magnet 607, and to line 55 (see Fig. 54).

Figure 18:
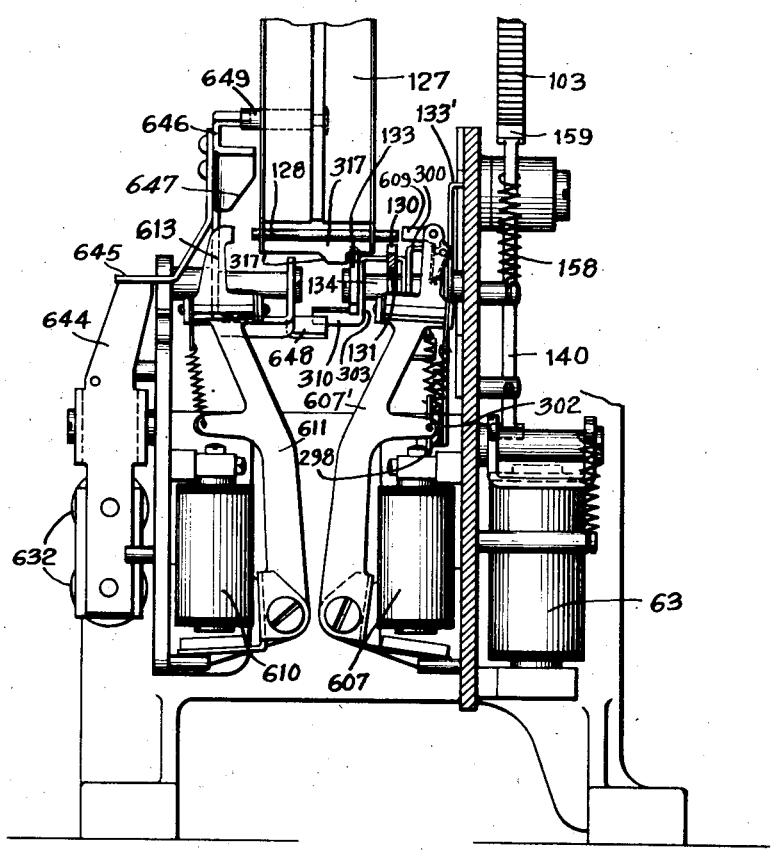
Fig. 18 is a front end view of part of the escapement mechanism.

Referring to Figs. 18 and 30, magnet 607 is the set-up magnet for escapement pin wheel 127. Energization of magnet 607 rocks armature lever 607' counterclockwise (Fig. 18) against the resistance of spring 608 (Fig. 30) causing striking arm 609 carried by lever 607' to push the pin 128 in front of the arm further to the left of pin wheel 127.

As explained before, pin wheel 127 has eighty pins 128, each corresponding to one of the horizontal rows of twelve pockets 75 of a ball cylinder and to the corresponding card column. During the preceding shift cycle, the escapement mechanism moved cylinder 76' so as to locate its first row of twelve pockets 75 at the loading line and at the same time moved pin wheel 127 to locate the "first column" pin 128 in front of striking arm 609. As the latter pin moves to first column position, it cams against the top of lug 130 to rock lever 131 clockwise, which through spring 132 similarly rocks yoke 133. Lug 133' of yoke 133 thereupon displaced lug 135' of latch 135 off ledge 137 of pawl 138 (see Figs. 3 and 32) causing the pawl to move up and engage wheel 103 to maintain the parts of the escapement in first column position until energization of the escape magnet 63 occurs.

These are the positions of the parts at the beginning of the second loading cycle. When the first constant data circuit A' is formed, the "first column" pin 128 is operated upon by energization of magnet 607. Simultaneously with formation of the "first column" circuit A', the depression of key 10 established a loading circuit B' to energize one or more magnets 58' for loading the "first column" row of pockets 75 of cylinder 76', in the manner previously described.

In the same way as during the first loading cycle, each depression of a key 10 also forms escapement circuit C to energize escapement magnet 63 and cause a step movement of the parts driven by the escapement mechanism. The cylinder 76' and pin wheel 127 are thus moved to "second column position." Thus, loading and escapement is effected, as during the first loading cycle, to setup cylinder 76' for the constant data. Instead of setting up pins 161 of pin wheel 160, which was done during the first loading cycle, the pins 128 of pin wheel 127 are set up during the second loading cycle.

The operation of the back-spacing mechanism during the second setup cycle effects unloading of a row of pockets of cylinder 76' and backspacing of the escapement mechanism, just as during the first setup cycle. Now, however, closing of back-space contacts 215 (see Fig. 54) forms the back space circuit through upper relay contacts 53b' (now closed), so as to energize magnet 610 (see Fig. 18) instead of magnet 216 of the punch pin wheel means. Energization of magnet 610 rocks lever 611 clockwise (Fig. 18), causing arm 613 of the lever to strike the pin 128 which was last set up by magnet 607 and return the pin to its initial position before the backspace movement of the escapement means is effected by pawl 225.

In the same way as in the first loading cycle, constant data contacts 56 are opened and variable data contacts 56' are closed as the escapement moves to the first column which is to be set up for individual data, and the subsequent loading of cylinder 76' is under control of live field selector 232. Before starting the individual data selection, the operator releases both constant data key 41 and non-print key 21.

At the end of the second loading cycle, cylinder 76' will be set up with the constant data as well as with the variable data relating to the second line of items on the invoice, and escapement pin wheel 127 will have its pins 128 corresponding to the constant data columns shifted to project further to the left (Fig. 18).

In the meanwhile, the punching of the first card by cylinder 76 has taken place and the card ejected into storage receptacle 569. The operator now depresses operating key 350 to cause a second shifting cycle to take place and as before cam 388 is rotated half a revolution.

During the second half of its revolution, this cam returns switch bar 60 to engagement with terminals 59 of loading circuits B and returns cylinder 76' to punching position and cylinder 76 to its loading position to the right of the punching position. The shift cycle also releases the escapement means to first column position and initiates a new punch cycle, in the same manner as explained before. Punching of the second card then proceeds under control of loaded cylinder 76'. Under control of pins 161 of punch pin wheel 160, only the pockets of cylinder 76' representing the individual data set up are unloaded. At the end of the punch cycle, cylinder 76' will be loaded with the constant data setup only.

Control by escapement pin wheel

At the end of the second loading cycle, both cylinders 76 and 76' have the rows of pockets 75 corresponding to constant data columns loaded selectively according to the constant data; and both pin wheels 127 and 160 are also set up according to the constant data.

The purpose of setting up escapement pin wheel 127 is to cause the escapement mechanism during the third and subsequent loading cycles to skip the rows of pockets loaded with constant data past the loading line, and to arrest only the unloaded rows of pockets corresponding to individual data columns at the loading line. After the second loading cycle, the operator depresses start key 350 to initiate a shifting cycle. During this shifting cycle, cam 409 (Fig. 2) causes stop 122 to withdraw from stop 120 to release the escapement mechanism from home position.

While the escapement mechanism is at home position, lever 131 is in counterclockwise position (Fig. 30), and yoke 133 is in similar position indicated in Fig. 32, permitting spring 136 to hold latch lug 135' above shoulder 137 of escapement pawl 138 (see also Fig. 3). When stop 122 releases stop 120, clock spring 106 rotates ratchet wheel 103 clockwise (Fig. 32). During the first and second loading cycles, the "first column" pin 128 was still in its initial position, as the escapement mechanism moved from home position. As the first column pin traveled to the striking tip of setup lever 609 (Fig. 30), it rode up on lug 130 of lever 131. As it did so, it rocked lever 131 clockwise, causing similar action of yoke 133 to displace latch lug 135' from above shoulder 137 of escapement pawl 138. The latter thereupon arrested the escapement mechanism in first column position, in which the first column pin 128 is in front of setup lever 609.

In the illustrated example, Fig. 52, the first fifty card columns are for constant data, and accordingly after the second loading cycle, the first fifty pins 128 have been moved by lever 609 to positions to the left of and remote from the plane of lug 130 of lever 131 (Fig. 18). Accordingly, during the shifting cycles which follow the second loading cycle, when the escapement mechanism is released from home position, the first fifty pins 128 traverse a path to one side of and clear of lug 130 of lever 131. The latter therefore remains in counterclockwise position under the influence of spring 142, and yoke 133 remains in the position indicated in Fig. 32, so that latch lug 135' continues to hold pawl 138 free of escapement wheel 103, as when the parts were in home position.

The escapement mechanism therefore moves uninterruptedly under the influence of spring 106 to the first constant data column position (column 51 in the example). As the pin wheel 127 moved from the last constant data column position to the first individual data column position (column 50 to column 51 in the example), the first individual data column pin 128 (the fifty-first in the example) rode over lug 130 of lever 131. This latter pin has not been operated on by lever 609 and is in initial position. Therefore, as the escapement mechanism moves from the last constant data column position to the first individual data column position, the pin 128 corresponding to the latter position rides onto lug 130 and in doing so rocks lever 131 clockwise. Lever 131, in turn, rocks yoke 133 clockwise (Fig. 32) to cause its lug 133' to forcibly move latch lug 135' off shoulder 137 of pawl 138. Spring 141 thereupon moves nose 138' of pawl 138 into engagement with a tooth 103' of wheel 103, thereby arresting the escapement mechanism and the parts driven thereby (including the ball cylinder at loading station) in the first individual data column position.

Thus, wherever the pins 128 have been set up for constant data, lever 131, yoke 133, and latch 135 are effective to cause skipping of the escapement mechanism.

In above manner, at the beginning of the third and following loading cycles, column indicator 279 (Fig. 26) is already at the first individual data column and the ball cylinder at loading station has the row of pockets 75 corresponding to the first individual data card column at the loading line. Accordingly, during the third and following loading cycles, the operator need set up only the individual items, the latter being typed on invoice B while being set up on the cylinder at loading position.

Clearing operation

After the last of the list of individual items has been typed on the invoice and punched on cards T, both cylinders must be ready for a new constant, as well as individual item, set up. For this purpose, after a cylinder has effected its last punch controlling operation of a series, the cylinder must be cleared of all the balls loaded in its pockets. Before a new invoice is to be typed and cards punched according to the data on the new invoice, both cylinders 76 and 76' have their constant data rows of pockets, as well as their individual data rows of pockets, unloaded or cleared of balls 72. In addition, pins 128 of escapement pin wheel 127 and pins 161 of punch pin wheel 160 must be restored to initial positions.

The clearing of the cylinders may take place after the last punching cycle of the series related to one invoice and one transaction. To save time, however, the clearing operation is initiated after the last setup cycle and the next to last punching cycle.

During the last setup cycle, the cylinder at loading station is loaded for the last item of the series. Within the interval in which the last loading or set-up cycle is occurring the next to last punch cycle is taking place and a card is punched according to the next to last item of the series. During this latter cycle, a card following the one being punched is fed by pickers 231 to feed rollers 558 and 558' and, by the end of the punch cycle, moved to the advance position shown in Fig. 45. This card is to be punched during the last punching cycle according to the last item of the series. At the end of the next to last punch cycle, as at the end of each punch cycle, lever 540 is in the position shown in Fig. 15. A new card is not to be fed by the pickers 531 into the grip of feed rolls 558 and 558', and, accordingly, during the clearing operation means are operated to restrain operation of lever 540 to feed a card during the last punch cycle. Now, after the next to last punch cycle and following the last setup cycle, the operator depresses a reset or clearing key 615 (see line 5 of the timing diagram, Fig. 53).

Key 615 (see Figs. 1, 20, 21, and 54) is depressed against resistance of a spring 616 and when depressed is latched down by lock bar 45 in the same manner as repeat key 41 is latched by the lock bar. Depression of the clearing key causes a stud 618 projecting therefrom to cam spring blade 619 (Figs. 20 and 54) towards a blade 620 to close contacts 621 carried by the blades. Referring to the circuit diagram, Fig. 54, closing of contacts 621 forms the following circuit:

*Card picker restraining circuit H.*—From line 52, through contacts 621, line 622, magnet 623, and to line 55.

Figure 16:
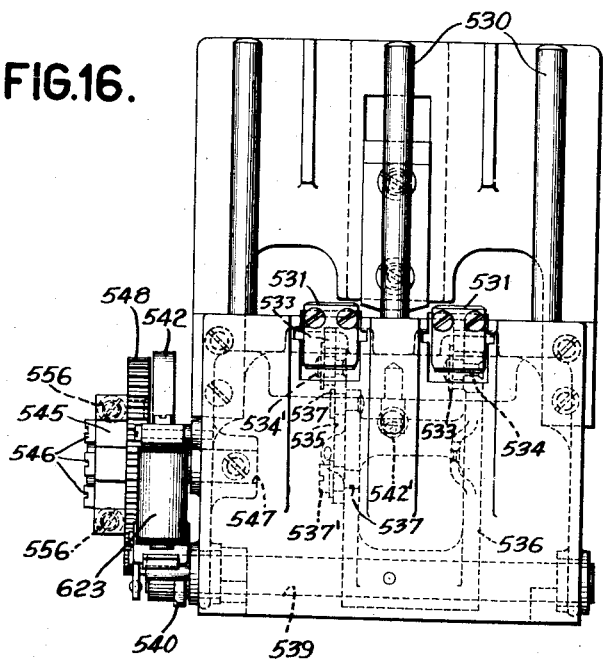
Fig. 16 is a rear view of the card magazine and card feeding means.

Referring to Figs. 15, 16, and 45, magnet 623 upon energization rocks its armature lever 624 counterclockwise against the pull of spring 625, thus placing the upper end of the lever in dotted line position (Fig. 15) to engage notch 626 of lever 540 which is initially at its counterclockwise limit, as previously explained.

Simultaneously with, or following, operation of key 615, the operator depresses start key 350 to initiate a shift cycle. The cylinder set up for the last item is thereby moved to the punching station to control punching of the last card while the cylinder which controlled punching during the next to last punch cycle is shifted to loading position. The shift cycle also initiates the last punch cycle, during which the card moved out of the hopper within the next to last punching cycle, as previously explained, is fed by rolls 558 and 558' and 561 and 561' through the punching means.

During the last punch cycle, the concentric portion of cam 542 rides off roller 541 of lever 540, but the lever cannot rock clockwise, under influence of spring 542' to move the picker knives to their rear position because latch lever 624 is now engaging notch 626 of lever 540. As a result, during the last punch cycle, lever 540 remains in its initial, home position, and pickers 531 do not feed a card out of supply magazine 530 (see the timing diagram, Fig. 53).

As indicated in the bottom view, Fig. 50, shift cycle shaft 366 has at its left end cams 628, 629, and 630 for respectively closing cam contacts C—1, C—2, and C—3, during each cycle. Line 6 of the timing diagram (Fig. 53) shows that contacts C—2 close between the 6½ and 7½ cycle points of the shift cycle. The closing of contacts C—2, provided clearing key contacts 621 are also closed, establishes the following circuit (see Fig. 54):

*Pin wheel clearing circuit I.*—From line 52, through contacts 621, contacts C—2, through magnets 631 and 632 in parallel, through normally closed relay contacts 633a and to line 55.

Magnet 631 is the pin clearing magnet for punch pin wheel 160. Referring to Figs. 23 and 35, armature lever 631' of magnet 631 is initially engaged at its upper end with the flange 634 of a bracket 635 rigidly fastened to a pivoted yoke 636; thus, initially lever 631' latches the bracket and yoke at their clockwise limit (Fig. 35). When magnet 631 is energized, it rocks lever 631' counterclockwise against the pull of spring 637 to unlatch bracket 635 and yoke 636, permitting a spring 638 to move the yoke counterclockwise about its pivot 639. As yoke 636 moves counterclockwise, it moves a push rod 640 to the right to close contacts 641, for a purpose to be explained later.

The head 636' of yoke 636 may be described as a U-shaped member with the legs 636a and b tapering towards each other. When pins 161 were set up for constant data, they were projected to the left (Fig. 23) towards the clearing yoke 636. When the clearing yoke is latched up in normal, clockwise position, as shown in Fig. 35, it is above the path of movement of the pins 161 set up for constant data. Thus, it will not operate on these pins during the rotation of the punch pin wheel during the punch cycles preceding the last one.

Leg 636b of yoke 636 has an inclined, camming edge 642, in advance of dumping shutter control lever 596 (see Fig. 35). After the next to last punch cycle, the clearing key was depressed and a shift cycle was initiated; as a result, circuit I was closed, and yoke 636 unlatched, moving to counterclockwise position, in which inclined edge 642 is in the path of rotation of pins 161. This took place when contacts C—2 closed, before the "8" point of the shift cycle. The last card punch cycle is initiated later at about the "9" point of the cycle, as indicated by line 13, of the timing diagram (Fig. 53). Inclined edge 642 of the yoke is therefore in the path of pins 161 before pin wheel 160 starts rotating during the last punch cycle. During rotation of the pin wheel (clockwise Fig. 35) those pins 161 which have been projected to the left (Fig. 23) or towards the clearing yoke 636 successively engage and ride along inclined edge 642, and they are cammed by the inclined edge toward the right (Fig. 23) and thereby returned to their initial position.

After being returned by yoke 636, the pins continue to rotate in a path intercepted by the upper end of lever 596. Consequently, as the restored pins successively reach lever 596, they rock the latter counterclockwise to cause contacts 601 to close and establish circuit G through dump control magnet 590 (Fig. 7). Energization of this magnet causes movement of shutter 571 to dumping position, as previously explained, so that during the last punching cycle, after the rows of pockets of the cylinder at punching station pass the punching line, they are unloaded through shutter 571.

At the end of the last card punch cycle, the cylinder at punch position, which has controlled punching of the last card, will be completely cleared. At the same time, punch pin wheel 160 will have had all its pins 161 restored to initial position. After the "80" column pin 161 has passed the clearing yoke, and before pin wheel 160 reaches home position, a stud 643 projecting laterally from the pin wheel rides under leg 636a of yoke 636, and as the wheel moves to home position cams against leg 636a to rock the yoke clockwise (Fig. 35), thus replacing flange 634 in latching position with respect to armature lever 631'. Magnet 631 was only momentarily energized by circuit I (contacts C—2 making for only one cycle point) and therefore armature lever 631' will be in position to latch yoke 636 when stud 643 returns the yoke to normal position.

Circuit I not only energized magnet 631, but also energized magnet 632. Magnet 632 controls restoring of pins 128 of escapement pin wheel 127.

As indicated in Figs. 18 and 41, the clearing means controlled by magnet 632 is similar to the clearing means controlled by magnet 631. In short, magnet 632 when energized releases armature lever 644 from bracket 645, permitting yoke 646 to move to a position in which its cam edge 647 is in the path of travel of pins 128. As yoke 646 moves to clearing position, a laterally extending lug 648 at its lower end (see Figs. 18 and 41) strikes lug 310 of yoke 303 (also see Figs. 30 and 31) and rocks the latter clockwise (Fig. 41) or counterclockwise (as viewed in Fig. 30). Yoke 303 was described before in connection with operation of release key 291 (see Figs. 1 and 24) to effect return of the escapement mechanism to home position during any point of the loading cycle.

Yoke 303 is rocked counterclockwise (Fig. 30) by lug 648 of pin clearing yoke 646 when cam contacts C—2 close before the "8" point of the shifting cycle (see line 6 of Fig. 53). After the "8" point of the same shifting cycle, escapement lock 122 is released from stop 120 of the escapement drive. Thus, yoke 303 rocks counterclockwise (Fig. 30) while the escapement mechanism is still at home position in which, as explained before, lever 131 is at its counterclockwise limit (Fig. 30) with its pin 309 engaging projection 308 of release yoke 303; consequently yoke 133 is in the position shown in Fig. 32, with latch lug 135' holding escapement pawl 138 released. While the parts are in this home position, clearing yoke 646 moves yoke 303 counterclockwise (Fig. 30), causing its lug 310 to move up into engagement with the bottom edge of yoke 133 (see also Fig. 13) thus maintaining yoke 133 in its escapement releasing position. In the same way as during the release operation, yoke 303 is latched in its actuated counterclockwise position (Figs. 30 and 30a) by the nose 315, of lever 315 and is not released until lug 317 of the pin wheel displaces lever 315 after the 80th column pin 128 has passed the lug 130 of lever 131. Yoke 303 has thus been set in counterclockwise position to correspondingly move yoke 133.

At the same time, projection 308 of yoke 303 acts on pin 309 of lever 131 to rock lug 130 out of the path of pins 128. Shortly after the clearing yoke 646 is moved to clearing position, the shift cycle means at about the ninth point of its cycle, releases stop 122 from stop 120 of ratchet wheel 103. Pawl 138 being held free of wheel 103, the escapement mechanism is moved uninterruptedly by spring 106 through a complete revolution, before being again arrested in home position by stop 122.

During this revolution of the escapement means, those pins 128 of pin wheel 127 which have been projected by the constant data set-up to the left of the wheel (Fig. 18) are cammed back to initial position by inclined edge 647 of clearing yoke 646. After the "eightieth column" pin 128 passes the clearing yoke, and before the end of the revolution of pin wheel 127, a pin 649 thereon (Fig. 41) restores the clearing yoke to latching coaction with armature lever 644.

To recapitulate, the first shift cycle after depression of clearing key 615 caused shifting of the cylinder set up for the last item to punch station and shifting of the cylinder, which controlled punching of the next to last card, to loading station; also initiated the last card punching cycle during which the last card was punched according to the last item set-up and the pins 161 of punch pin wheel 160 were reset in initial positions, and as a result caused the cylinder at punch station to be cleared of all the balls set up for constant data as well as for individual data. The shift cycle also caused release of the escapement mechanism from home position to be driven through a complete revolution by its spring 106, during which pins 128 of escapement pin wheel 127 were reset in initial position.

*Clearing shift cycle*

When the cylinder loaded for the last item was shifted to punch station, the other cylinder was shifted to its loading station. The latter cylinder still is loaded with a constant data set up and does not receive a new individual data set up while the last punch cycle is taking place.

Before the cylinder at loading position and which still has a constant data set up can be loaded for a new series of operations involving different constant data than before, the latter cylinder must be cleared. Further, the clearing key 615 must be restored to initial, upper position. Also, the punch pin wheel 160 must be clutched again to the escapement drive so as to be set up during the first of the new series of loading cycles. In order that these operations be performed, a shift cycle, which may be called a clearing shift cycle, must take place.

After the next to last card punch cycle, clearing key 615 was depressed and start key 350 operated to initiate a shift cycle. During the latter shift cycle, pin wheel clearing circuit I was formed, which energized magnet 631 to release clearing yoke 636 of the punch pin 160 (see Fig. 35). As described before, when yoke 636 was released, it closed contacts 641. This occurred when contacts C—2 closed between the 6½ and 7½ shift cycle points. The clearing yoke remains in released position, holding contacts 641 closed, for the rest of the shift cycle and until near the end of the following, last card punching cycle. Thus, while contacts 641 are closed, shortly before the "9" point of the shift cycle preceding the last punch cycle, cam contacts C—1 (see line 3 of Fig. 53) also close, forming the following circuit (Fig. 54):

*Circuit J.*—From line 52, through contacts C—1, relay 633, contacts 641, and to line 55.

This circuit energizes relay 633.

Cam contacts C—1 remain closed until slightly before the "8" point of the next shift cycle (the clearing shift cycle). Contacts 641, however, open at the end of the last punch cycle before the clearing shift cycle is initiated. Thus, in order to maintain relay 633 energized during the clearing shift cycle, relay 633 when energized closes contacts 633b (Fig. 54), which by-pass contacts 641. Hence, while the latter contacts open at the end of the last punch cycle, relay 633 will remain energized until cam contacts C—1 open near the "8" point of the following, clearing shift cycle.

Energization of relay 633 also opens contacts 633a of pin wheel clearing circuit I and closes contacts 633c. This is the condition at the end of the first shift cycle following depression of the clearing key and remains the condition until near the "8" point of the clearing shift cycle, when relay 633 is deenergized, as explained above.

After the last card punch cycle, the operator again depresses start key 350 to initiate the clearing shift cycle. Soon after the "5" point of this latter cycle, cam contacts C—3 (see line 9 of Fig. 53) close momentarily and since relay contacts 633c are also closed, the following circuit is formed (Fig. 54):

*Clearing key restoring circuit K.*—From line 52, through contacts C—3, magnet 650, contacts 633c, and to line 55.

A parallel circuit is simultaneously formed as follows:

*Punch pin wheel clutch circuit L.*—From line 52, through contacts C—3, punch pin wheel clutch magnet 424, contacts 633c, and to line 55.

Magnet 650, energized by circuit K, effects release of clearing key 615. As indicated in Figs. 20 and 54, lock bar 45 at its left, rigidly carries the armature 651 of magnet 650. When the magnet is energized, it rocks bar 45 against resistance of spring 50, releasing the lock bar from key 615, which thereupon is returned to its upper normal position by spring 616. The clearing key 615 is thus restored.

During the last card punching cycle (preceding the clearing shift cycle), magnet 623 (Fig. 15) was effective to cause its armature lever 624 to seat in notch 626 of lever 540, thereby restraining operation of pickers 531 for feeding a card from magazine 530 during the last punch cycle. In order to position a card for feeding through the punches during the first card punch cycle of the new series, pickers 531 must be released for operation. This is done when clearing key 615 is returned to upper position by circuit K. In the restored position of key 615, its contacts 621 are open, thereby breaking picker restraining circuit H. Magnet 623 in this circuit is thereby deenergized, its armature 624 is released from notch 626 of lever 540 by spring 625, and arm 540 for actuating pickers 531 is now free to follow cam 542.

The circuit L energized magnet 424. Referring to Figs. 5, 36, and 39, energization of magnet 424 releases its armature 423 from latching engagement with bell crank lever 420, permitting the pressure of spring blades 427 and 429 acting through pin 426 on tab 420e of lever 420 (see also Fig. 40) to rock the lever clockwise (Fig. 36).

When lever 420 rocks clockwise, its shaft 170, through crank arm 171, shifts clutch collar 168 to the left from the position shown in Figs. 23 and 36 to declutch it from punch cycle driven sleeve 422 and to engage it with escapement driven sleeve 164 as shown in Fig. 1. When spring blades 427 and 429 effected rocking of bell crank lever 420, they moved closer to their companion blades 427' and 429', thereby closing contacts 430 and 431.

Referring to the circuit diagram, Fig. 54, closing of contacts 431 again establishes circuit F to energize relay 53. Energization of the latter closes contacts 53a of constant data circuit A; opens contacts 53b of constant data circuit A'; closes contacts 53a' of back space circuit D and opens contacts 53b of back space circuit D'.

Thus, during the clearing shift cycle, the punch pin wheel 160 is again clutched to the escapement drive and circuits A and D are again ready to be formed, as during the first setup cycle described before. This condition holds through the first of the new series of loading and punching cycles in which a series of cards T relating to a new invoice and a new sales transaction are punched.

Clearing key restoring circuit K opens during the clearing shift cycle when cam contacts C—3 break at the "6" point of the latter cycle. For the same reason, punch pin wheel clutch circuit L opens at the same time. Bell crank 420, however, remains unlatched, under the pressure of spring blades 427 and 429, during the first loading cycle of the new series and until during the following shift cycle (the first of the new series), cam 415 on shaft 366 acting through parts 416, 417, and 418 (Fig. 5) positively restores the lever 420, in the manner previously described.

Circuit J, through relay 633, opens when cam contacts C—1 break between the 7½ and 8½ points of the clearing shift cycle.

Contacts 430 were also closed during the clearing shift cycle and remain closed while bell crank 420 is unlatched and in its clockwise position during the first loading cycle of the new series. Referring to Fig. 54, closing of contacts 430 forms the following circuit:

*Last cylinder clearing circuit M.*—From line 52, through contacts 430, line 654, and dumping shutter control magnet 590.

Magnet 590 (see Figs. 7, 8, and 9) upon energization, moves dump shutter 571 to ball discharging position, as previously explained. The purpose of this is to clear the constant data setup of the cylinder which was at loading position during the last card punch cycle of the old series.

Thus, at the end of the clearing shift cycle, the punch pin wheel is again in driving connection with the escapement mechanism; circuits A and D may again be made; the clearing key 615 has been restored; the card picker operating arm 540 has been released from the restraint of armature lever 625, and dump shutter 571 has been set in ball discharging position.

Preceding the clearing shift cycle was the last card punch cycle. During the latter punch cycle, the cylinder set up for the last item of the old series controlled punching and its pockets were completely cleared. At the same time, the other cylinder was at loading station still loaded with the constant data set up.

During the clearing shift cycle, cam 388 is operated by shift cycle shaft 366 to shift the cylinder which controlled last card punching to its loading station and to simultaneously shift the cylinder still loaded with constant data to the punching position. After this, cam 432 of shaft 366 initiates a punch cycle, which for convenience may be referred to as the cylinder clearing punch cycle.

Cylinder clearing punch cycle

During this cycle, the cylinder loaded with constant data of the old series is at punching station. During the last card punch cycle of the old series, pickers 531 were restrained from feeding a card to feed rolls 558 and 558' and accordingly, no card is fed through the punching means during the following, clearing, punch cycle. Therefore, the cylinder at punching station during the clearing punch cycle effects no card punching according to its still-retained constant data setup.

During the clearing shift cycle, dump shutter magnet 590 was energized by circuit M which remains operative through the clearing punch cycle. Thus, during the clearing punch cycle, shutter 571 (Fig. 7) is in discharging position and the cylinder at punch station which is now being driven by the punch cycle means thereby discharges the balls from the pockets corresponding to the old constant data setup. At the end of the clearing punch cycle the latter cylinder will be completely cleared and ready for new constant as well as individual data setups..

During the clearing shift cycle, pickers 531 were released for operation. Accordingly, during the clearing punch cycle, the pickers feed a card to rolls 558 and 558' which move the card to the position shown in Fig. 45, in readiness to be punched during the next punch cycle (the first of the new series).

While the clearing punch cycle is taking place, the operator may start typing a new invoice and setting up the cylinder, cleared during the last punch cycle of the old series and now at loading station, according to the new constant data and the first new individual item.

After the clearing punch cycle and the first new setup cycle, the operator depresses start key 350, to initiate the first, new series, shift cycle. During the latter cycle, cam 415 (Fig. 5) on shaft 366 operates, as previously explained, to cause lever 418 to rock bell crank 420 counterclockwise (Figs. 1 and 36) conditioning the parts of the punch pin wheel clutch for the first, new series punching cycle. As this is done, contacts 430 and 431 are opened. Opening of contacts 430 breaks circuit M, permitting dump shutter 571 to return to normal, closing position.

Ball feed and return

As explained before, balls 72 are set within pockets 75 of the ball cylinders during loading cycles, and serve during punch cycles as punch interposers or intermediate punch selecting elements.

The balls are supplied to the loading stations through inclined, gravity feeding ducts 73 (Figs. 6, 17, 43, and 44). When a loading operation is effected, plunger 68 lifts the ball located at the lower end of a duct 73 into a pocket 75 of a ball cylinder at the loading station.

Operation of back space lever 190 (Figs. 1 and 24) opens a back space shutter 187 (Figs. 6, 43, and 44) to permit a loaded pocket to discharge its ball into a backspace ball return trough 188. At the common punching station, after the horizontal rows of pockets 75 of the cylinder at punching station pass the punch line (slot 501), the balls in those pockets related to individual data are discharged through shutter 571 into ball return trough 580 (see Fig. 8).

Also, after operation of reset or clearing key 615, all the balls, including those representing constant data set-ups, are discharged from all the pockets of both cylinders, one cylinder at a time, through shutter 571 into trough 580.

Briefly then, balls 72 are supplied to cylinders 76 and 76' through ducts 73 at the two spaced loading stations and are discharged from the cylinders through troughs 188 and 580, as previously described in detail. What remains to be described is the rest of the ball circuit; i. e., the means for returning the balls discharged into troughs 188 and 580 to loading supply ducts 73.

Figs. 43 and 51 respectively show bottom and top views of the ball circuit. Back space dump trough 188 (see also Fig. 49), as described before, is formed with flanges 188' secured by screws 189 to the bottom of cylinder housing 70. Clearing dump trough 580 is similarly secured to the bottom of the cylinder housing. Both troughs 188 and 580 are U-shaped in cross-section (see Figs. 6, 8, and 17) and their bottoms are inclined downwardly towards the right hand end of the cylinder housing, as viewed from the front of the machine or from right to left, as viewed in Figs. 43 and 51. At their lower ends, troughs 188 and 580 open into the upper U-shaped section 660a of an end trough extending transversely or across the width of the cylinder housing at its right hand end (as viewed from the front of the machine).

Trough section 660a has a flange 661 fastened by screws 661' to the bottom of the cylinder housing. Trough section 660a, at its lower end, merges into a pipe section 660b (see particularly Fig. 17).

The bottom of the end trough consisting of sections 660a and b slopes downwardly from the front of the cylinder towards the rear (as viewed from the front of the machine and in Fig. 17). The lower mouth of pipe section 660b opens on a hole 662 formed in the vertical side of a casting 663 extending lengthwise along the rear of the cylinder housing (as viewed from the front of the machine). The casting 663 is fixed by screws 663' to the back of bracket 69 (see Figs. 17 and 43). The casting 663 is of generally U-shaped cross section, as indicated in Figs. 4, 6, and 11. Referring to the rear view, Fig. 10, and the bottom view, Fig. 43, casting 663 at the left end journals a driving pulley 664 for a ball feeding and conveying belt 665 (see also Fig. 17) and at the other end journals a guide sheave 666 (see also Fig. 12) for the belt. The belt 665 extends from pulley 664 along the top flange 667 of the casting, around guide wheel 666, along but clear above the lower flange 668 of the casting, over a tensioning roller 669, and around driving pulley 664.

Top flange 667, as indicated in Figs. 4, 6, 10, and 11, is inclined transversely and downwardly towards the cylinder housing, and belt 665 is held taut by roller 669 against the inclined surface so that the top strand of the belt is also inclined. Where flange 667 extends along the two spaced loading stations (one for cylinder 67, the other for cylinder 67'), the top strand of the belt and the portion of the flange 667 in front of it are flush with the flat bases of ball ducts 73 at their entrance ends (see Figs. 6, 11, and 44) so that if a ball duct 73 is not filled to the top (as when a ball has just been taken from its lower, exit, end and set in a pocket 75), then a ball or balls carried by the top of belt 665 will feed by gravity from the belt into the ball duct.

Where flange 667 passes the common punching station, the vertical side of casting 663 is extended upwardly to form a wall 667' (see Figs. 4, 10, and 51) to restrain the balls from dropping laterally off the belt.

Casting 663 has an end cap 670 (Figs. 10, 17, and 51) surrounding the left semi-circular periphery of pulley 664 (as viewed in Fig. 10) and formed with a double internal track 671 for guiding the balls in double file between the pulley and the cap. The right end of casting 663

(as viewed in Fig. 10) has another end cap 672 (see also Fig. 12) surrounding sheave 666 to guide the balls around the periphery of the sheave. Lower flange 668 of casting 663 is inclined longitudinally from guide sheave 666 to driving pulley 664, and when the balls pass around sheave 666, they feed by gravity down flange 668 back to pulley 664.

Fixed inside casting 663 below the portion of the belt passing around tensioning roller 669 is a plate 673 for preventing the balls from piling up below the portion of the belt which is diverted over roller 669. Pulley 664 rotates clockwise (Fig. 10) to move the top strand of belt 665 towards the right (as seen in Fig. 10). The balls 72 are, thus, continuously fed by pulley 664 and belt 665 towards the right along top flange 667 and around guide sheave 666, the balls then returning by gravity down lower flange 668. The balls which have been discharged into troughs 188 and 580 feed by gravity into the upper end trough section 660a which conducts them into the lower pipe section 660b of the end trough, from which they exit into hole 662 of casting 663, and into the interior of casting 663. The portion of lower flange 668 which underlies plate 673 is steeper than the rest of flange 668, so that the balls moving from the less inclined section of flange 668 accelerate their speed as they drop down the steeper portion.

As a result, the balls separate somewhat along the steeper portion, permitting the balls returning from trough section 660b through hole 662 to force their way between the balls along the steep portion of flange 668 and to thereby enter the lower run of balls.

To the front of casting 663 is fastened a right angular cover 674 for covering the front and top of the casting.

Shaft 675 of pulley 664 is journaled at the right end (Fig. 17) in casting 663 and at the left end in a bracket 676 carried by the right side of cylinder housing 70 (as viewed from the front of the machine). Inside casting 676, shaft 675 carries a bevel gear 677 meshed with bevel gear 678 on a stub shaft 679 also journaled in bracket 676 (see also Figs. 10, 43, and 51).

Stub 679 also carries spur gear 680 which meshes with gear 682 journaled on frame standard 683 (see also Figs. 2 and 14). Gear 682 meshes with gear 684, the shaft of which is also journaled on standard 683 and carries gear 685 driven by gear 686 on main shaft 374. Through this train of gearing, constantly running main shaft 374 drives ball elevating pulley 664, so that throughout operation of the machine, while motor M is running, belt 665 is moving balls 72 across ducts 73 to maintain the latter constantly supplied with balls.

*Card feed indicators*

Means are provided to indicate absence of cards in the supply magazine or interruption in the feed of the cards due to jamming of the cards in their feeding course.

Reference to Figs. 1, 4, and 40 shows that gear 422' on sleeve 422 (see also Fig. 23) in the punch pin wheel section, and which is driven by punch position gear 403', meshes with a gear 687 on a shaft 688 journaled by standards 163 and 163'. Shaft 688 makes one revolution each punch cycle and carries cams 689, 690 and 691 (Figs. 1 and 40) to respectively control cam contacts CF—1, CF—2, and CF—3.

As indicated in Figs. 4 and 45, a card lever 692 is positioned along the path of travel of a card T. Engagement of a card with lever 692 moves the latter to position to close contacts 693 and open contacts 694 (see Fig. 4). At the beginning of a cycle, there is a previously fed card in the advance position indicated in Fig. 45 ready to enter the punching section. This advance card is fed during the instant punch cycle through the punching means by rolls 558 and 558'. During this punch cycle, the lagging edge of this card leaves feed rolls 558 and 558', and its feed through the punching section is continued by ejecting rolls 561 and 561'. About half a cycle point after the advance card leaves feed rolls 558 and 558', pickers 531 feed a following card into the bite of the latter feed rolls. The latter continue to feed the following card until the end of the instant punch cycle to take the advance position, indicated in Fig. 45, at the end of the latter cycle. Thus, during a punch cycle, the following card lags behind and is spaced from the leading card by a distance which a card covers in about half a cycle point. Accordingly, as indicated by line 16 of Fig. 53, the leading card leaves card lever 692 at about the "6½" cycle point and the following card does not engage the card lever until about the "7" cycle point. Thus, between the "6½" and "7" cycle points, the card lever contacts 693 open and card lever contacts 694 close. During this interval, cam contacts CF—2 close (see line 18 of Fig. 53).

Contacts 693 open to sense whether the cards are feeding improperly or have jammed. If the cards are feeding properly, nothing will happen when contacts 693 open. If the cards do not feed properly or jam, then the card lever 692 will not be released by a card at the "6½" cycle point and contacts 693 will not open at the time cam contacts CF—2 close. As a result, the following circuit will form (see Fig. 54):

*Card jam circuit N.*—From line 52, through card lever contacts 693, cam contacts CF—2, relay 695, bell signal 696, and to line 55.

Relay 695 closes contacts 695a to hold the circuit through the relay and the bell signal after contacts CF—2 open. As a result, the bell will continue to ring until the main switch S of the circuit is opened, thereby deenergizing relay 695. Driving motor M also stops and the operator removes the jammed card. If instead of jamming, a card feeds improperly, thereby causing circuit N to form, the signal 696 will ring; the operator observing the card feeding out of the ejecting rolls 561 and 561' will not open switch S, but will finish the loading cycle of the cylinder at loading station and then initiate a new punch cycle. Relay 695 will then be deenergized when cam contacts CF—3 open near the beginning of the new cycle (see line 19, Fig. 53).

Card lever contacts 694 sense the proper feeding of a rear or following card during a punch cycle. If the rear card does not feed properly or the cards are exhausted from the supply magazine 530, then there will be no rear card acting to depress card lever 692 after the "7" cycle point and contacts 694 will remain closed.

Cam contacts CF—1 close shortly after the "7" cycle point, after the gap between the cards is sensed by card lever 692, and remain closed until the end of the cycle and the beginning of the next punch cycle, as indicated by line 17 of Fig. 53. If the cards feed properly, then when cam contacts CF—1 are closed, card lever contacts 694 are open and nothing will happen.

If, because of a failure in the card supply, a rear card is not fed out of the hopper, then it will not operate lever 692 at the "7" cycle point, and card lever contacts 694 which close between the "6½" and "7" cycle points will remain closed when contacts CF—1 close. As a result, the following circuit will be established:

*Card failure circuit O.*—From line 52, through contacts 694, contacts CF—1, signal light 698, normally closed contacts 633a, and to line 55.

Thus, failure of the card supply will be indicated by the lighting of signal lamp 698.

The above circuit goes through relay contacts 633a because it is not desired to light the card failure signal during the last punch cycle, which follows operation of reset key 615. As previously explained, during this last punch cycle, the feeding of a new card is purposely prevented by energization of magnet 623. During this last punch cycle, relay 633 is energized by circuit J to open contacts 633a, thus preventing completion of the card failure indicating signal circuit during the last punch cycle.

Cylinder housing support

The cylinder housing 70, at its rear has spaced ears 700 (see Figs. 1, 2, 4, 6, 17, and 44), one ear at each end, through which a shaft 701 passes. The cylinder housing is thus hung at the rear from shaft 701. At its forward lower end, the cylinder is supported through bracket 507 carried thereby and the feet of which rest on a shaft 702. Where the bracket feet rest on shaft 702, the shaft is cut away to form chordal flat portions 702'. In the operating position of the cylinder housing, shaft 702 is in the rotational position shown in Fig. 4, with its chordal portions in front, so that cylinder housing 70 may not rock clockwise about upper supporting shaft 701.

It may be desired to inspect the concealed parts of the cylinder housing or to remove or change a part, or it may be desired to remove a card jammed between feed rolls 558, 558' and 561, 561'. For this purpose means are provided to swing the cylinder housing with all the parts attached to and carried thereby, including the punch assembly, about the axis of its rear hinge support, shaft 701. The cylinder housing can be swung to a clockwise position, exposing the bottom of the cylinder housing and the parts carried thereby. To permit the cylinder housing to be swung clockwise to inspection or exposed position, the foot support shaft 702 must be turned 90°, to move its chordal flat portions 702' from the locking position shown in Fig. 4 to the unlocking position shown in Fig. 17. Before this is done, however, it is required to shift the cylinders 76 and 76' to a mid position, in which the bar 394 carrying common switch bar 60 is centrally between contact terminals 59 and 59', to thereby prevent making of a loading circuit while the cylinder housing is in exposed position.

Shifting of the cylinder and of contact bar 60 may be effected only by a rotation of shift cycle shaft 366, since it is cam 388 (Figs. 1 and 50) operated by shaft 366 which acts through parts 390, 391, 392, 393, 396, 397, 398', 399, 400, 401, and 402 (Fig. 1) to simultaneously and dependently shift the cylinders 76 and 76' and contact bar 60. During the normal full revolution of shaft 366, initiated by operation of start key 350, shaft 366 effects half a turn of cam 388 to shift the cylinders from one station to another. The amount of shift is such that roller 407 (Fig. 1) moves from one end of lock bar 405 to the other end. To shift the cylinders to a mid position, in which roller 407 will seat in a notch 703 of bar 405, cam 388 must be given a quarter turn and shaft 366 a half turn.

Means are provided to prevent rotation of cylinder housing lock shaft 702 to unlocking position unless shaft 366 has first been moved to its 180° position. Referring to Figs. 4 and 50, shaft 366 rigidly carries a disk 704 formed with a slot 705. Cylinder housing support shaft 702 carries a crank arm 706 pivoted to which is a depending member 707, forked to embrace shaft 366 to be guided by the latter. The free end of one of the tines of member 707 is bent to provide a lug 708. When shaft 366 is in home position, the slot 706 of disk 705 is completely to one side of lug 708. If it is then attempted to rotate shaft 702 to unlocking position (clockwise, Fig. 4), crank arm 706 will elevate member 707 a slight distance until lug 708 engages the circular periphery of disk 704. This engagement of lug 708 with disk 704 prevents rotation of shaft 702 to unlocking position. In order to permit unlocking movement of shaft 702, it is necessary to move shaft 366 and its disk 704 180° away from home position.

Before this is done, the operator opens main switch S to stop the driving motor M. The main casing is then removed. At the right hand end, as viewed from the front of the machine, or at the left hand end, as seen in the bottom view, Fig. 50, main drive shaft 374 is provided with a pin 710. The operator now slips a crank handle 711 on shaft 374 and through pin 710 connects the handle to the shaft for rotation. Start key 350 is then depressed to release clutch dog 380 (Fig. 5) from detent 363, causing the clutch dog 380 to couple shaft 366 to gear 370 driven by main shaft 374. The operator now manually rotates shaft 374 by means of crank handle 711 until roller 407 (Fig. 1) is observed to seat in notch 703 of bar 405. The cylinders 76 and 76' and switch bar 60 are then in mid position, and slot 705 of disk 704 on shaft 366 is also in 180° position and in position to receive lug 708.

When the cylinders are shifted to mid position, hinge pin 401 of yoke 400 of the cylinder shifting linkage (Figs. 1 and 6) takes a position concentric about the axis of rotation of cylinder housing hinge shaft 701 (see Fig. 6). Now, if the cylinder housing is swung to exposed position, clockwise (Fig. 6) about the axis of shaft 701, the arm 402 and member 400 of the cylinder shifting linkage will be rocked by their connection with the cylinders about pin 401. Thus, when the cylinders are in mid position, arm 402 and member 400 rock about the same axis as the cylinder housing assembly, so as not to interfere with movement of the cylinder housing to exposed position.

The operator, after manually rotating shaft 374 to bring shaft 366 to mid position, removes crank handle 711 from shaft 374 and similarly couples it to the end of shaft 702 (see Fig. 50). Shaft 702 is then manually rotated clockwise (Fig. 4). During clockwise movement of shaft 702, member 707 moves upwardly and lug 708 moves into slot 705 until it strikes the inner, closed, end of the slot. This limits rotation of shaft 702 to 90° and brings the chordal portions 702' to unlocking position (Fig. 17).

The cylinder housing may now be swung to exposed position As long as lock shaft 702 remains in unlocking position, shift cycle shaft 366 is locked in 180° position by coaction of lug 708 with slot 705 of disk 704, if, before the cylinder housing is returned to operative position, shaft 702 is moved to locking position and shaft 366 then moved to home position, it will be impossible to then return the cylinder housing to normal position on account of hinge pin 401 having been moved out of concentricity with the axis of cylinder housing hinge shaft 701. Arm 400 and link 402 of the cylinder shifting linkage would not be able to rock with the cylinder housing and would prevent movement of the cylinder housing to normal position. It is thus evident that the cylinder housing cannot be returned from exposed to normal position unless shaft 366 is then in 180° position.

To return the parts to normal, shaft 702 is first restored in a counterclockwise direction from the position shown in Fig. 17 to that indicated in Fig. 4. Lug 708 is thereby brought clear of slot 705 of disk 704. The cylinder housing is then moved down to normal position. Handle 711 is again coupled to shaft 374 and the latter manually rotated to complete the manual single revolution cycle of shaft 366. The parts are then in position for new loading and punching cycles.

In order to avoid an abrupt drop of the cylinder housing when it is swung back in place, shaft 701 is fixed to ears 700 and rigidly carries a crank arm 713 (Figs. 1 and 2) connected by link 714 and bell crank 715 to a heavy coil spring 716. When the cylinder housing is returned from inspection position to operative position, shaft 701 rocks counterclockwise (Fig. 2) and through crank arm 713, link 714, and bell crank 715, the spring 706 is stretched, thereby resisting dropping of the cylinder housing. When the operator is lifting the cylinder housing to inspection position, the spring 706 relaxes to assist the effort of the operator. When the carriage is shifted to mid position, a pair of bars 717, fixed to opposite ends of the carriage (see Figs. 2, 6, 14, 17, 43, and 44) each move half way into the cylinder.

One bar 717 then closes the lower ball exit ends of six of the ball ducts 73 at the adjacent loading section and the other bar 717 covers the exit ends of the six ball ducts of the other loading station. As carriage 90 is now in mid position, each of cylinders 76 and 76' is half-way into the punching station and half-way into the loading station. Further, the cylinders at this time will be in home positions, where their "1st column" rows of twelve pockets 75 are remote from and to the right (Figs. 6 and 17) of the loading line, which is at the ball exit ends of ball ducts 73. Accordingly, an unbroken peripheral portion of the cylinders, lying between the first and eightieth column pockets 75 is now directly above the exit ends of the ball ducts.

As the carriage is in mid position, each ball cylinder will be half-way within its loading station and being in home position its unbroken peripheral portion will cover the exit ends of those six ball ducts 73 of each loading station which are adjacent the common punching station. Bars 717 are covering the exit ends of the remaining ball ducts. Thus, the twelve ducts 73 of each loading station will be closed at their exit ends when carriage 90 is in midway position. Accordingly, when the cylinder housing is lifted to inspection position, the balls within ducts 73 will be prevented from falling out of the exit ends of the ducts.

*Summary*

The operation of the machine is believed clear from above detailed description. Briefly, to carry out the operations of typing an invoice and punching cards according to the data typed, the operator takes the following steps:

In order to be certain that both ball cylinders 76 and 76' as well as the punch and escapement pin wheels 160 and 127, have been cleared, the operator first depresses clearing key 615 and start key 350 (Fig. 1). Referring to the timing and operation diagram, Fig. 53, the machine, thereupon, goes through a shift cycle such as indicated after the next to last punching cycle. During this shift cycle, one ball cylinder is shifted to punching station. As a result of closing of clearing key contacts 621, circuit H is formed to energize magnet 623 (Fig. 15) for restraining action of card pickers 531.

During the shift cycle, cam contacts C—2 close and with clearing key contacts 621 also closed, circuit I energizing magnet 631, for clearing the punch pin wheel 160 is formed. Magnet 631 causes clearing yoke 636 (Figs. 23 and 35) to move to pin intercepting position. Circuit I also energizes magnet 632 for moving yoke 646 (Figs. 18 and 41) into position for intercepting pins 128 of escapement pin wheel 127.

When clearing yoke 636 of the punch pin wheel moved to clearing position, it closed contacts 641. As a result, circuit J through relay 633 was formed and the relay opened contacts 633a and closed contacts 633b, and this condition is maintained until holding contacts C—2 open during the next shift cycle.

The shift cycle which accompanied operation of clearing key 615 thus caused shifting of a ball cylinder to punching station, energization of relay 633, energization of picker restraining magnet 623, and the setting of clearing yokes 636 and 646 into pin intercepting positions with respect to the punch and escapement pin wheels. In addition, the shift cycle, as usual, released stop 122 from stop 120 of the escapement means to permit the escapement mechanism to advance from home position, and also initiated a punch cycle. During this punch cycle, the actions designated under the heading "last card punch cycle", Fig. 53, take place.

The punch pin wheel is rotated by the punch cycle drive shaft 442 and during this rotation, pin 161 of the punch pin wheel are returned to initial positions. After passing the clearing yoke, the pins 161 reach lever 596 (Fig. 34), causing continual closure of contacts 601 to form circuit G through clearing shutter magnet 590. Consequently, during the aforesaid punch cycle, the balls from the cylinder at the punch station are discharged into trough 580 (Figs. 7, 8, 9).

When the clearing yoke 646 of the escapement pin wheel moved to clearing position, a tab 648 thereon acted on a tab 310 of release yoke 303 to rock the latter counterclockwise (Fig. 30) which, in turn, held escapement control yoke 133 in counterclockwise position, withdrawn from latch 135. Accordingly, when the escapement mechanism is released from home position, spring 136 continues to maintain latch lug 135' above ledge 137 of escapement pawl 138. Escapement wheel 103 is, therefore, free to continue rotation under the drive force of spring 106 until it again reaches home position. During this cycle of the escapement means, pin wheel 127 rotates continuously past clearing yoke 646 which returns pins 128 to initial positions.

At the end of the punch cycle corresponding to the last card punch cycle, one ball cylinder has been cleared and the punch and escapement pin wheels have been cleared.

The operator then again depresses operating key 350 to initiate the clearing shift cycle (Fig. 53). During the latter cycle, the ball cylinder previously at the loading station is shifted to the punch station. At the "6" point of the clearing shift cycle, cam contacts C—3 close to establish circuit K for energizing magnet 650 to restore the clearing key 615. As a result, magnet 623 is deenergized to release the card picker action.

Simultaneously with formation of circuit K, a parallel circuit L was formed to energize magnet 424 which results in unlatching bell crank 420 for clockwise rocking (Fig. 23) to clutch the punch pin wheel to the escapement drive.

Further, the rocking of bell crank 420 is accompanied by closing of contacts 430 and 431. As a consequence of closing of contacts 430, release shutter magnet 590 is energized by circuit M so that during the punch cycle initiated by the clearing shift cycle, the cylinder now shifted to the punch station will be cleared.

As a result of closing of contacts 431, relay 53 is energized by circuit F to close contacts 53a and 53a'.

The clearing shift cycle initiated a cylinder clearing cycle (Fig. 53) and as this cycle is begun, the operator begins to type the invoice and set up the cylinder at loading station for the first card of the new series.

Before beginning the first loading cycle, the operator types in the date and any other matter which it is not desired to set up for punching. Then, the operator depresses repeat key 41 (Fig. 1). Now, the operator successively depresses keys 10 to type in data in the order indicated by the column indicating means (Fig. 26). Constant data circuits A are formed to set up pins 161 of escapement pin wheel 160, circuits B are formed to energize the loading magnets 58 or 58', and circuits C are formed to energize escape magnet 63.

When the operator comes to column 51—in the assumed example, Fig. 52—he depresses key 47 (Fig. 1) to release repeat key 41. Contacts 56' are closed by the escapement means, and thereafter operation of keys 10 forms variable data loading circuits B' through the loading magnets and escapement circuit C'.

When all the data, constant and variable, of the first item of the invoice has been typed and set up, then the operator depresses operating or start key 350 to initiate the first shift cycle (Fig. 53). During the latter shift cycle, punch pin wheel 160 is clutched to the punch cycle drive and contacts 430 and 431 are opened. Opening of contacts 431 deenergizes magnet 53 to cause contacts 53b to close and, thereby, connect escapement pin wheel set up magnet 607 into the constant data circuit A'.

The operator then again depresses the repeat key 41 and, holding non-print key 21 down, repeats operation of keys 10 to close circuits A' for setting up the escapement pin wheel 127 and to close circuits B for loading the second ball cylinder now at its loading station. Thereafter, the operations are the same as during the first loading cycle. During the third and following loading cycles, the operator types in and sets up only the variable items.

During the cylinder clearing cycle, a card T was moved by pickers 531 and feed rolls 558 and 558' to the advance position indicated in Fig. 45. Within the interval of the second loading cycle, the first card punch cycle takes place and feed rolls 558, 558', 561 and 561' move this advance card through the punching section to be punched by punches 500 under control of the balls 72 set in the pockets 75 of the ball cylinder loaded during the first loading cycle and now shifted to the punch station. Thereafter, the cards are successively punched under control of the successively set up cylinders 76 and 76'.

While the invention has been explained in connection with the preferred form shown in the drawings, it is understood that the invention is not limited to the form or to the details of construction shown but may be embodied in other forms and varied by mechanical skill without departing from the spirit or field of the invention. We, therefore, wish to be limited only by the following claims.

We claim:

1. In combination, apparatus for punching combinational hole perforations representing data into a record card, means to select the perforations to be punched including selecting circuits, switches in said circuits, a power drive for closing the switches, item keys, and means operable by depression of a single key to cause said power drive to close a plurality of switches and thereby to close the associated circuits for selecting a combination of perforations to be punched to represent the item corresponding to the depressed key.

2. A combination typewriter and punch comprising typing means, punching means, control devices for the punching means, a power drive, character keys, instrumentalities operated by depression of a character key for causing the power drive to concomitantly operate the typing means and the control devices for operation according to the character corresponding to the operated key, and means selectively operable to prevent operation of the typing means by the power drive when the latter operates the control devices.

3. A combination printer and punch in which the printer includes printing means and print spacing means comprising punching means to punch representations of characters, character keys, means controlled by operation of the keys for selecting the punching means for operation according to the characters corresponding to the operated keys and including selecting circuits, means operated by a key for partially closing and thereby selecting a circuit for operation, a single switch common to all said circuits for completing the partially closed circuit, and means operated by the aforesaid spacing means for closing said switch during the printing in predetermined fields of the form and for leaving said switch open during the printing in other fields of the form to thereby render the selected circuits effective during the printing in said predetermined fields and ineffective during the printing in said other fields.

4. A combination printer and punch in which the printer includes print spacing means, comprising punching means, means to select the punching means step by step for operation, a pair of control devices, each separately operable to render the punch selection by said selecting means effective, one of said control devices being operated by the aforesaid spacing means, and means for disabling the latter control device until the punch selection has proceeded to a certain step.

5. A combination printer and punch in which the printer includes print spacing means, comprising punches, means to select the punches step by step for operation, a control device operated by the aforesaid spacing means for rendering the punch selection by said selecting means selectively effective, and means to disable said control device until the punch selection has proceeded to a certain step.

6. A combination printer and punch in which the printer includes spacing mechanism, comprising punches for punching different columns of a record sheet, means to select the punches for punching the sheet columns, the selection of the punches for the sheet columns being effected in succession, for one column after another, a control device operated by the aforesaid spacing mechanism, and means for disabling said control device until the punch selection has proceeded to a certain column.

7. A combination printer and punch in which the printer includes spacing mechanism, comprising punches for punching the columns of a record sheet, means to select the punches for operation, the punch selection being effected successively for one column after another, a pair of control devices, each separately operable to render the punch selection by the selecting means effective, one of said devices being operated by the aforesaid spacing mechanism, and means for disabling the latter control device until after the punch selection has proceeded to a certain column and for then rendering the latter control device effective and disabling the other control device.

8. A combination printer and punch in which the printer includes spacing mechanism, comprising punches for punching different columns of a record sheet, means to select the punches for punching the sheet columns, apparatus for causing the punch selection for the columns to be effected in succession, for one column after another, a control device operated by the aforesaid spacing mechanism for rendering the selection effective, and means controlled by the aforesaid apparatus for disabling the control device until the punch selection has proceeded to a certain column.

9. A machine for perforating columns of a record sheet, comprising punches, means to select the punches for operation, apparatus for causing the punch selection for the columns to be effected in succession, one column after another, a pair of control devices individually operable to render the punch selection effective, and means controlled by the aforesaid apparatus to select one or the other of said devices for rendering the punch selection for a series of columns effective.

10. A combination typewriter and punch in which the typewriter includes typing means and spacing mechanism, comprising punches for punching columns of a record sheet, character keys, means controlled by operation of the keys to select the punches for operation and to concomitantly select the typing means for typing operation, apparatus to cause the selection of the punches to be effected in succession for the sheet columns, for one column after another, a control device operated by the aforesaid spacing mechanism for rendering the punch selection selectively effective and ineffective upon operation of the keys in accordance with the progress of the typing operation, and means controlled by the aforesaid apparatus for disabling said control device during the selection of punches for certain record sheet columns.

11. A machine for punching columns of a record sheet, comprising punches, means to select the individual punches for punching each column of the sheet, escapement mechanism to cause the selecting means to effect selection of the punches for the sheet columns in succession, for one column after another, a control device manually operated for rendering the selecting means effective, and means operated by the escapement mechanism for controlling the effectiveness of said control device.

12. A machine for punching columns of a record sheet, comprising punches, means to select the punches for operation and including settable mechanism and elements to control the setting of said mechanism for selecting the individual punches for punching each column of the record sheet, escapement apparatus operable under control of said elements for feeding the settable mechanism step by step to condition the mechanism to be set by said elements for punch selection of the columns in succession, for one column after another, a control device for rendering the elements effective to set the mechanism and control operation of the escapement, and means operated by the escapement apparatus to govern the effectiveness of said control device.

13. A combination printer and punch in which the printer includes spacing means, comprising punches for punching columns of a record sheet, means to select the punches for operation and including settable mechanism and elements to set said mechanism to select the punches for perforating each column of the record sheet, escapement apparatus for feeding the settable mechanism step by step to be set by said elements for punch selection of the columns in succession, for one column after another, a control device operated by the aforesaid spacing means to render the elements ineffective to set said mechanism during the printing in certain fields of a form, and means controlled by said apparatus for rendering said device ineffective while the settable mechanism is being set by said elements for certain column selections of the punches.

14. A combination typewriter and punch in which the typewriter includes spacing means to space the typing along a line of a form sheet, comprising punches to punch columns of a record form, means to select the punches for operation and including settable mechanism and elements to set said mechanism to select the punches for perforating each column of the record form, escapement apparatus to feed the settable mechanism step by step to be set by said elements for punch selection of the columns in succession, column after column, a control device operated by said spacing means for rendering said elements ineffective to set the settable mechanism during the typing in of certain fields of the form sheet, and means operated by the escapement apparatus for selectively rendering said control device ineffective.

15. A combination typewriter and punch in which the typewriter includes a character spacing carriage, comprising punches to punch columns of a record form, means to select the punches for operation and including a settable mechanism and elements to set the mechanism for selecting the punches for perforating the columns of the record form, apparatus to feed the settable mechanism step by step to be set by said elements for punch selection of the columns in succession, one column after another, a device operated by the aforesaid carriage for rendering said elements ineffective to set said mechanism during certain portions of the travel of said carriage, and means operated by said apparatus for selectively rendering said device ineffective.

16. In a machine of the class described, punches to punch data representations into columns of record forms, a settable mechanism to control the punches to punch desired data, data selecting elements, each capable of selecting datum for any of the columns of the record form, means controlled by said elements for setting said mechanism according to the selected data, instrumentalities for effecting repeat punching by the punches of the same data under control of a single setting of said mechanism by said elements, and automatic means for clearing the mechanism of its setup after repeat punchings have been effected.

17. In a machine of the class described, punches to punch data representations into fields of record forms, a settable mechanism to control the punches to punch desired data, data selecting keys, each capable of selecting datum for any of the fields, means controlled by the keys to set up said mechanism according to the selected data, instrumentalities for effecting repeat punching by the punches of the same data under control of a single setting of said mechanism by said keys, automatic means for clearing the mechanism of its setup after repeat operations, and a manually operated device to initiate operation of the clearing means.

18. In a machine of the class described, punching mechanism to punch items into record forms, devices for controlling the punching mechanism to punch desired items, item selecting elements for selecting the items to be punched by said punching mechanism under control of said devices, apparatus for controlling the punching mechanism to effect repeat punching of items under control of said devices, and means cooperable with the item selecting elements to determine the control operation of said apparatus according to which of the selected items is to be repeat punched.

19. In a machine of the class described, punching mechanism to punch items into record forms, devices for controlling the punching mechanism to punch desired items, item selecting keys operable to select the items to be punched under control of said devices, and apparatus for causing the punching mechanism to repeat the punching of items under control of said devices and including a repeat key operable in conjunction with said item keys for determining which items selected by the item keys are to be repeat punched.

20. In a machine of the class described, punching mechanism to punch items into record forms, devices for controlling the punching mechanism to punch desired items, item selecting elements to select the items to be punched under control of said devices, traveling apparatus for causing the punching mechanism to effect repeat punching of items under control of said devices, and means selectively setting said apparatus during a course of travel of said apparatus in accordance with the items to be repeat punched under control of said devices into a plurality of record forms.

21. In a machine of the class described, punching mechanism to punch items into record forms, devices for controlling the punching mechanism to punch desired items, item selecting elements to select the items to be punched under control of said devices, apparatus for causing the punching mechanism to repeat the punching of items under control of said devices and including an instrumentality operable in conjunction with the elements for determining which of the items selected by the elements are to be repeat punched, and means for rendering said instrumentality ineffective during the selection of items to be punched into certain portions of the record forms.

22. In a machine of the class described, punching mechanism to punch items into record forms, devices for controlling the punching mechanism to punch desired items, item selecting elements to select the items to be punched under control of said devices, apparatus for causing the punching mechanism to repeat the punching of items under control of said devices and including a control instrumentality operated conjointly with the elements to determine that the items corresponding to the latter elements be repeat punched under control of said devices, and another control instrumentality operating, alternatively to the other instrumentality in conjunction with said elements for determining that the items selected by the latter elements be singly punched.

23. In a machine of the class described, punching mechanism to punch items into record forms, devices for controlling the punching mechanism to punch desired items, item selecting elements to select the items to be punched under control of said devices, apparatus for causing the punching mechanism to repeat the punching of items under control of said devices and including a control instrumentality operated conjointly with the elements to determine that the items corresponding to the latter elements be repeat punched under control of said devices, another control instrumentality operating, alternatively to the other instrumentality, in conjunction with said elements for determining that the items selected by the latter elements be singly punched, and means for automatically selecting one of said instrumentalities or the other for effective operation.

24. In a machine of the class described, punching mechanism to punch items into columns of record forms, devices for controlling the punching mechanism to punch desired items, item selecting elements to select the items to be punched under control of said devices, apparatus to cause the punching mechanism to repeat the punching of items under control of said devices and including an instrumentality operable in conjunction with the elements to determine which of the items selected by the elements are to be repeat punched, and means for automatically rendering said instrumentality ineffective during the selection of items for punching into certain columns of the record forms.

25. In a machine of the class described, punches to punch items into columns of a record card, means to select the punches to punch desired items, mechanism for causing the selected punches to punch a record card, instrumentalities for maintaining a single selection of punches for certain columns in effect during the punching of a plurality of record cards, and means for automatically selecting the columns for which the punch selection is to be maintained during punching of a plurality of cards and the columns for which the punch selection must be made anew for each card punched.

26. In a machine of the class described, punches to punch items into columns of a record card, means to select the punches for punching desired items in the card column, mechanism for effecting punching of a card by the selected punches, instrumentalities for maintaining a single selection of the punches for certain columns in effect during the punching of a plurality of cards and including a device operated in conjunction with the selecting means to condition a punch selection for repetition, and means for rendering said device effective during selection of punches for certain card columns and ineffective during selection of punches for other columns.

27. In a machine of the class described, punches to punch item designations into columns of a record card, means to select the punches to punch designations of desired items, apparatus for causing the punch selections to be effected in succession for the different columns of a card, for one column after another, mechanism for effecting punching of a card by the selected punches, instrumentalities cooperating with the selecting means to maintain a single selection of punches for certain columns in effect for the punching of a plurality of cards, and means operated by said apparatus for selecting the columns for which the punch selection is to be maintained.

28. In a machine of the class described, punches to punch items into columns of a record card, item keys, means controlled by operation of the keys for selecting the punches to punch the items represented by the keys, apparatus for causing said means to effect punch selections for the different columns in succession, for one column after another, mechanism for effecting punching of a card by the selected punches, instrumentalities for maintaining a single selection of punches for card columns in effect for the punching of a plurality of cards, and means operated by said apparatus for selecting the columns for which the punch selection is to be maintained.

29. In a machine of the class described, punches to punch items into columns of a record card, means to select the punches to punch desired items, apparatus for causing the punch selection to be effected for the different columns in succession, for one column after another, mechanism for effecting punching of a card by the selected punches, instrumentalities cooperating with the selecting means to maintain a single selection of punches for card columns in effect for the punching of a plurality of cards and including a device operable in conjunction with the selecting means to determine that the selection effected by said selecting means be maintained, and means controlled by the aforesaid apparatus for rendering the device selectively effective during the punch selection for certain columns and ineffective during the punch selection for other columns.

30. In a machine of the class described, punches to punch items into columns of a record card, item keys, movable mechanism settable by the item keys for selecting the punches for operation, escapement apparatus for moving said mechanism step by step to effect selection of the punches for the different columns in succession, for one column after another, mechanism to effect punching of a card by the selected punches, instrumentalities for maintaining a single setting of said mechanism in effect to repeat the selection of punches for punching certain columns during the punching of a plurality of cards, a repeat key operable in conjunction with the item keys for conditioning said instrumentalities to maintain a setting of the mechanism by the keys in effect for repeat selections of the punches, and means controlled by said escapement apparatus for rendering the repeat key effective during the setting of the aforesaid mechanism for punch selection in certain columns and ineffective during the setting of the aforesaid mechanism for punch selection in other columns.

31. In a machine of the class described, punches to punch items into cards, means for selecting the punches to punch desired items, means for effecting punching of a card by the selected punches, settable mechanism for maintaining a single selection of punches by said selecting means in effect for the punching of a plurality of cards, and means for selectively setting the mechanism to select the punch selections to be maintained.

32. In a machine of the class described, punches to punch items into cards, means for selecting the punches to punch desired items, means to effect punching of a card by the selected punches, settable mechanism for maintaining a single selection of punches in effect for the punching of a plurality of cards, and means controlled by the selecting means for selectively setting the aforesaid mechanism to determine which of the punch selections are to be maintained.

33. In a machine of the class described, punches to punch items into cards, means for selecting the punches to punch desired items, means to effect punching of a card by the selected punches, settable mechanism for maintaining a single selection of punches in effect for the punching of a plurality of cards, and means, controlled by the selecting means concomitantly with selection of the punches, for setting the aforesaid mechanism to determine which of the punch selections are to be maintained.

34. In a machine of the class described, punches to punch items into card columns, means for selecting the punches to punch desired items, means to effect punching of a card by the selected punches, settable mechanism settable to maintain a single selection of the punches for certain card columns in effect for the punching of a plurality of cards, and means, controlled by the selecting means concomitantly with selection of the punches and including a repeat control device operable conjointly with said selecting means, for selectively setting the aforesaid mechanism to determine for which columns the punch selection is to be maintained.

35. In a machine of the class described, punches to punch items into columns of record cards, means for selecting the punches to punch desired items, means to effect punching of a card by the selected punches, settable mechanism settable to maintain a single selection of punches for different card columns in effect for the punching of a plurality of cards, and means controlled by the selecting means to selectively set the settable mechanism to determine for which columns the punch selection is to be maintained.

36. In a machine of the class described, punches to punch items into columns of record cards, means to select the punches to punch desired items in the different columns, means to effect punching of a card by the selected punches, settable mechanism settable to determine whether the punch selections for the columns are to be repeated for the punching of a plurality of cards, and means for effecting successive setups of the settable mechanism for the determination of the repeat selection of punches for the successive columns, the setup for one column being effected after the setup for the preceding column.

37. In a machine of the class described, punches to punch items into columns of record cards, means to select the punches to punch desired items, means to effect punching of a card by the selected punches, settable mechanism settable to determine whether the punch selections for the columns are to be repeated for the punching of a plurality of cards, apparatus for moving the aforesaid mechanism step by step, each step corresponding to a card column, and means for setting the mechanism at each step for governing repeat selection of the punches for the column corresponding to that step.

38. In a machine of the class described, punches to punch items into columns of record cards, means to select the punches to punch desired items, means to effect punching of a card by the selected punches, mechanism having a plurality of spaced devices, each corresponding to a different card column, means for selectively conditioning the devices, means controlled by the device in accordance with their conditions for governing the repeating or cancellation of the punch selections for the corresponding columns after a card punching operation, and apparatus for moving the aforesaid mechanism step by step to successively correlate said devices with the means for conditioning them.

39. In a machine of the class described, punches to punch items into columns of record cards, settable punch selecting mechanism settable to select the punches for operation, means to effect the punching of a card by the selected punches, a second settable mechanism settable to control repetition of a punch selection for the punching of a plurality of cards, item keys, and means controlled by operation of the keys to concomitantly set the selecting mechanism and the second settable mechanism.

40. In a machine of the class described, punches to punch items into columns of record cards, settable punch selecting mechanism successively settable to select the punches for punching the columns, the setting of the selecting mechanism for one card column punch selection being effected after the setting of the selecting mechanism for the preceding card column, a second settable mechanism successively settable to determine whether punch selections for different columns be repeated for the punching of a plurality of cards, apparatus for moving the punch selecting mechanism and the second settable mechanism step by step and in synchronism, each step corresponding to a different card column, and means common to both mechanisms for simultaneously controlling, at each step of the movements of said mechanisms, the setting of the punch selecting mechanism to select the punches for the column corresponding to the step of movement and the second settable mechanism to determine whether the punch selection for the column corresponding to that step of movement is to be repeated.

41. A machine of the class described, comprising punches to punch items into record cards, instrumentalities to select the punches to punch desired items, means for effecting punching of a card by the selected punches, mechanism settable to determine whether a punch selection is to be repeated for the punching of a plurality of cards, means operative to selectively set said mechanism during the selection of punches by said instrumentalities for punching the first card of a series of cards, and means for dissociating said mechanism from the setting means therefor during the subsequent selections of punches for subsequent cards of the series.

42. A machine of the class described, comprising punches to punch items into record cards, instrumentalities to select the punches to punch desired items, means for effecting punching of a card by the selected punches, mechanism settable to determine whether a punch selection is to be repeated for the punching of each of a series of cards, means including said instrumentalities, and effective when the latter select punches for the first card of the series, to selectively set the aforesaid mechanism, and means for dissociating said mechanism from the setting means therefor during the selection of punches by said intrumentalities for the second and subsequent cards of the series.

43. A machine of the class described, comprising punches to punch items into record cards or the like, instrumentalities to select the punches to punch desired items, means for effecting punching of a card by the selected punches, mechanism settable to determine whether a punch selection is to be repeated for the punching of each of a series of cards, means including said instrumentalities, and effective when the latter select punches for the first card of the series, to selectively set the aforesaid mechanism, means for dissociating the mechanism from the setting means therefor during the selection of punches for subsequent cards of the series, and means for restoring the mechanism to condition for being set by said setting means following the punching of the last card of the series.

44. A machine of the class described, comprising punches to punch items into cards, means to select the punches to punch desired items, a punch cycle drive having means to effect punching of a card by the selected punches, settable mechanism settable to determine whether a punch selection is to be repeated for the punching of a plurality of cards or to be cancelled after a card has been punched, means for actuating the settable mechanism by the punch cycle drive, and devices controlled by the settable mechanism during actuation of the mechanism and in accordance with the setting of the latter for cancelling some of the punch selections and maintaining other punch selections in effect.

45. A machine of the class described, comprising punches to punch columns of a record card, mechanism having a plurality of settings, each for selecting the punches to punch a different card column, means to effect punching of a card under control of said mechanism and in accordance with the settings of the latter, apparatus to cancel, selectively, settings of said mechanism, a keyboard, and means controlled thereby to control said apparatus in accordance with whether the punch selections for certain columns are to be cancelled after a card has been punched or retained for the punching of a subsequent card.

46. A machine of the class described, comprising punches to punch columns of a record card in succession with the same or different designations, mechanism having a plurality of settings, each for selecting the punches to punch a different card column, means to effect successive punching of the columns of a card by the punches under successive control of the settings corresponding to the columns being punched, and means for cancelling some of the settings of said mechanism after the columns corresponding thereto have been punched and retaining other settings to control punching of subsequent cards.

47. A machine of the class described, comprising punches to punch items into columns of record cards, means to select the punches to punch each of the card columns, a punch cycle drive including means to successively punch the columns by the punches selected by the selecting means, mechanism having a plurality of settings, each for determining whether a punch selection for one column is to be retained after a punching operation or cancelled, a device controlled in accordance with the settings of said mechanism for cancelling the punch selection for any card column, and apparatus for successively coordinating the settings of said mechanism with the cancelling device for control of the latter and in synchronism with the punching of the successive card columns.

48. A machine of the class described, comprising punches to punch items into columns of record cards, means to select the punches to punch each of the card columns, a punch cycle drive including means to effect punching of the columns of a card by the selected punches, mechanism having a plurality of devices, each corresponding to a card column, settable to determine whether the punch selections for the different columns are to be retained or cancelled after a card has been punched, means for selectively setting up said devices in accordance with which column selections are to be retained and which cancelled, apparatus to actuate said mechanism step by step to coordinate the devices successively with the setting means therefor, means operative after the punch selections for a card have been made and the devices have been set for shifting the aforesaid mechanism from the step-by-step actuating apparatus to the punch cycle drive to be actuated by the latter during the punching operation, and instrumentalities controlled by the aforesaid devices during the actuation of the mechanism by the punch cycle drive for cancelling the selection of punches for certain columns and retaining the punch selections for other columns after the punching of the card columns and in accordance with the settings of said devices.

49. A machine comprising punches to punch columns of a record card, mechanism movable step by step, item selecting elements for effecting a plurality of settings of said mechanism during step by step movement of the latter, each setting for selecting the punches for punching one of the card columns, means controlled by the settings of said mechanism to effect punching of a card by the selected punches, and instrumentalities for selectively cancelling the settings of said mechanism corresponding to certain card columns and retaining other settings of the mechanism in effect for the punching of a plurality of cards.

50. A machine comprising punches to punch columns of a record card, settable mechanism settable to select the punches to punch the different card columns, item selecting elements to effect a plurality of settings of said mechanism, each setting to select the punches for one of the card columns, a device for cancelling some of the settings of said mechanism after a card has been punched and for retaining other settings in effect for the punching of a plurality of cards, instrumentalities for selectively controlling operation of the cancelling device in accordance with which of the column settings are to be cancelled and which retained, and means for moving said mechanism past the cancelling device to successively bring the settings of said mechanism under control of the cancelling device.

51. A machine comprising punches to punch record forms, a punch control device movable step by step, apparatus for moving said control device, mechanism settable to control said apparatus for moving said control device one or more steps at a time, keys, and connections between said keys and mechanism for selectively setting said mechanism to selectively control said apparatus.

52. A machine comprising punches to punch items into record forms, a punch selecting device movable step by step, apparatus to actuate said device, mechanism settable to control said apparatus for moving said device one or more steps at a time, item keys, means operated by the item keys for controlling said device for selection of punches to punch desired items, and means also controlled by said keys, concomitantly with their control of said device, for selectively setting up the settable mechanism.

53. A machine comprising punches to punch record forms, a punch control device movable step by step, apparatus for moving said control device, elements settable to control said apparatus for moving said control device one or more steps at a time, keys, and means controlled by operation of the keys for selectively setting said elements to selectively control said apparatus.

54. A machine comprising punches to punch record forms, a punch control device movable step by step, apparatus for moving said control device, mechanism moved by said apparatus in synchronism with the aforesaid device and having a plurality of selectively and individually settable elements spaced apart successive distances corresponding to a step of movement of the control device, and means controlled by any of the elements when set in a certain position for causing said apparatus to move said control device and said mechanism more than one step at a time.

55. A machine comprising punches to punch record forms, a punch control device movable step by step, apparatus for moving said control device, mechanism moved by said apparatus in synchronism with the aforesaid device and having a plurality of selectively and individually settable elements spaced apart successive distances corresponding to a step of movement of the control device, means controlled by any of the elements when set in a certain position for causing said apparatus to move said control device and said mechanism more than one step at a time, keys, and operative connections between the keys and the elements for selectively setting the elements.

56. A machine comprising punches to punch record forms, a punch control device movable step by step, apparatus for moving said control device, mechanism moved by said apparatus in synchronism with the aforesaid device and having a plurality of selectively and individually settable elements spaced apart successive distances corresponding to a step of movement of the control device, means controlled by any of the elements when set in a certain position for causing said apparatus to move said control device and said mechanism more than one step at a time, item keys, means controlled by the item keys for setting said control device to select desired punches for operation, and means controlled by operation of the keys, when setting said control device, for concomitantly setting said elements.

57. A machine comprising punches to punch columns of a record form, a punch selecting device movable step by step, apparatus to actuate said device, mechanism selectively settable for selectively controlling said apparatus to actuate said device one or more steps at a time, item keys, means controlled by operation of the keys for causing said device to select punches for punching desired items, means for setting said mechanism, and a manually operable device concomitantly operable with the keys for causing operation of the keys to operate said setting means simultaneously with the operation of the punch selecting means.

58. A machine comprising punches to punch columns of a record card, a punch selecting device, escapement apparatus for actuating said device step by step, each step corresponding to a card column, mechanism settable to control said apparatus for moving said device one or more steps at a time, means for selectively setting said mechanism, and means operated by said apparatus, when reaching a step of its movement corresponding to a certain card column, for rendering said setting means ineffective.

59. A machine comprising recording means, a control device therefor movable step by step, escapement apparatus for moving said device, settable means settable to control said apparatus for moving the device one or more steps at a time, keys, and connections between the keys and said means for selectively setting the latter to selectively control the movement of said apparatus.

60. A machine comprising punches to punch items into columns of a record card, item selecting elements, a punch selecting device movable step by step, means operated by said elements for controlling said device at each step of its movement according to the selection of the punches for one of the card columns, escapement apparatus for moving the aforesaid device, a repeat control mechanism settable to cause the punch selection for certain columns to be automatically repeated for the punching of a plurality of cards, an escapement control mechanism settable to control said apparatus for effecting one or more steps of movement of said device, and means controlled by operation of said item selecting elements for setting up the repeat control mechanism and the escapement control apparatus.

61. In a machine of the class described including a selectively controllable apparatus; a subcombination comprising a member movably carrying a plurality of spaced elements selectively settable for controlling said apparatus, a magnet, means operated by the magnet for selectively setting said elements, a circuit for energizing said magnet, and means for closing said circuit to selectively set any of said elements.

62. In a machine of the class described including a selectively controllable apparatus; a subcombination comprising a movable member, pins spaced along said member and movably carried by the member to be selectively set for successively controlling said apparatus during movement of the aforesaid member, keys, and means controlled by operation of said keys for selectively setting said pins.

63. In a machine of the class described including a selectively controllable apparatus; a subcombination comprising a disk, a plurality of elements spaced circumferentially of the disk and carried by the disk for movement relative to the disk, and means for selectively setting said elements by moving them selectively relative to the disk for selectively controlling said apparatus.

64. In a machine of the class described, punches for punching columns of a record card, a control device for the punches, apparatus for moving said device step by step, each step corresponding to a card column, item selecting elements for operating said device at each step of its movement in accordance with the selection of punches for the card column corresponding to each step, an indicator operated by said apparatus in synchronism with the control device to indicate the column position of said device, and spring means for returning said indicator to a home position independently of said apparatus.

65. In a machine of the class described, punches for punching columns of a record card, a control device for the punches, apparatus for moving said device step by step, each step corresponding to a different card column, item selecting elements for operating said device at each step of its movement in accordance with the selection of punches for the corresponding card column, a column indicator operated by said apparatus in synchronism with the control device to indicate the column position of the latter, and means for returning the indicator to the first column position independently of the return of the control device to a position other than one corresponding to the first column.

66. A machine comprising a single set of punches for punching data into a record form, mechanisms, each for controlling the set of punches to punch selected data into a record form, means for effecting punching of the selected data into a record form by the punches under control of said mechanisms, and means for placing said set of punches under control of a different one of said mechanisms during the punching of different record forms.

67. A machine comprising a single set of punches to punch data into a record form, mechanisms, each for separately controlling the set of punches to punch selected data into a record form, means for effecting punching of the selected data into a record form under control of said mechanisms, and means for placing said set of punches under successive control of said mechanisms during the punching of successive record forms.

68. A machine comprising a single set of punches to punch data into a record form, a plurality of mechanisms, each for separately controlling the set of punches to punch selected data into a record form, punch cycle means operating during a punch cycle to effect punching of a single record form with the selected data by the set of punches and under control of one of said mechanisms, and means for placing said set of punches under control of a different one of said mechanisms during different punch cycles.

69. A machine comprising a single set of punches to punch data into a record form, a pair of mechanisms, each for controlling the set of punches to punch selected data into a record form, means for effecting punching of the selected data by the set of punches into a record form under control of either one of said mechanisms, and means for placing said set of punches under alternate control of said mechanisms for the punching of alternate record forms.

70. A machine comprising punching means to punch data into record forms, a plurality of mechanisms, each for controlling the punching means to punch selected data, punch cycle means to effect punching of the selected data during a punch cycle into a record form by the punching means under control of any of said mechanisms, and means for placing said punching means under control of different ones of said mechanisms during different punch cycles.

71. A machine comprising punching means to punch data into record cards, a plurality of control mechanisms, each for controlling the punching means to punch selected data into a record card, means to effect punching of the selected data into a record card by the punching means under control of any of said mechanisms, and means for placing the punching means under control of different ones of said mechanisms for the punching of successive record cards.

72. A machine comprising punching means to punch data into record forms, a plurality of settable mechanisms settable to control the punching means for punching selected data, means to effect punching of the record forms by the punching means under control of and in accordance with the settings of said mechanisms, and means for rendering different ones of said mechanisms effective, during the punching of different record forms, to control the punching means.

73. A machine comprising punching means to punch data into record forms, a plurality of selectively and differently settable punch interposer mechanisms, each for cooperating with the punching means to effect punching into a record form by the punching means of data selected in accordance with the interposer setting of the mechanism, and means for cooperatively relating different ones of said mechanisms with said punching means during the punching of different record forms.

74. A machine comprising punching means to punch data into record forms, a plurality of carrying mechanisms, punch interposers selectively set on each of the carrying mechanisms for cooperating with the punching means to punch data selected by the interposers in accordance with their settings on their carrying mechanisms, means to effect punching of a record form by the punching means under control of the interposers of any one of said mechanisms, and means for placing the interposers of a different one of said mechanisms in cooperation with the punching means during the punching of different cards.

75. A machine comprising punching means to punch data into record forms, means for feeding successive forms into punching position, a plurality of control mechanisms, each for controlling the punching means to punch selected data into a record form, means for effecting punching of selected data into the record forms by the punching means under control of said mechanisms, and means for placing said punching means under successive control of said mechanisms for successive forms fed to punching position.

76. A machine comprising punching means to punch data into record forms, a plurality of control mechanisms, each settable at a punching station for controlling the punching means to punch selected data into a record form, means to effect punching of the selected data into a record form by the punching means under control of the mechanism at the punching station, and means for placing different ones of the mechanisms at the punching stations for the punching of different record forms.

77. A machine comprising punching means to punch data into a record form while the form is in motion, a plurality of control mechanisms, each for controlling the punching mechanism to punch selected data into the record form, means to effect punching of the selected data into a record form by the punching means under control of any one of said mechanisms, and means for placing a different one of said mechanisms in control of the punching means during the punching of different record forms.

78. A machine comprising punching mechanism to punch data into record forms, a control mechanism settable at a punching station for controlling the punching mechanism to punch selected data, means for effecting punching of the selected data into a record form by the punching mechanism under control of the control mechanism, apparatus for shifting the control mechanism from a position external of the punching station to an operative control position at the punching station, and means controlled by the shifting apparatus for initiating operation of the aforesaid punch-effecting means after the control mechanism has reached the punching station.

79. A machine comprising punches to punch items into record forms, a set of item selecting devices for selecting items to be punched, apparatus upon which the item selections made by said devices are impressed, means for effecting operation of the punches under control of the apparatus to punch a series of items the selections of which have been impressed upon the apparatus, and means controlled by the selecting devices and operable while the apparatus is controlling punching of a previously selected series of items for impressing a new series of item selections upon the apparatus.

80. A machine comprising punches to punch items into record forms, a set of item selecting devices for selecting items to be punched, apparatus upon which item selections made by said devices are impressed, means for effecting operation of the punches under control of the apparatus, and in accordance with a series of item selections impressed upon the apparatus, for punching the selected items into one record form, and means controlled by the selecting devices and operable while one record form is being punched for impressing data selections, for the next form, upon said apparatus.

81. A machine comprising punches to punch data into record forms, a set of data selecting devices for selecting data to be punched, apparatus upon which the data selections made by said devices are impressed, means for effecting operation of the punches under control of the apparatus and in accordance with data selections impressed thereon, means for impressing new data selections upon the apparatus while the punches are effecting punching of previous data selections under control of said apparatus, and instrumentalities for selectively cancelling or retaining the data selection impressions in the apparatus after such data selection impressions have controlled punching operations.

82. A machine comprising punches to punch items into record forms, a set of item selecting devices for selecting the items to be punched, apparatus including a plurality of units, each for receiving a plurality of data selections made by said devices, means for effecting operation of the punches under control of one of said units at a time and in accordance with the data selections entered into the active unit, and means controlled by said devices for entering a plurality of new item selections into one unit while another unit is controlling punching of a plurality of previously selected items.

83. A machine comprising punches to punch items into record forms, a set of item selecting devices for selecting the items to be punched, apparatus including a pair of units, each for receiving a plurality of data selections made by said devices, means for effecting operation of the punches to punch a plurality of items under control of one of said units at a time, means controlled by said devices for entering a plurality of item selections into one unit while the other unit is controlling punch operation, and means for alternating the data selection entry into each unit with the punch control by said unit.

84. A machine comprising punches to punch items into record forms, item selecting devices, a punch control unit having alternate stations, means controlled by said devices while the unit is at one station for entering item selections into the unit, means controlled by the unit while at the other station for selectively effecting operation of the punches in accordance with the item selections entered therein, and means for shifting the unit from one station to another.

85. A machine comprising punches to punch data into record forms, data selecting devices for selecting the data to be punched, a punch control unit having a data selection receiving station and a punching station, means controlled by said devices while the unit is at the receiving station for entering data selections into the unit, means controlled by the unit while at the punching station for effecting operation of the punches in accordance with the data selections entered into the unit, power means for shifting the unit from one station to another, and manual means for initiating shifting operation of the power means.

86. A machine comprising punches to punch data into record forms, devices for selecting the data to be punched, a movably mounted punch control unit having a data selection receiving station and a punch control station, means controlled by said devices while the unit is at the receiving station for entering data selections into the unit, means controlled by the unit while at the punch control station for effecting operation of the punches in accordance with the data selections entered in the unit, and a pair of driving mechanisms for the unit, one driving mechanism for driving the unit when the latter is at the receiving station and the other mechanism for driving the unit when the latter is at the punch control station.

87. A machine comprising punches to punch data into record forms, devices for selecting data to be punched, a movably mounted punch control unit, means controlled by said devices for impressing data selections upon said unit, means controlled by the unit for effecting operation of the punches in accordance with the data selections impressed upon the unit, and a pair of separate actuating mechanisms for said unit, one for actuating the unit while the data selections are being impressed thereon, and the other mechanism for actuating the unit while the unit is controlling the punching operation according to the data selections.

88. A machine comprising punches to punch data into record forms, devices for selecting data to be punched, a pair of movably mounted punch control units having a common punch control station and having different data selection receiving stations at opposite sides of the punch control station, means controlled by said devices to enter data selections into a unit while at the receiving station, means controlled by the unit while at the punch control station for effecting operation of the punches in accordance with the data selections entered into the unit, and means for simultaneously shifting one unit to its receiving station and the other unit to the punch station.

89. A machine comprising punches to punch data into record forms, devices for selecting data to be punched, a pair of movably mounted punch control units, means controlled by the devices for impressing data selections upon the units, means controlled by each unit for effecting operation of the punches in accordance with the data selections impressed upon the unit, a pair of driving mechanisms, one for actuating a unit while data selections are being impressed thereon and the other for actuating the unit while controlling punch operation, and means for rendering said pair of mechanisms alternately effective to drive each unit.

90. A machine comprising data selecting devices, apparatus into which data selections made by said devices are entered, means operating during a punch cycle for punching a record card under control of said apparatus and in accordance with data selections previously entered into the apparatus, means operable under control of said devices and while the punch cycle is taking place for entering data selections for the next card to be punched into the apparatus, and means for delaying the start of a new punch cycle until the data selections for the aforesaid next card have been completed.

91. A machine comprising data selecting devices, apparatus into which the data selections are entered, means controlled by said devices during a data selection cycle for entering data selections into a part of the apparatus, punching means operating during a punching cycle and under control of another part of the apparatus for punching a record card with the data selections entered into the latter part of the apparatus, the punching cycle being effected during a data selection cycle, and means for preventing the initiation of a new data selection cycle until the companion punching cycle has been completed.

92. A machine comprising punches to punch data into a record form, a movably mounted rigid punch control unit having a variable punch control configuration impressed thereon, data selecting elements operable for impressing different punch control configurations upon the unit in accordance with the data selected to be punched, and means controlled by the unit while the latter is in motion for effecting operation of the punches in accordance with the configuration impressed on the unit.

93. A machine comprising punches to punch data into a plurality of fields of a record form, a rigid, movable, punch control unit having a variable punch control configuration impressed thereon, data selecting elements operable for impressing different configurations on the unit in accordance with the data selected to be punched, and means controlled by the unit while the latter is in continuous motion for effecting punching of a plurality of fields by the punches in accordance with the configuration impressed on the unit.

94. A machine comprising punches to punch item designations into a record form, a punch control unit, similar control elements interchangeably settable, by movement relative to the unit, in any of different positions on the unit, each position corresponding to a different item designation, item selecting devices operable for setting the elements in positions on the unit corresponding to item designations selected by said devices to be punched, and means for effecting operation of the punches under control of said elements and in accordance with their positions on the unit.

95. A machine comprising punches to punch item designations into a record form, a punch control unit, similar control elements external to said unit and interchangeably settable in any of different positions on the unit, each position corresponding to a different item designation, item selection devices operable for automatically setting the elements in positions on the unit corresponding to the item designations selected by said devices to be punched, and means for effecting operation of the punches under control of said elements and in accordance with their positions on the unit.

96. A machine comprising punches to punch item designations into a record card, a punch control unit, punch interposer elements external to said unit and interchangeably settable in any of different positions on the unit, a keyboard having item keys, means controlled by operation of the keys for setting the elements on the unit in positions corresponding to the designations to be punched, and means for operating the punches, by engagement with the interposer elements set on the unit, to punch the designations corresponding to the positions in which the elements are set.

97. A machine comprising punches to punch designation positions of a record card with data designations, a punch control unit having a plurality of pockets corresponding to different data designation positions, control elements, designation selecting means for selectively loading the elements into the pockets corresponding to selected designation positions, and means for effecting control of the punches by the elements loaded into the unit and in accordance with the pockets into which they have been loaded.

98. A machine comprising means to manifest indicia, a rotatable control cylinder having a plurality of positions corresponding to different indicia designations, control elements settable on the cylinder in positions corresponding to the indicia to be manifested, means for effecting control of the manifesting means by the elements during a course of rotation of the cylinder and in accordance with their setting on the cylinder and means for selectively discharging some of the control elements from the cylinder and retaining the other elements thereon after said elements have controlled the manifesting means.

99. A machine comprising means to manifest indicia, a punch control unit having a plurality of positions corresponding to different indicia designations, control elements set at the positions of said unit corresponding to indicia to be manifested, means for effecting operation of the manifesting means under control of the elements set at the positions of the unit, and means for cancelling the setting of control elements from some positions of the unit and retaining the setting of other elements in other positions of the unit after said elements have controlled the manifesting means.

100. A machine comprising punching means to punch data designations into designation positions of a record form, a punch control unit having a plurality of pockets corresponding to different designation positions, control elements loaded into the pockets corresponding to the designation positions to be punched, means for effecting control of the punching means by the unit in accordance with the loaded pockets, and means for selectively unloading some of the pockets of the unit and allowing other pockets to remain loaded after said elements have effected control of the punching means.

101. A machine comprising punching means to punch data designations into a record form, a punch control unit having a plurality of pockets corresponding to different designations, control elements adapted to be loaded into the pockets for controlling operation of the punches, designation selecting devices, each for setting an element into a pocket corresponding to the data designation selected by the device, and means operable at will for discharging an element from a pocket into which it has been loaded.

102. A machine comprising punches to punch data designations into record forms, a movable punch control unit having a plurality of spaced pockets, control elements insertible in said pockets to control operation of the punches, apparatus for moving said unit step by step in a forward direction to present successive pockets to a loading position, instrumentalities at the loading position for inserting a control element into the pocket, means operable at will for discharging a control element from a pocket after the latter has passed the loading position, and a device effective after discharge of the element for reversing movement of the unit to present the emptied pocket again to the loading position.

103. A machine comprising punches to punch data designations into record forms, a movable punch control unit having a plurality of spaced pockets, control elements insertible in said pockets to control operation of the punches, escapement apparatus for moving the unit step by step in a forward direction from a home position, instrumentalities operable at each step for inserting a control element into a pocket, and means for releasing said apparatus to move said unit continuously in said forward direction to the home position.

104. A machine comprising punches to punch data designations into different designation positions arranged in columns of a record form, a rotatable punch control cylinder having a plurality of circumferentially spaced rows of pockets, each row corresponding to a different column of the record form and each pocket in a row corresponding to a different designation position, control elements insertible in said pockets to control operation of the punches, apparatus for rotating the cylinder to successively present the rows of pockets to a loading position, instrumentalities for inserting a control element into the pocket of a row at loading position, and data selecting devices for controlling said instrumentalities to insert elements into the pockets corresponding to data designations selected by said devices.

105. A machine comprising punches to punch data designations into designation positions of a record form, a punch control unit having spaced pockets corresponding to different designation positions, elements insertible in said pockets to control operation of the punches, means operable during a loading cycle for inserting the elements in pockets of the unit corresponding to selected designation positions, means operable during a punching cycle for effecting operation of the punches under control of the inserted elements, and means for effecting the loading and punching cycles in succession.

106. A machine comprising punches to punch data designations into a record card, a rotatable cylinder having spaced pockets, balls insertable in said pockets to control operation of the punches, instrumentalities for inserting balls at a loading position having a certain level into selected ones of said pockets, means for discharging the balls from the cylinder to a lower level than the first-mentioned level, and a power driven elevator for elevating the discharged balls from the lower to the higher level to return the balls to loading position.

107. A machine comprising punches to punch data designations into a record card, a rotatable cylinder having spaced pockets, balls insertable in said pockets to control operation of the punches, a housing for the cylinder having means to carry the cylinder and acting to confine the inserted balls in the cylinder, a support for mounting the housing in an operative position, instrumentalities effective while the housing is in operative position for selectively inserting balls into the pocket, means operable while the housing is in operative position for effecting operation of the punches under control of the balls in the cylinder, a device for preventing the housing from leaving its operative position, and means for disabling said device to enable the housing and cylinder to be moved as a unit to an inoperative position on said support.

108. A machine comprising punches operable during a series of punching cycles to punch data designations into a series of record cards, a supply hopper for the cards, means operating during a punching cycle for feeding a card from the magazine preliminary to a following punching cycle, control devices for controlling operation of the punches during a punching cycle to punch a card with desired data designations, and means operable during the last punching cycle of the series for preventing the feeding of a card by said feeding means from the supply hopper.

109. In combination; recording means, punches, means to effect punch selections according to the data recorded, control means to prevent punch selections being effected during recording in certain fields of a form, and alternate control means operable to cause the first-named control means to be disregarded and to enable punch selections to be made during recording in the aforesaid fields.

110. In combination; recording means, punches, means to effect punch selections according to the data recorded, a device automatically operable in accordance with the progress of the punching selections, and control means, the effectivity of which is governed by said device, for preventing punch selections being made during recording in certain fields of a form and enabling punch selections being made during recording in other fields of the form.

111. In combination; recording means, punching apparatus including punches, means to effect punch selections according to the data recorded, control means for preventing punch selections being made during recording in certain fields of a form and enabling punch selections to be made in other fields, and means controlled by a part of the punching apparatus for determining the effectivity of said control means.

112. In combination; recording means, punches to punch columns of a record sheet, means to effect punch selections for the sheet columns, control means for preventing punch selections being effected during recording in certain fields of a form, and means for causing the control means to be disregarded during punch selections for some of the sheet columns.

113. In combination; recording means including a traveling carriage, punches, means to effect punch selections according to the data recorded, control means to render the punch selections effective or ineffective depending on the positions of travel of the carriage, and alternate control means for rendering the punch selections effective irrespective of the positions of travel of the carriage.

114. In a machine of the class described; punching mechanism to punch items into record forms, item selecting elements to select the items to be punched, and apparatus for causing the punching mechanism to repeat the punching of selected items and including means coacting with the selecting elements to determine at the time of the punch selection by said elements that the latter punch selection is to be subsequently repeat punched.

115. In a machine of the class described; punching mechanism to punch item designations into record forms, item selecting elements, each to select an item either to be singly punched or to be repeat punched, and apparatus for causing the punching mechanism to repeat the punching of the items selected to be repeat punched and to punch the items selected to be singly punched only once, and including means coacting with the selecting elements at the time of punch selections for determining whether the selected items are to be repeat or singly punched.

116. In a machine of the class described; punching mechanism to punch representations of data into record forms, data selecting elements, each for selecting either variable datum to be singly punched or repeat datum to be repeat punched, apparatus for causing the punching mechanism to repeat the punching of the repeat data into each of a series of forms and to punch the variable data only into one form of the series, and means automatically operable after selection of the data for the first of a series of forms has been completed for preventing the item selecting elements from varying the selection of repeat data for the series of forms and to enable the selecting elements to select only variable data for each of the record forms of the series.

117. In a machine of the class described including a selectively controllable apparatus; a subcombination comprising a traveling member movably carrying a plurality of spaced elements selectively settable relative to the member for controlling said apparatus during travel of the member, and means for selectively setting the elements relative to the member in accordance with the desired control to be exercised on the apparatus.

118. A machine comprising a single set of punches for punching data into a record form, a single data selecting keyboard, a plurality of punch control units, each to receive punch selections by said keyboard and to transmit said punch selections to the punches to punch record forms accordingly, and means for placing said set of punches under control of a different one of said units during the punching of different record forms.

119. A machine to punch designations into columns of a record form, comprising a movable punch control unit having spaced portions corresponding to columns of the record form and successively traversing a predetermined position, designation selecting means, means controlled by said selecting means upon operation of the latter for impressing punch control configurations on said portions of the unit as the latter traverse said predetermined position, each such configuration determining the designation to be punched in a column of a record form, means controlled by configurations after a plurality of the latter have been impressed on different portions of the unit for punching columns of a record form with designations determined by said configurations and selected by the aforesaid selecting means, and means whereby configurations may be varied after having controlled punching operation.

120. A machine to punch designations into columns of a record form, comprising a traveling punch control unit, designation selecting means, means controlled by the selecting means and upon operation of the latter for effecting, during a course of travel of said unit, different column settings of said unit for determining the designations to be punched in corresponding columns of the record form, and means operable, subsequently to the unit having been given a plurality of column settings for punching the corresponding columns of the record form in accordance with the latter settings.

121. A machine to punch designations into a record form, comprising designation selecting means, means for storing the designation selections effected by the selecting means and including a traveling punch control unit and elements set under control of the selecting means, during a course of travel of the unit, in positions on the unit for determining a plurality of selected designations to be punched in the record form, and means operable after the plurality of designation selections for a form have been stored for punching said form under control of the elements set on the unit.

122. A machine comprising punching means to punch indicia into different fields of a record sheet, each field adapted to bear the same or different indica, a traveling punch control unit having spaced portions corresponding to the different fields of the record sheet, means to select the indicia to be punched in said fields, means controlled by the selecting means for setting said portions selectively, during a course of travel of the control unit, in accordance with the selected indicia to be punched in the corresponding fields, means for selectively correlating the spaced portions of said control unit, during travel of the latter, with the selecting means to selectively condition said portions to be set, and means controlled by the set portions of the unit, and in accordance with their settings, for operating the punching means to punch the selected indicia in the fields corresponding to such portions.

123. A machine comprising means to manifest indicia, instrumentalities to select the indicia to be manifested, selectively settable repeat control mechanism for maintaining a single selection of indicia by said instrumentalities in effect for repeated manifesting by said manifesting means, a set of keys, and means controlled by the keys for selectively setting said mechanism to select the indicia selections to be maintained.

124. A machine comprising means to manifest indicia, instrumentalities to select indicia to be manifested, selectively settable repeat control mechanism for maintaining a single selection of indicia by said instrumentalities in effect for repeated manifesting by said manifesting means, and selectively operable electrical means for selectively setting said mechanism to select the indicia selections to be maintained.

FRED M. CARROLL.
JOHN H. BAKELAAR.